United States Patent
Marquinez Torrecilla et al.

(10) Patent No.: US 12,354,491 B2
(45) Date of Patent: Jul. 8, 2025

(54) SYSTEMS FOR SIMULATING JOINING OPERATIONS USING MOBILE DEVICES

(71) Applicants: ILLINOIS TOOL WORKS INC., Glenview, IL (US); Seabery North America Inc., Annapolis, MD (US)

(72) Inventors: Pedro Gerardo Marquinez Torrecilla, Annapolis, MD (US); William Joshua Becker, Neenah, WI (US); Justin Monroe Blount, Whitefish Bay, WI (US); Mitchell James Muske, Watertown, SD (US); Jessica Marie Marhefke, Neenah, WI (US); Pavel Gunia, Huelva (ES)

(73) Assignees: Illinois Tool Works Inc., Glenview, IL (US); Seabery North America Inc., Annapolis, MD (US)

( * ) Notice: Subject to any disclaimer, the term of this patent is extended or adjusted under 35 U.S.C. 154(b) by 0 days.

(21) Appl. No.: 18/625,600

(22) Filed: Apr. 3, 2024

(65) Prior Publication Data

US 2024/0346952 A1    Oct. 17, 2024

Related U.S. Application Data

(63) Continuation of application No. 18/071,051, filed on Nov. 29, 2022, now Pat. No. 11,967,249, which is a
(Continued)

(51) Int. Cl.
| | |
|---|---|
| G09B 19/24 | (2006.01) |
| G06F 1/16 | (2006.01) |
| G09B 9/00 | (2006.01) |

(52) U.S. Cl.
CPC ............. *G09B 19/24* (2013.01); *G06F 1/163* (2013.01); *G06F 1/1637* (2013.01); *G06F 1/1686* (2013.01); *G09B 9/00* (2013.01)

(58) Field of Classification Search
CPC .......... G09B 19/24; B23K 9/09; B23K 9/095; B23K 9/0953
See application file for complete search history.

(56) References Cited

U.S. PATENT DOCUMENTS

| | | |
|---|---|---|
| 3,555,239 A | 1/1971 | Kerth |
| 3,652,824 A | 3/1972 | Okada |
| (Continued) | | |

FOREIGN PATENT DOCUMENTS

| | | |
|---|---|---|
| CA | 2725719 A1 | 6/2012 |
| CA | 2778699 | 11/2012 |
| (Continued) | | |

OTHER PUBLICATIONS

NAMeS Users Guide, N A Tech Neural Applications, Copyright 1997, 1998, 1999, 2000 Golden, CO (123 pages).
(Continued)

*Primary Examiner* — Robert J Utama
(74) *Attorney, Agent, or Firm* — McAndrews, Held & Malloy, Ltd.

(57) ABSTRACT

Systems are disclosed relating to a mobile device mounted to a welding helmet such that a wearer of the welding helmet can see a display of the mobile device when wearing the welding helmet. In some examples, the mobile device is mounted such that a camera of the mobile device is unobscured and positioned at approximately eye level, facing the same way the wearer's eyes are facing. In some examples, the simulated training environment may be presented to the user via the display screen of the mobile device, using images captured by the camera of the mobile device, when the mobile device is so mounted to the welding helmet.

20 Claims, 29 Drawing Sheets

Related U.S. Application Data continuation of application No. 16/695,027, filed on Nov. 25, 2019, now Pat. No. 11,521,512.

(60) Provisional application No. 62/807,666, filed on Feb. 19, 2019.

(56) References Cited

U.S. PATENT DOCUMENTS

| | | |
|---|---|---|
| 3,927,290 A | 12/1975 | Denley |
| 4,021,840 A | 5/1977 | Ellsworth |
| 4,280,137 A | 7/1981 | Ashida |
| 4,453,085 A | 6/1984 | Pryor |
| 4,477,712 A | 10/1984 | Lillquist |
| 4,482,960 A | 11/1984 | Pryor |
| 4,577,796 A | 3/1986 | Powers |
| 4,602,163 A | 7/1986 | Pryor |
| 4,641,292 A | 2/1987 | Tunnell |
| 4,654,949 A | 4/1987 | Pryor |
| 4,707,647 A | 11/1987 | Coldren |
| 4,733,051 A | 3/1988 | Nadeau |
| 4,753,569 A | 6/1988 | Pryor |
| 4,769,700 A | 9/1988 | Pryor |
| 4,788,440 A | 11/1988 | Pryor |
| 4,812,614 A | 3/1989 | Wang |
| 5,148,591 A | 9/1992 | Pryor |
| 5,275,327 A | 1/1994 | Watkins |
| 5,380,978 A | 1/1995 | Pryor |
| 5,506,682 A | 4/1996 | Pryor |
| 5,572,102 A | 11/1996 | Goodfellow |
| 5,580,475 A | 12/1996 | Sakai |
| 5,602,967 A | 2/1997 | Pryor |
| 5,608,847 A | 3/1997 | Pryor |
| 5,923,555 A | 7/1999 | Bailey |
| 5,932,123 A | 8/1999 | Marhofer |
| 5,956,417 A | 9/1999 | Pryor |
| 5,978,090 A | 11/1999 | Burri |
| 6,044,183 A | 3/2000 | Pryor |
| 6,051,805 A | 4/2000 | Vaidya |
| 6,107,601 A | 8/2000 | Shimagama |
| 6,122,042 A | 9/2000 | Wunderman et al. |
| 6,163,946 A | 12/2000 | Pryor |
| 6,167,607 B1 | 1/2001 | Pryor |
| 6,186,855 B1 | 2/2001 | Bauer |
| 6,230,327 B1 | 5/2001 | Briand |
| 6,240,253 B1 | 5/2001 | Yamaguchi |
| 6,242,711 B1 | 6/2001 | Cooper |
| 6,271,500 B1 | 8/2001 | Hirayama |
| 6,301,763 B1 | 10/2001 | Pryor |
| 6,314,631 B1 | 11/2001 | Pryor |
| 6,315,186 B1 | 11/2001 | Friedl |
| 6,317,953 B1 | 11/2001 | Pryor |
| 6,441,342 B1 | 8/2002 | Hsu |
| 6,476,354 B1 | 11/2002 | Jank |
| 6,479,793 B1 | 11/2002 | Wittmann |
| 6,572,379 B1 | 6/2003 | Sears |
| 6,587,186 B2 | 7/2003 | Bamji |
| 6,734,393 B1 | 5/2004 | Friedl |
| 6,750,428 B2 | 6/2004 | Okamoto |
| 6,754,518 B1 | 6/2004 | Lloyd |
| 7,358,458 B2 | 4/2008 | Daniel |
| 7,523,069 B1 | 4/2009 | Friedl et al. |
| 7,534,005 B1 | 5/2009 | Buckman |
| 7,926,118 B2 | 4/2011 | Becker |
| 7,962,967 B2 | 6/2011 | Becker |
| 7,987,492 B2 | 7/2011 | Liwerant |
| 8,144,193 B2 | 3/2012 | Melikian |
| 8,224,029 B2 | 7/2012 | Saptharishi |
| 8,274,013 B2 | 9/2012 | Wallace |
| 8,275,201 B2 | 9/2012 | Rangwala |
| 8,316,462 B2 | 11/2012 | Becker et al. |
| 8,428,926 B2 | 4/2013 | Choquet |
| 8,502,866 B2 | 8/2013 | Becker |
| 8,512,043 B2 | 8/2013 | Choquet |
| 8,569,646 B2 | 10/2013 | Daniel |
| 8,569,655 B2 | 10/2013 | Cole |
| 8,605,008 B1 | 12/2013 | Prest |
| 8,648,903 B2 | 2/2014 | Loipetsberger |
| 8,657,605 B2 | 2/2014 | Wallace |
| 8,680,432 B2 | 3/2014 | Uecker |
| 8,680,434 B2 | 3/2014 | Stoger et al. |
| 8,747,116 B2 | 6/2014 | Zboray et al. |
| 8,749,396 B2 | 6/2014 | Maggiore |
| 8,777,629 B2 | 7/2014 | Kreindl |
| 8,808,164 B2 | 8/2014 | Hoffman |
| 8,826,357 B2 | 9/2014 | Fink |
| 8,834,168 B2 | 9/2014 | Peters |
| 8,851,896 B2 | 10/2014 | Wallace |
| 8,884,177 B2 | 11/2014 | Daniel |
| 8,911,237 B2 | 12/2014 | Postlethwaite |
| 8,915,740 B2 | 12/2014 | Zboray |
| 8,934,029 B2 | 1/2015 | Nayar |
| 8,957,835 B2 | 2/2015 | Hoellwarth |
| 8,964,298 B2 | 2/2015 | Haddick |
| RE45,398 E | 3/2015 | Wallace |
| 8,987,628 B2 | 3/2015 | Daniel et al. |
| 8,992,226 B1 | 3/2015 | Leach |
| 9,011,154 B2 | 4/2015 | Kindig |
| 9,012,802 B2 | 4/2015 | Daniel |
| 9,050,678 B2 | 6/2015 | Daniel |
| 9,050,679 B2 | 6/2015 | Daniel |
| 9,056,365 B2 | 6/2015 | Hoertenhuber |
| 9,073,138 B2 | 7/2015 | Wills |
| 9,089,921 B2 | 7/2015 | Daniel |
| 9,097,891 B2 | 8/2015 | Border |
| 9,101,994 B2 | 8/2015 | Albrecht |
| 9,104,195 B2 | 8/2015 | Daniel |
| 9,196,169 B2 | 11/2015 | Wallace |
| 9,218,745 B2 | 12/2015 | Choquet |
| 9,221,117 B2 | 12/2015 | Conrardy |
| 9,230,449 B2 | 1/2016 | Conrardy |
| 9,235,051 B2 | 1/2016 | Salter |
| 9,244,539 B2 | 1/2016 | Venable |
| 9,269,279 B2 | 2/2016 | Penrod et al. |
| 9,280,913 B2 | 3/2016 | Peters |
| 9,293,056 B2 | 3/2016 | Zboray |
| 9,293,057 B2 | 3/2016 | Zboray |
| 9,318,026 B2 | 4/2016 | Peters |
| 9,330,575 B2 | 5/2016 | Peters |
| 9,336,686 B2 | 5/2016 | Peters |
| 9,352,411 B2 | 5/2016 | Batzler |
| 9,368,045 B2 | 6/2016 | Becker |
| 9,468,988 B2 | 10/2016 | Daniel |
| 9,483,959 B2 | 11/2016 | Wallace |
| 9,583,014 B2 | 2/2017 | Becker |
| 9,583,023 B2 | 2/2017 | Becker et al. |
| 9,589,481 B2 | 3/2017 | Becker et al. |
| 9,610,476 B1 | 4/2017 | Tran |
| 9,666,160 B2 | 5/2017 | Patel |
| 9,977,242 B2 | 5/2018 | Patel |
| 10,201,868 B2 | 2/2019 | Dunahoo |
| 10,909,872 B2 | 2/2021 | Albrecht |
| 2001/0048519 A1 | 12/2001 | Bamji |
| 2002/0017752 A1 | 2/2002 | Levi |
| 2004/0034608 A1 | 2/2004 | De Miranda et al. |
| 2004/0189675 A1 | 9/2004 | Pretlove |
| 2005/0001155 A1 | 1/2005 | Fergason |
| 2005/0099102 A1 | 5/2005 | Arthur |
| 2005/0103767 A1 | 5/2005 | Kainec |
| 2005/0161357 A1 | 7/2005 | Allan |
| 2005/0199605 A1 | 9/2005 | Furman |
| 2006/0087502 A1 | 4/2006 | Karidis |
| 2006/0090135 A1 | 4/2006 | Fukuda |
| 2006/0176467 A1 | 8/2006 | Rafii |
| 2006/0207980 A1 | 9/2006 | Jacovetty |
| 2006/0213892 A1 | 9/2006 | Ott |
| 2006/0281971 A1 | 12/2006 | Sauer |
| 2007/0187378 A1 | 8/2007 | Karakas |
| 2008/0083351 A1 | 4/2008 | Lippert |
| 2008/0158502 A1 | 7/2008 | Becker |
| 2008/0187235 A1 | 8/2008 | Wakazono |
| 2008/0314887 A1 | 12/2008 | Stoger |
| 2009/0014500 A1 | 1/2009 | Cho et al. |
| 2009/0134203 A1 | 5/2009 | Domec et al. |
| 2009/0231423 A1 | 9/2009 | Becker et al. |

(56) References Cited

U.S. PATENT DOCUMENTS

| | | |
|---|---|---|
| 2009/0276930 A1 | 11/2009 | Becker |
| 2009/0298024 A1 | 12/2009 | Batzler |
| 2010/0036624 A1 | 2/2010 | Martin |
| 2010/0048273 A1 | 2/2010 | Wallace |
| 2010/0062406 A1 | 3/2010 | Zboray |
| 2010/0079356 A1 | 4/2010 | Hoellwarth |
| 2010/0206851 A1 | 8/2010 | Nakatate |
| 2010/0223706 A1 | 9/2010 | Becker et al. |
| 2010/0262468 A1 | 10/2010 | Blankenship |
| 2011/0006047 A1 | 1/2011 | Penrod |
| 2011/0083241 A1 | 4/2011 | Cole |
| 2011/0091846 A1 | 4/2011 | Kreindl et al. |
| 2011/0108536 A1 | 5/2011 | Inada |
| 2011/0117527 A1 | 5/2011 | Conrardy |
| 2011/0187859 A1 | 8/2011 | Edelson |
| 2011/0220616 A1 | 9/2011 | Mehn |
| 2011/0220619 A1 | 9/2011 | Mehn |
| 2011/0227934 A1 | 9/2011 | Sharp |
| 2011/0309236 A1 | 12/2011 | Tian |
| 2012/0006800 A1 | 1/2012 | Ryan |
| 2012/0012561 A1 | 1/2012 | Wiryadinata |
| 2012/0074114 A1 | 3/2012 | Kawamoto |
| 2012/0122062 A1 | 5/2012 | Yang et al. |
| 2012/0152923 A1 | 6/2012 | Sickels |
| 2012/0176659 A1 | 7/2012 | Hsieh |
| 2012/0180180 A1 | 7/2012 | Steve |
| 2012/0189993 A1 | 7/2012 | Kindig |
| 2012/0229632 A1 | 9/2012 | Hoertenhuber |
| 2012/0241429 A1 | 9/2012 | Knoener |
| 2012/0249400 A1 | 10/2012 | Demonchy |
| 2012/0262601 A1 | 10/2012 | Choi |
| 2012/0291172 A1 | 11/2012 | Wills |
| 2012/0298640 A1 | 11/2012 | Conrardy |
| 2012/0305532 A1 | 12/2012 | Harris |
| 2013/0050432 A1 | 2/2013 | Perez |
| 2013/0081293 A1 | 4/2013 | Delin |
| 2013/0112678 A1 | 5/2013 | Park |
| 2013/0163090 A1 | 6/2013 | Yu |
| 2013/0189657 A1 | 7/2013 | Wallace |
| 2013/0189658 A1 | 7/2013 | Peters |
| 2013/0200882 A1 | 8/2013 | Almalki |
| 2013/0206740 A1 | 8/2013 | Pfeifer et al. |
| 2013/0206741 A1 | 8/2013 | Pfeifer et al. |
| 2013/0208569 A1 | 8/2013 | Pfeifer |
| 2013/0215281 A1 | 8/2013 | Hobby |
| 2013/0229485 A1 | 9/2013 | Rusanovskyy |
| 2013/0234935 A1 | 9/2013 | Griffith |
| 2013/0252214 A1 | 9/2013 | Choquet |
| 2013/0288211 A1 | 10/2013 | Patterson |
| 2013/0291271 A1 | 11/2013 | Becker |
| 2013/0321462 A1 | 12/2013 | Salter |
| 2013/0345868 A1 | 12/2013 | One |
| 2014/0014637 A1 | 1/2014 | Hunt |
| 2014/0014638 A1 | 1/2014 | Artelsmair |
| 2014/0017642 A1 | 1/2014 | Postlethwaite |
| 2014/0020147 A1 | 1/2014 | Anderson |
| 2014/0042135 A1 | 2/2014 | Daniel et al. |
| 2014/0042136 A1 | 2/2014 | Daniel et al. |
| 2014/0042137 A1 | 2/2014 | Daniel et al. |
| 2014/0059730 A1 | 3/2014 | Kim |
| 2014/0063055 A1 | 3/2014 | Osterhout |
| 2014/0065584 A1 | 3/2014 | Wallace |
| 2014/0092015 A1 | 4/2014 | Xing |
| 2014/0097164 A1 | 4/2014 | Beistle |
| 2014/0134579 A1 | 5/2014 | Becker |
| 2014/0134580 A1 | 5/2014 | Becker |
| 2014/0144896 A1 | 5/2014 | Einav |
| 2014/0159995 A1 | 6/2014 | Adams |
| 2014/0183176 A1 | 7/2014 | Hutchison |
| 2014/0184496 A1 | 7/2014 | Gribetz |
| 2014/0185282 A1 | 7/2014 | Hsu |
| 2014/0205976 A1 | 7/2014 | Peters |
| 2014/0220522 A1 | 8/2014 | Peters |
| 2014/0232825 A1 | 8/2014 | Gotschlich |
| 2014/0234813 A1 | 8/2014 | Peters |
| 2014/0263224 A1 | 9/2014 | Becker |
| 2014/0263227 A1 | 9/2014 | Daniel et al. |
| 2014/0263249 A1 | 9/2014 | Miller |
| 2014/0272835 A1 | 9/2014 | Becker |
| 2014/0272836 A1 | 9/2014 | Becker |
| 2014/0272837 A1 | 9/2014 | Becker |
| 2014/0272838 A1 | 9/2014 | Becker |
| 2014/0315167 A1 | 10/2014 | Kreindl |
| 2014/0320529 A1 | 10/2014 | Roberts |
| 2014/0322684 A1 | 10/2014 | Wallace |
| 2014/0326705 A1 | 11/2014 | Kodama |
| 2014/0346158 A1 | 11/2014 | Matthews |
| 2014/0349256 A1 | 11/2014 | Connor |
| 2015/0009316 A1 | 1/2015 | Baldwin |
| 2015/0034618 A1 | 2/2015 | Langeder |
| 2015/0056584 A1 | 2/2015 | Boulware |
| 2015/0056585 A1 | 2/2015 | Boulware |
| 2015/0072323 A1 | 3/2015 | Postlethwaite et al. |
| 2015/0116366 A1 | 4/2015 | Daveney |
| 2015/0125836 A1 | 5/2015 | Daniel |
| 2015/0154884 A1 | 6/2015 | Salsich |
| 2015/0170539 A1 | 6/2015 | Barrera |
| 2015/0190875 A1 | 7/2015 | Becker |
| 2015/0190876 A1 | 7/2015 | Becker |
| 2015/0190887 A1 | 7/2015 | Becker |
| 2015/0190888 A1 | 7/2015 | Becker |
| 2015/0194072 A1 | 7/2015 | Becker |
| 2015/0194073 A1 | 7/2015 | Becker |
| 2015/0209887 A1 | 7/2015 | Delisio |
| 2015/0228203 A1 | 8/2015 | Kindig |
| 2015/0235565 A1 | 8/2015 | Postlethwaite |
| 2015/0248845 A1 | 9/2015 | Postlethwaite |
| 2015/0264992 A1 | 9/2015 | Happel |
| 2015/0268663 A1 | 9/2015 | Daniel et al. |
| 2015/0304538 A1 | 10/2015 | Huang |
| 2015/0320601 A1 | 11/2015 | Gregg |
| 2015/0325153 A1 | 11/2015 | Albrecht |
| 2015/0348439 A1 | 12/2015 | Zboray |
| 2015/0348441 A1 | 12/2015 | Zboray |
| 2015/0352653 A1 | 12/2015 | Albrecht |
| 2015/0356888 A1 | 12/2015 | Zboray |
| 2015/0375324 A1 | 12/2015 | Becker |
| 2015/0375327 A1 | 12/2015 | Becker |
| 2015/0379894 A1 | 12/2015 | Becker |
| 2016/0012750 A1 | 1/2016 | Wallace |
| 2016/0027215 A1 | 1/2016 | Burns |
| 2016/0039034 A1 | 2/2016 | Becker |
| 2016/0039053 A1 | 2/2016 | Becker |
| 2016/0045971 A1 | 2/2016 | Holverson |
| 2016/0049085 A1 | 2/2016 | Beeson |
| 2016/0093233 A1 | 3/2016 | Boulware |
| 2016/0107257 A1 | 4/2016 | Denis |
| 2016/0114418 A1 | 4/2016 | Jones |
| 2016/0125592 A1 | 5/2016 | Becker et al. |
| 2016/0125593 A1 | 5/2016 | Becker |
| 2016/0125594 A1 | 5/2016 | Becker |
| 2016/0125761 A1 | 5/2016 | Becker |
| 2016/0125762 A1 | 5/2016 | Becker |
| 2016/0125763 A1 | 5/2016 | Becker |
| 2016/0125764 A1 | 5/2016 | Becker |
| 2016/0142596 A1 | 5/2016 | Depaschoal |
| 2016/0155358 A1 | 6/2016 | Zboray |
| 2016/0155359 A1 | 6/2016 | Zboray |
| 2016/0155360 A1 | 6/2016 | Zboray et al. |
| 2016/0155361 A1 | 6/2016 | Peters |
| 2016/0158884 A1 | 6/2016 | Hagenlocher |
| 2016/0163221 A1 | 6/2016 | Sommers |
| 2016/0171906 A1 | 6/2016 | Matthews |
| 2016/0183677 A1 | 6/2016 | Achillopoulos |
| 2016/0189559 A1 | 6/2016 | Peters |
| 2016/0203732 A1 | 7/2016 | Wallace |
| 2016/0203733 A1 | 7/2016 | Wallace |
| 2016/0203734 A1 | 7/2016 | Boulware |
| 2016/0203735 A1 | 7/2016 | Boulware |
| 2016/0236303 A1 | 8/2016 | Matthews |
| 2016/0260261 A1 | 9/2016 | Hsu |
| 2016/0267806 A1 | 9/2016 | Hsu et al. |
| 2016/0284311 A1 | 9/2016 | Patel |
| 2016/0288236 A1 | 10/2016 | Becker |

(56) References Cited

U.S. PATENT DOCUMENTS

| | | |
|---|---|---|
| 2016/0307460 A1 | 10/2016 | Peters |
| 2016/0321954 A1 | 11/2016 | Peters |
| 2016/0343268 A1 | 11/2016 | Postlethwaite |
| 2016/0353055 A1 | 12/2016 | Popescu |
| 2016/0354855 A1 | 12/2016 | Ulrich |
| 2016/0358503 A1 | 12/2016 | Batzler |
| 2016/0361774 A9 | 12/2016 | Daniel et al. |
| 2016/0365004 A1 | 12/2016 | Matthews |
| 2017/0036288 A1 | 2/2017 | Albrecht |
| 2017/0046974 A1 | 2/2017 | Becker et al. |
| 2017/0046977 A1 | 2/2017 | Becker |
| 2017/0046982 A1 | 2/2017 | Wallace |
| 2017/0053557 A1 | 2/2017 | Daniel |
| 2017/0060398 A1 | 3/2017 | Rastogi |
| 2017/0200395 A1 | 7/2017 | Albrecht |
| 2017/0249858 A1 | 8/2017 | Boettcher |
| 2018/0130376 A1 | 5/2018 | Meess et al. |
| 2019/0304338 A1 | 10/2019 | Campbell |
| 2019/0340954 A1 | 11/2019 | Schneider |
| 2021/0012679 A1 | 1/2021 | Torrecilla |

FOREIGN PATENT DOCUMENTS

| | | |
|---|---|---|
| CN | 1749940 | 3/2006 |
| CN | 1957374 A | 5/2007 |
| CN | 101067905 A | 11/2007 |
| CN | 101248659 | 8/2008 |
| CN | 101965576 | 2/2011 |
| CN | 102165504 A | 8/2011 |
| CN | 102625739 A | 8/2012 |
| CN | 202741926 | 2/2013 |
| CN | 103170767 | 6/2013 |
| CN | 103687687 A | 3/2014 |
| CN | 103996322 | 8/2014 |
| CN | 204013703 | 12/2014 |
| CN | 104384765 A | 3/2015 |
| CN | 104471629 | 3/2015 |
| CN | 104599314 A | 5/2015 |
| CN | 104603860 | 5/2015 |
| CN | 104708174 | 6/2015 |
| CN | 105160645 | 12/2015 |
| CN | 105745696 | 7/2016 |
| CN | 107000100 | 8/2017 |
| CN | 107000101 | 8/2017 |
| CN | 108057946 | 5/2018 |
| CN | 108713223 | 10/2018 |
| CN | 115191010 | 10/2022 |
| DE | 4313508 A1 | 10/1994 |
| EP | 0165501 | 12/1985 |
| EP | 1533683 | 5/2005 |
| EP | 2082656 A1 | 7/2009 |
| EP | 2801966 | 11/2014 |
| EP | 2863376 | 4/2015 |
| EP | 3537410 | 9/2019 |
| EP | 3550432 | 10/2019 |
| JP | S52126656 | 10/1977 |
| JP | 2002178148 | 6/2002 |
| JP | 2016203205 | 12/2016 |
| WO | 2005102230 | 11/2005 |
| WO | 2008101379 A1 | 8/2008 |
| WO | 2009137379 A1 | 11/2009 |
| WO | 2009146359 A1 | 12/2009 |
| WO | 2010062481 A1 | 6/2010 |
| WO | 2013122805 A1 | 8/2013 |
| WO | 20140188244 | 11/2014 |
| WO | 2015121742 | 8/2015 |
| WO | 2015185973 | 12/2015 |
| WO | 2016022452 | 2/2016 |
| WO | 2016044680 | 3/2016 |
| WO | 2016144744 | 9/2016 |
| WO | 2017120488 | 7/2017 |
| WO | 2017120491 | 7/2017 |
| WO | 2018080994 | 5/2018 |
| WO | 2018147868 | 8/2018 |

OTHER PUBLICATIONS

Klinker, Gudrun, Intelligent Welding Gun, 2002.
Native American Technologies, "ArcSentry Weld Quality Monitoring System" web page, http://web.archive.org/web/20020608124903/http://www.natech-inc.com/arcsentry1/index.html, published Jun. 8, 2002.
Native American Technologies, "P/NA.3 Process Modelling and Optimization" web pages, http://web.archive.org/web/20020608125619/http://www.natech-inc.com/pna3/index.html, published Jun. 8, 2002.
Fite-Georgel, Pierre; "Is there a Reality in Industrial Augmented Reality?" 10th IEEE International Symposium on Mixed and Augmented Reality (ISMAR), 2011.
ARVIKA Forum Vorstellung Projeckt PAARA, BMW Group Virtual Reality Center, Nuernberg, 2003.
Li, Larry, Time-of-Flight Camera—An Introduction, Technical White Paper, SLOA190B—Jan. 2014, revised May 2014 (10 pages).
Heston, Tim, Lights, camera, lean-recording manufacturing efficiency, The Fabricator, Aug. 2010 (4 pages).
Wavelength Selective Switching, http://en.wikipedia.org/wiki/wavelength_selective_switching, Mar. 4, 2015 (5 pages).
Windows 10 to Get 'Holographic' Headset and Cortana, BBC News, www.bbc.com/news/technology-30924022, Feb. 26, 2015 (4 pages).
Intelligent Robotic Arc Sensing, Lincoln Electric, Oct. 20, 2014, http://www.lincolnelectric.com/en-us/support/process-and-theory/pages/intelligent-robotic-detail.aspx (3 pages).
LiveArc Welding Performance Management System, A reality-based recruiting, screening and training solution, MillerWelds. com 2014 (4 pages).
Frank Shaopeng Cheng (2008). Calibration of Robot Reference Frames for Enhanced Robot Positioning Accuracy, Robot Manipulators, Marco Ceccarelli (Ed.), ISBN: 978-953-7619-06-0, InTech, Available from: http://www.intechopen.com/books/robot_manipulators/calibration_of_robot_reference_frames_for_enhanced_r obot_positioning_accuracy (19 pages).
Lutwak, Dr. Robert, Micro-Technology for Positioning, Navigation, and Timing Towards PNT Everywhere and Always Stanford PNT Symposium, Stanford, CA Oct. 29, 2014 (26 pages).
Lutwak, Dr. Robert, DARPA, Microsystems Tech. Office, Micro-Technology for Positioning, Navigation, and Timing Towards PNT Everywhere and Always, Feb. 2014 (4 pages).
Parnian, Neda et al., Integration of a Multi-Camera Vision System and Strapdown Inertial Naviation System (SDINS) with a Modified Kalman Filter, Sensors 2010, 10, 5378-5394; doi: 10.3390/s100605378 (17 pages).
Electronic speckle pattern interferometry Wikipedia, the free encyclopedia (4 pages), [retrieved Feb. 10, 2015].
Rivers, et al., Position-Correcting Tools for 2D Digital Fabrication (7 pages) Jul. 1, 2012.
Int' Search Report and the Written Opinion Appln No. PCT/US2016/016107, dated May 17, 2016 (11 pages).
Handheld Welding Torch with Position Detection technology description, Sep. 21, 2011 (11 pages).
Telops, Innovative Infrared Imaging, HDR-IR High Dynamic Range IR Camera, http://www.telops.com/en/infrared-Cameras/hdr-ir-high-dynamic-range-ir-camera, 2015 (2 pages).
OV10642:1.3-Megapixel OmniHDRTM, http://www.ovt.com/applications/application.php?id=7 (2 pages) Dec. 1, 2014.
Altasens—Wide Dynamic Range (WDR), http://www.altasens.com/index.php/technology/wdr (1 page), [retrieved Jan. 5, 2016).
HDR Camera for Industrial and Commercial Use, Invisual E Inc., http://www.invisuale.com/hardware/hdr-camera.html (2 pages), [retrieved Jan. 5, 2016).
Nit, Application Note: Native WDRTM for your Industrial Welding Applications, www.new-imaging-technologies.com (2 pages).
NIT, 8Care12004-02-B1 Datasheet, New Imaging Technologies (9 pages) Jul. 17, 2012.
NIT, NSC1005, Datasheet, Revised Nov. 2012, NSC1005 HD ready Logarithmic CMOS Sensor (28 pages).
NIT Image Processing Pipeline for Lattice HDR-6-, Nip, Pipeline, IP_NIT_NSC1005C_HDR60_V1_0 (23 pages) Jun. 14, 2012.

(56) References Cited

OTHER PUBLICATIONS

NIT Image Processing Pipeline, R&D Report N RD1220-Rev B, May 14, 2012 (10 pages).
NIT Color Management, R&D Report N RD1113-Rev B, Apr. 11, 2011 (31 pages).
Int'l Search Report and Written Opinion for PCT/US2015/067931 dated Jul. 26, 2016 (19 pages).
Cameron Series: "Why Weld Cameras Need Why High Dynamic Range Imaging", Apr. 10, 2013 (Apr. 10, 2013), XP055269605, Retrieved from the Internet: URL:http://blog.xiris.com/blog/bid/258666/Why-Weld-Cameras-Need-High-Dynamic-Range-Imaging [retrieved on Apr. 29, 2016] the whole document (5 pages).
AD-081CL Digital 2CCD Progressive Scan HDR/High Frame Rate Camera User's Manual, Jul. 1, 2012 (Jul. 1, 2012) p. 27, XP055269758, Retrieved from the Internet: URL:http://www.stemmer-imaging.de/media/uploads/docmanager/53730_JAI_AD-081_CL_Manual. pdf [retrieved on Apr. 29, 2016] the whole document (55 pages).
Anonymous: "JAI introduces unique high-dynamic-range camera", Nov. 5, 2009 (Nov. 5, 2009), XP055269759, Retrieved from the Internet: URL:http://www.jai.com/en/newsevents/news/ad-081c1 [retrieved on Apr. 29, 2016] Typical HDR applications for the AD-081CL include inspection tasks where incident light or bright reflections are Oresent, such as . . . welding (2 pages).
Int'l Search Report and Written Opinion Appln No. PCT/ US2016/012164, mailed May 12, 2016.
NIT Image Processing Pipeline for Lattice HDR-60, Nip Ip Pipeline, NIT_HDR60_V1_0_Pipeline_Sample (48 pages) Jun. 14, 2012.
Patent Cooperation Treaty, Notification of Transmittal of the International Search Report and the Written Opinion of the International Searching Authority, in PCT/US2016/020865, dated May 11, 2016, 12 pages.
Choi et al., Simulation of Dynamic Behavior in a GMAW System, Welding Research Supplement, Oct. 2001, 239-s thru 245-s (7 pages).
Aiteanu et al., Generation and Rendering of a Virtual Welding Seam in an Augmented Reality Training Envionment, Proceedings of the Sixth IASTED International Conference Visualization, Imaging, and Image Proceeding, Aug. 28-30, 2006, Palma de Mallorca, Spain ISBN Hardcapy: 0-88986-598-1 /CD: 0-88986-600-7 (8 pages).
'High Dynamic Range (HDR) Video Image Processing for Digital Glass, Augmented Reality in Quantigraphic Lightspace and Mediated Reality with Remote Expert, Raymond Lo, Sep. 12, 2012, https://www.youtube.com/Watch?v=ygcm0AQXX9k, YouTube screenshot submitted in lieu of the video itself.
'Ash VR1-DIY Homebrew PC Virtual Reality Head Mounted Display HMD,' alrons 1972, https://www.youtube.com/Watch?v=VOQboDZqguU, Mar. 3, 2013, YouTube screenshot submitted in lieu of the video itself.
"Soldamatic Augmented Training," Augmented Reality World, May 30, 2013, https://www.youtube.com/watch?V=Mn0052Ow_qY, YouTube screenshot submitted in lieu of the video itself.
"Optical Head-Mounted Display," Wikipedia, Jun. 2, 2016, https://en.wikipedia.org/wiki/Optical_head-mounted_display 14 pages.
About US.' Weldobot.com. <http://weldobot.com/?page_id=6> Accessed Jun. 2, 2016. 1 page.
International Search Report and Written Opinion corresponding to International Patent Application No. PCT/US2016/020861, Mailed May 23, 2016.
Hillers, Bernd, lat Institut fur Automatisierungstechnik, doctoral thesis Selective Darkening Filer and Welding Arc Observation for the Manual Welding Process, Mar. 15, 2012, 152 pgs.
"High Dynamic Range (HDR) Video Image Processing for Digital Glass, Wearable Cybernetic Eye Tap Helmet Prototype," Raymond Lo, https://www.youtube.com/watch?v=gtTdiqDqHc8, Sep. 12, 2012, YouTube screenshot Submitted in lieu of the video itself.
Int'l Search Report and Written Opinion for PCT/US2016/035473 dated Aug. 17, 2016 (15 pages).
G. Melton et al: "Laser diode based vision system for viewing arc welding (May 2009)", EUROJOIN 7, May 21, 2009 (May 21, 2009), XP055293872, Venice Lido, Italy, May 21-22, 2009.
Sergi Foix et al: "Exploitation of Time-of-Flight (ToF) Cameras IRI Technical Report", Oct. 1, 2007 (Oct. 1, 2007), pp. 1-22, XP055294087, Retrieved from the Internet: URL:http://digital.csic.es/bitstream/10261/30066/1 ltime-of-flight.pdf [retrieved on Aug. 8, 2016].
Int'l Search Report and Written Opinion Application No. PCT/US2017/012558 dated Mar. 23, 2017 (12 pages).
Klinker, Gudrun, Augmented Reality im prktischen Einsatz, Oct. 10, 2012 (40 pages).
Sandor, C., Klinker, G., A rapid prototyping software infrastructure for user interfaces in ubiquitous augmented reality, Pers Ubiquit Compu (2005) 9 169-185.
Rehm Welding Technology, Invertig. Pro Digital, Sep. 16, 2013.
Rehm Welding Technology, Product Range, Aug. 2013.
Tig Welder How to Play, www.tradesgamer.com, Nov. 17, 2011.
Hillers, Bernd & Aiteanu, D & Tschirner, P & Park, M & Graeser, Axel & Balazs, B & Schmidt, L. (2004). TEREBES: Welding helmet with AR capabilities.
Aiteanu, Dorin, "Virtual and Augmented Reality Supervisor for a New Welding Helmet" Nov. 15, 2005, pp. 1-150.
Winich, Chris, et al., "In situ weld pool measurement using sterovision," Japan-UA Symposium on Flexible Automation, Denver, CO 2004.
Communication from European Patent Office Appln No. 18 150 120.6 dated Jul. 4, 2018 (9 pgs).
Int'l Search Report and Written Opinion for PCT/US2018/028261 mailed Aug. 6, 2018 (17 pgs).
Larkin et al., "3D Mapping using a ToF Camera for Self Programming an Industrial Robot", Jul. 2013, IEEE, 2013 IEEE/ASME International Conference on Advanced Intelligent Mechatronics (AIM), pp. 494,499.
Bombardier et al: "Dual Digimig/Pulse Feeder and SVI-450i Power Supply", Feb. 1999 (Feb. 1999), XP055480578, Retrieved from the Internet: URL:http://www.esabna.com/eu/literature/arc%20equipment/accessories/dual%20digimig_pulse_fdr%20&%20svi-450i_15-565. pdf [retrieved on Jun. 1, 2018].
European Office Action Appln No. 16713176.2 dated Oct. 17, 2018 (7 pgs).
Wang et al. "Stereo vision-based depth of field rendering on a mobile device". Journal of Electronic Imaging 23(2), 023009 (Mar.-Apr. 2014) (Year: 2014).
Mrovlje, et al. "Distance measuring based on stereoscopic pictures". 9th International PhD Workshop on Systems and Control: Young Generation Viewpoint 1.-3. Oct. 2008, Izola, Slovenia (Year: 2008).
Petrovai etal, "A stereovision based approach for detecting and tracking lane and forward obstacles on mobile devices". 2015 IEEE Intelligent Vehicles Symposium (IV) Jun. 28-Jul. 1, 2015. COEX, Seoul, Korea (Year: 2015).
International Search Report and Written Opinion, International Patent Application No. PCT/US2020/018869, mailed May 4, 2020, 16 pages.
Wikipedia, "Google Cardboard,"Jan. 30, 2019, retrieved on Apr. 17, 2020, 8 pages.
International Search Report and Written Opinion, International Patent Application No. PCT/US2020/018866, mailed Apr. 24, 2020, 15 pages.
Anonymous: "Showcasing latest international developments in welding training systems", Australasian Welding Journal, vol. 59, Third Quarter, 2014, Jan. 1, 2014 (Jan. 1, 2014), pageaugms 1-5, XP055742728, Retrieved from the internet: URL:https://www.slv-halle.de/fileadmin/user_upload/Halle/Pressemitteilungen/Welding-training-IIW-C-XIV.pdf [retrieved on Oct. 22, 2020].
www.boxford.co.us: "Augmented Reality Welding Training", Commercial video from Boxford, Aug. 7, 2014 (Aug. 7, 2014); Retrieved from the Internet: URL:https://www.youtube.com/watch?v=mjJcebhlo_g [retrieved Dec. 23, 2020], 1 page.
European Patent Office, Brief Communication with Oral Proceedings in Application No. 16713176.2, dated Nov. 3, 2020, 18 pages.
International Search Report and Written Opinion, International Patent Application No. PCT/US2020/062277, mailed Feb. 16, 2021, 12 pages.
Anonymous: "AugmentedArc(TM) Augmented Reality Welding System", May 30, 2017 (May 30, 2017), pp. 1-4, XP055501429,

(56) References Cited

OTHER PUBLICATIONS

Retrieved from the Internet: URL:https://patongroup.com/wp-content/uploads/2017/05/AugmentedArc-Brochure.pdf.

International Search Report and Written Opinion, International Patent Application No. PCT/US2020/062301, mailed Feb. 16, 2021, 15 pages.

International Search Report and Written Opinion, International Patent Application No. PCT/US2020/062267, mailed Feb. 15, 2021, 15 pages.

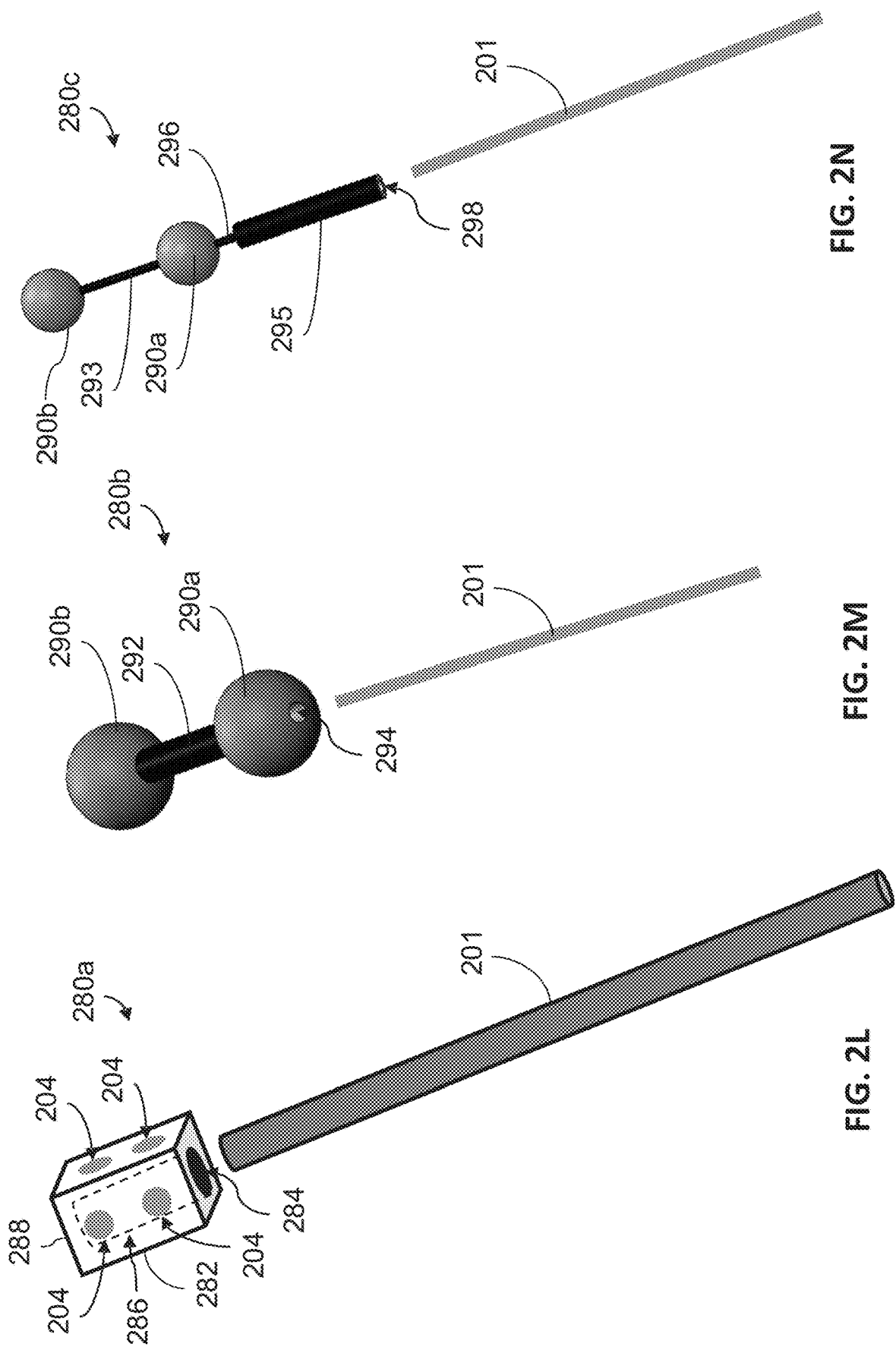

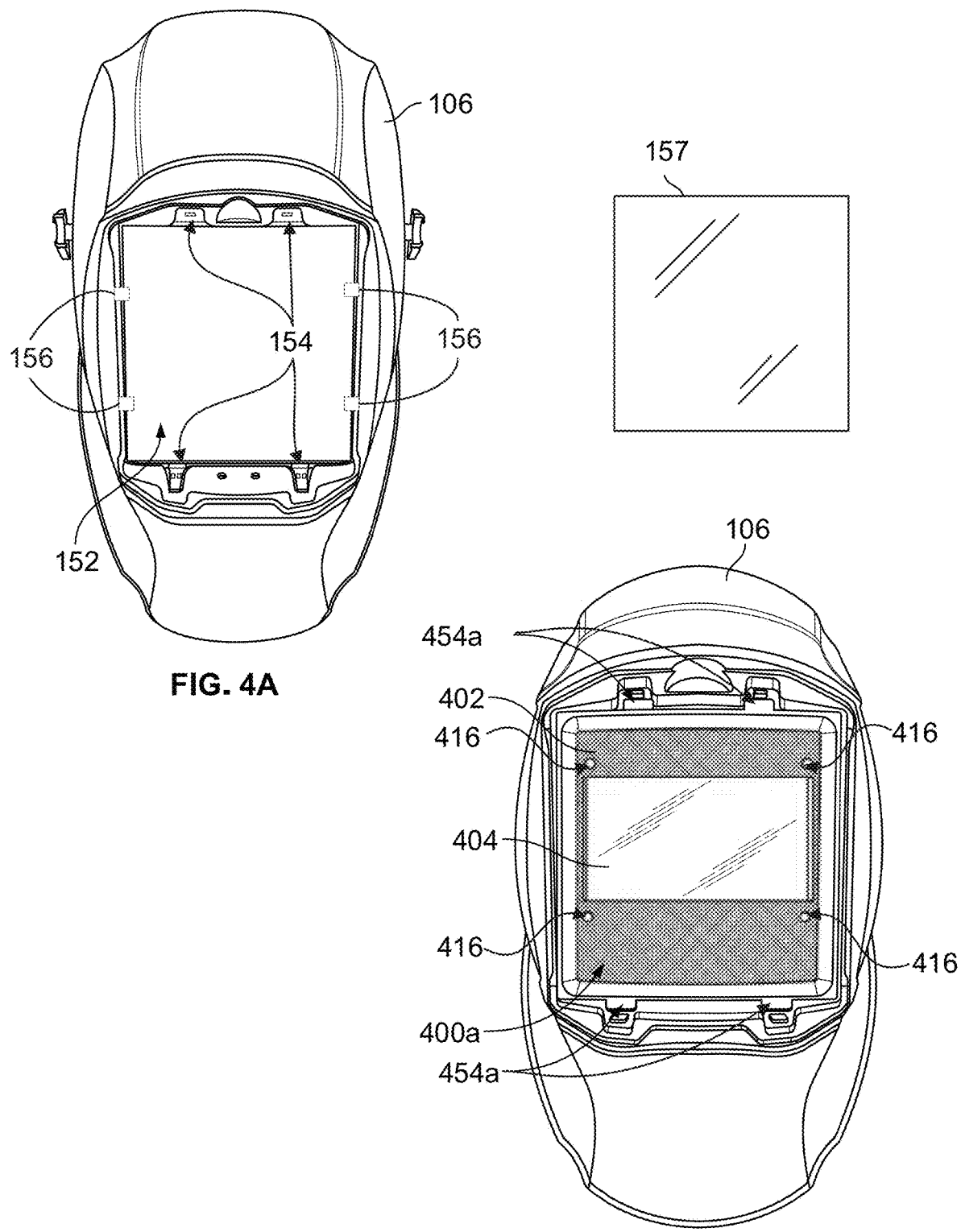

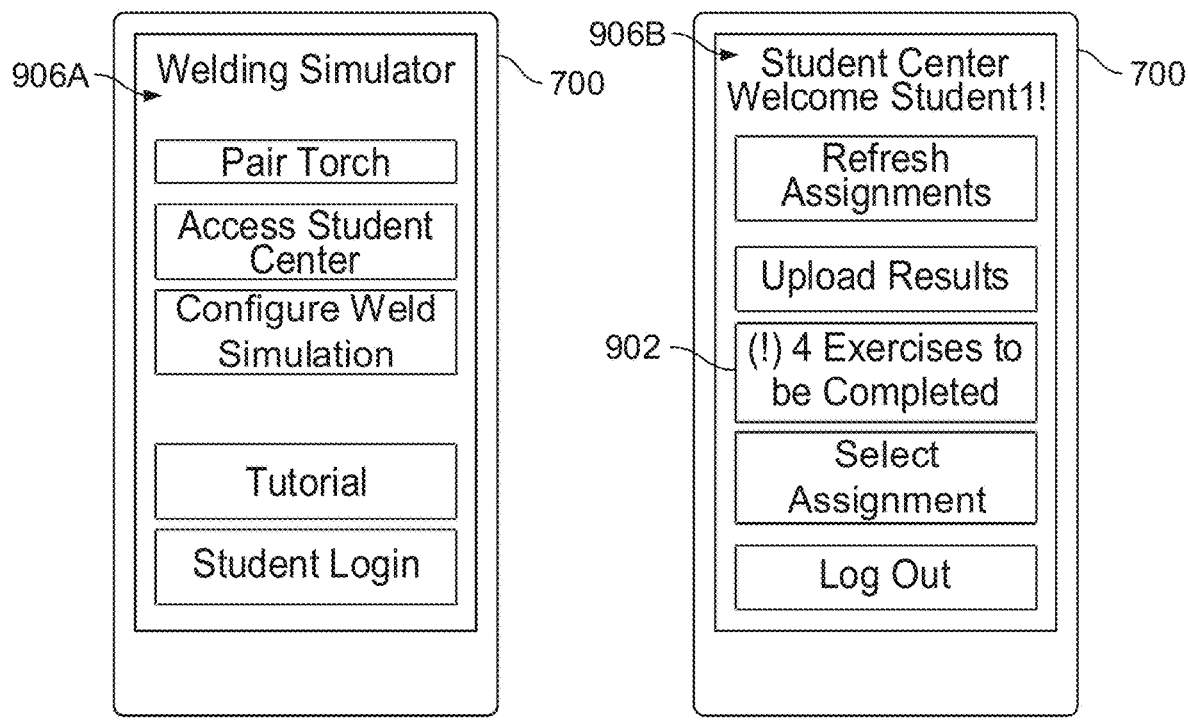
FIG. 9A
FIG. 9B
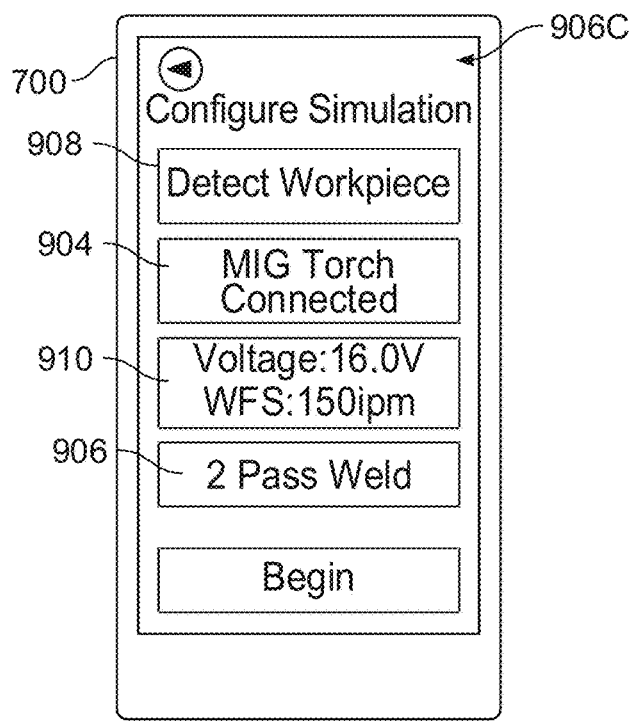
FIG. 9C

SYSTEMS FOR SIMULATING JOINING OPERATIONS USING MOBILE DEVICES

CROSS REFERENCE TO RELATED APPLICATIONS

This application claims priority to co-pending U.S. Non-Provisional patent application Ser. No. 18/071,051, entitled "SYSTEMS FOR SIMULATING JOINING OPERATIONS USING MOBILE DEVICES," filed Nov. 29, 2022, which claims priority to U.S. Non-Provisional patent application Ser. No. 16/695,027 (now U.S. Pat. No. 11,521,512), entitled "SYSTEMS FOR SIMULATING JOINING OPERATIONS USING MOBILE DEVICES," filed Nov. 25, 2019 (issued Dec. 6, 2022), which claims priority to U.S. Provisional Patent Application Ser. No. 62/807,666, filed Feb. 19, 2019, entitled "SYSTEMS FOR SIMULATING JOINING OPERATIONS USING MOBILE DEVICES," the entire contents of which are expressly incorporated herein by reference.

TECHNICAL FIELD

This disclosure relates to simulating joining operations and, more particularly, to systems for simulating joining operations using mobile devices.

BACKGROUND

While some welding processes may be automated in certain contexts, a large number of applications continue to exist for manual welding operations. Manual welding operations often depend heavily on individual manual welding operators. The quality of a manual weld may be dictated by the experience and/or skill of manual welding operators, such as with respect to proper welding techniques (for example, torch work angles, torch travel angles, contact tip-to-work distance, travel speed, aim, etc.) and/or welding parameters (e.g., wire feed speed, voltage, current, etc.).

However, the welding industry has a shortage of experienced and skilled operators. Additionally, it is difficult and expensive to train new operators using live welding equipment. Further, even experienced welders often have difficulty maintaining important welding techniques throughout welding processes. Thus, there is a demand for affordable training tools and equipment that help operators develop, maintain, and/or refine welding skills.

Simulated welding tools make it possible for both experienced and inexperienced weld operators to practice producing high quality welds prior to actually using the real welding equipment. Additionally, welding operators can test out different welding tools in a simulated environment prior to actually purchasing that particular welding tool. However, conventional systems and methods for simulating joining operations require substantial investments in equipment (e.g., processors, displays, practice workpieces, welding tool(s), sensor(s), etc).

SUMMARY

Systems for simulating joining operations using mobile devices are disclosed, substantially as illustrated by and described in connection with at least one of the figures, as set forth more completely in the claims.

These and other advantages, aspects, and/or novel features of the present disclosure, as well as details of an illustrated example thereof, will be more fully understood from the following description and drawings.

DRAWINGS

Features, aspects, and/or advantages of the present disclosure will become better understood when the following detailed description is read with reference to the accompanying drawings in which like characters represent like parts throughout the drawings, wherein:

FIGS. 2L-2N illustrate example filler rod attachments that may be used with the GTAW torch of FIG. 2J and/or weld training system of FIG. 1, in accordance with aspects of this disclosure.

FIG. 4A illustrates the example welding helmet of FIGS. 3A-3C without the mobile device mount, in accordance with aspects of this disclosure.

FIG. 4B illustrates the example welding helmet of FIG. 4A with an example mounting panel attached, in accordance with aspects of this disclosure.

FIGS. 9A-9C illustrates example screens of the mobile device of FIG. 7 when performing preliminary configurations of the weld training application of FIG. 8A, in accordance with aspects of this disclosure.

The figures are not necessarily to scale. Where appropriate, similar or identical reference numbers are used to refer to similar or identical components.

DETAILED DESCRIPTION

Figure 1:
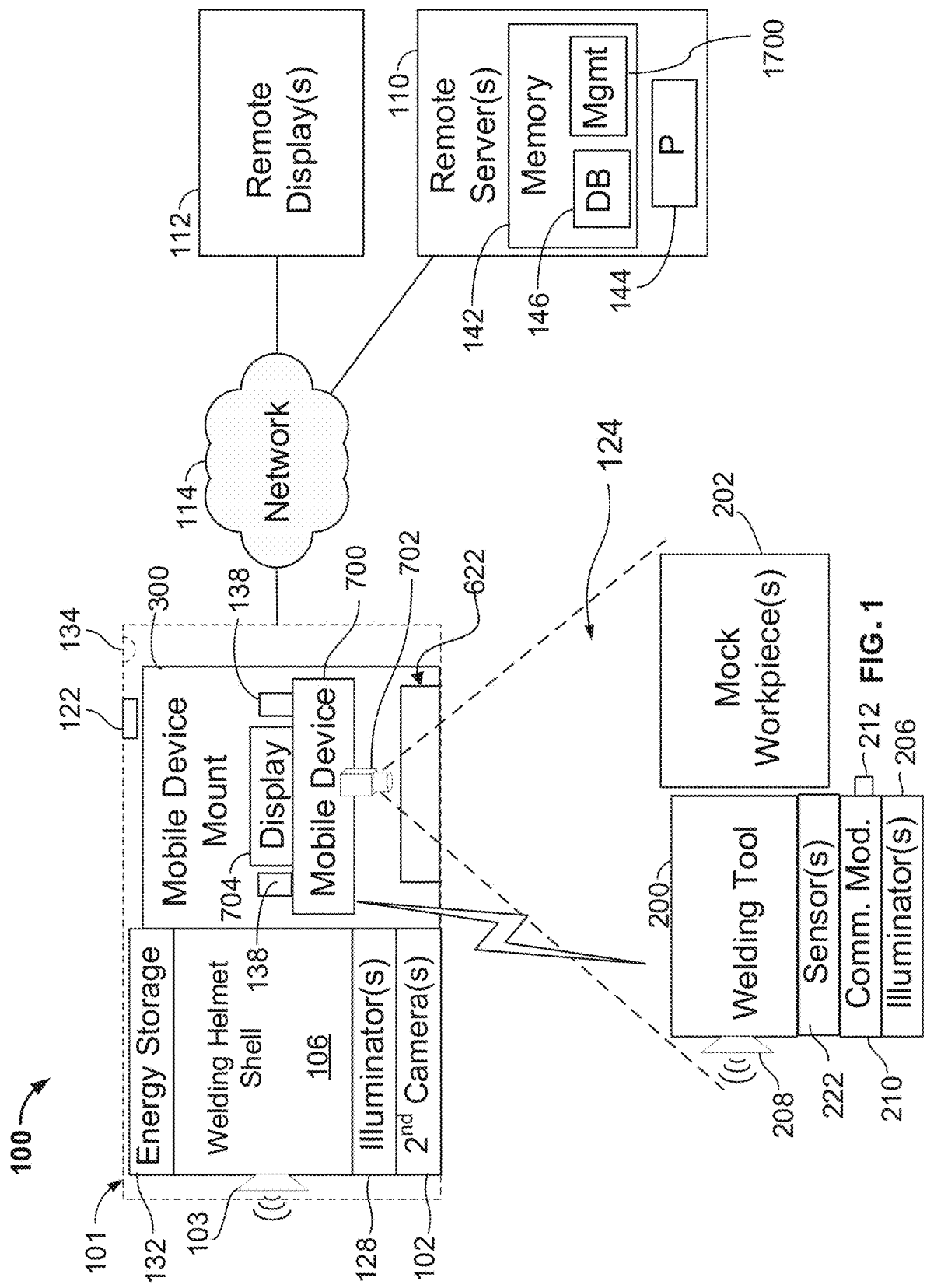
FIG. 1 is a block diagram of an example weld training system, in accordance with aspects of this disclosure.

Some examples of the present disclosure relate to simulating (e.g., via augmented, mixed, and/or virtual reality) joining operations (e.g., welding, brazing, adhesive bonding, and/or other joining operations) using mobile devices (e.g., smartphone, tablet, personal digital assistant, electronic book reader, ipod, etc.), such as for purposes of training. While the following disclosure sometimes refers to welding and/or weld training as a shorthand, the disclosure is equally applicable to other joining operations.

In some examples, a conventional welding helmet is adapted with a mobile device mount configured to connect a mobile device with the welding helmet. Mobile devices are widely available, relatively affordable, and technically powerful. Harnessing these available and affordable devices for training simulations may be advantageous.

In some examples, a mobile device is mounted to a welding helmet such that a wearer of the welding helmet can see a display of the mobile device in their field of view when wearing the welding helmet. In some examples, the mobile device is mounted such that a camera of the mobile device is unobscured and positioned at approximately eye level, facing the same way the wearer's eyes are facing. In some examples, the simulated training environment may be presented to the user via the display screen of the mobile device, using images captured by the camera of the mobile device, when the mobile device is so mounted to the welding helmet.

Some examples of the present disclosure relate to a weld training system, comprising a mobile device, the mobile device comprising a housing, a display configured to display images from a first side of the housing, a camera configured to capture images from a second side of the housing opposite the first side of the housing, processing circuitry in the housing and coupled to the display and the camera, and a computer readable storage device comprising computer readable instructions which, when executed, cause the processing circuitry to execute a welding simulation based on images captured via the camera, generate images of the welding simulation, display the images of the welding simulation via the display, display a user-selectable element on the display, identify a selection of the user-selectable element, and perform a task based on the selection.

In some examples, the computer readable instructions, when executed, cause the processor to determine a location or orientation of a workpiece based on the images captured by the camera, and identify the selection based on the location or orientation of the workpiece. In some examples, the computer readable instructions, when executed, cause the processor to determine a location or orientation of a welding tool based on the images captured by the camera, and identify the selection based on the location or orientation of the welding tool. In some examples, the computer readable instructions, when executed, further cause the processor to identify the selection based on receiving an indication of a trigger pull of the welding tool. In some examples, the computer readable instructions, when executed, further cause the processor to identify a plurality of trigger presses from a welding tool in communication with the mobile device or a continuous trigger press for at least a threshold duration from the welding tool, and determine the selection based on the continuous trigger press or the plurality of trigger presses. In some examples, the computer readable instructions, when executed, cause the processor to identify the selection based on received speech input.

In some examples, the computer readable instructions, when executed, further cause the processor to access a remote computing system to identify a simulated welding task based on a logged in user of the application, and conduct the simulated welding mode based on the simulated welding task. In some examples, the remote computing system comprises a weld training management system. In some examples, the computer readable instructions, when executed, further cause the processor to download the identified simulated welding task from the remote computing system, determine a representative result of the simulated welding task based on inputs received via the mobile device during the simulated welding mode, and upload the representative result to the remote computing system. In some examples, the computer readable instructions, when executed, further cause the processor to monitor activities associated with the simulated welding task, compare the activities to an activity goal, and provide feedback via the display based on the comparison. In some examples, the activity goal is obtained from a remote computing system.

Some examples of the present disclosure relate to a weld training system, comprising a mobile device configured to conduct a welding simulation, the mobile device comprising processing circuitry, and a computer readable storage device comprising computer readable instructions which, when executed, cause the processing circuitry to execute an application associated with the welding simulation, detect insertion of the mobile device into an accessory, and in response to the detection, transition the application to a simulated welding mode.

In some examples, the computer readable instructions, when executed, further cause the processor to access a remote computing system to identify a simulated welding task based on a logged in user of the application, and conduct the simulated welding mode based on the simulated welding task. In some examples, the remote computing system comprises a weld training management system. In some examples, the computer readable instructions, when executed, further cause the processor to download the identified simulated welding task from the remote computing system, determine a representative result of the simulated welding task based on inputs received via the mobile device during the simulated welding mode, and upload the representative result to the remote computing system. In some examples, the computer readable instructions, when executed, further cause the processor to monitor activities associated with the simulated welding task, compare the activities to an activity goal, and provide feedback via the display based on the comparison. In some examples, the activity goal is obtained from a remote computing system.

Some examples of the present disclosure relate to a weld training system, comprising a mobile device configured to conduct a welding simulation, the mobile device comprising one or more cameras configured to capture an image, a display configured to display images of the welding simulation, processing circuitry, and a computer readable storage device comprising computer readable instructions which, when executed, cause the processing circuitry to determine a resolution of the display, a resolution of the one or more cameras, a size of the image captured by the one or more cameras, a processing capability of the mobile device, a number of the one or more cameras, a presence of an accelerometer, or a measurement of an accelerometer, inertial measurement unit, or gyroscope of the mobile device, and execute the welding simulation based on the resolution of the display, the resolution of the one or more cameras, the size of the image captured by the one or more cameras, the processing capability of the mobile device, the number of the one or more cameras, or the measurement of the accelerometer, inertial measurement unit, or gyroscope of the mobile device.

In some examples, the computer readable instructions, when executed, cause the processor to determine the size of the image captured by the one or more cameras, the resolution of the one or more cameras, or the resolution of the display, and convert the image captured by the camera to a threshold size when the size of the image is greater than the threshold size or the resolution is higher than a threshold resolution. In some examples, the computer readable instructions, when executed, cause the processor to convert the images by at least one of bilinear interpolation or nearest neighbors interpolation. In some examples, the computer readable instructions, when executed, cause the processor to determine the size of the image captured by the one or more cameras, the resolution of the camera, the resolution of the display, or the processing capabilities of the mobile device, and configure a size, resolution, brightness, color property, or other characteristic of the images displayed by the display of the mobile device. In some examples, the computer readable instructions, when executed, cause the processor to determine the processing capability of the mobile device, and configure an output image size, output image resolution, or output image frame rate based on the processing capability.

Examples of conventional systems, apparatuses, and methods for providing a simulated training environment are described in U.S. patent application Ser. No. 14/406,228, which has a § 371(c)(1)(2) date of Dec. 8, 2014, and which is a national stage application of International Patent Application No. PCT/ES2013/070315, filed on May 17, 2013, and entitled "Advanced Device for Welding Training, Based on Augmented Reality Simulation, Which can be Updated Remotely." The entireties of U.S. patent application Ser. No. 14/406,228 and International Patent Application No. PCT/ES2013/070315 are incorporated herein by reference.

FIG. 1 is a block diagram of an example weld training system 100 including a helmet training system 101 configured to hold a mobile device 700 for an augmented (and/or virtual and/or mixed) reality welding simulation. As shown, the example helmet training system 101 includes a welding helmet shell 106, such as a headgear and/or shell of a conventional welding helmet, along with a mobile device 700, an energy storage device 132 (e.g., battery), one or more audio speakers 103, one or more illuminators 128 (e.g., light emitting diodes), one or more heat sinks 138, and one or more secondary cameras 102. In some examples the welding helmet shell 106 may comprise a more traditional helmet, a pair of goggles, a headgear combining goggles and some sort of helmet, and/or some other face and/or head mounted wearable. As shown, the helmet training system 101 also includes a coupling device 134 (e.g., port, cord, connector, etc.) that could be used to connect the helmet training system 101 to an external power source or other device.

In the example of FIG. 1, the helmet training system 101 further includes one or more sensors 122 (e.g., near field communication (NFC) sensor, radio frequency identification (RFID) sensor, short wavelength ultra high frequency radio communication (commonly known as Bluetooth) sensor, etc.). In some examples, the sensors 122 may communicate with one or more complementary sensors 750 in the mobile device 700 (such as shown, for example, in FIG. 7) when in a communication range, so as to detect insertion and/or removal of the mobile device 700 with respect to the helmet training system 101. In some examples, the sensor(s) 122 may be positioned in and/or on a mobile device mount 300 and/or welding helmet shell 106.

In the example of FIG. 1, the mobile device 700 is attached to the welding helmet shell 106 via a mobile device mount 300. As shown, the mobile device 700 includes a display 704 (e.g., touchscreen display) and one or more primary cameras 702. In some examples, the display 704 is configured to display a welding simulation. As shown, the mobile device 700 is oriented within the mobile device mount 108 such that the display 704 is oriented toward the wearer of the welding helmet shell 106, and the one or more primary cameras 702 are oriented in the opposite direction. In some examples, the one or more primary cameras 702 are configured to capture images upon which the welding simulation may be based. As shown, the mobile device mount 300 includes an aperture 622 which allows the primary camera 702 an unobstructed field of view (FOV) 124 to capture images of objects within the FOV 124, such as, for example, a welding tool 200 and/or one or more mock workpieces 202. As described in more detail below, some or all of the FOV 124 of the primary camera(s) 702 may be replicated on the display 704 for presentation to the user to simulate weld training operations.

In the example of FIG. 1, the heat sinks 138 are in contact with the mobile device 700. In some examples, the heat sinks 138 may be configured to conduct away and/or remove heat produced by the mobile device 700 to reduce the chance of overheating, As shown, the heat sinks 138 are part of the mobile device mount 300. In some examples, the heat sinks 138 may be part of the welding helmet shell 106. In some examples, the heat sinks 138 may be comprised of a thermally conductive material, such as graphene, for example. In some examples, one or more surfaces of the heat sinks 138 may be open to the air to help dissipate conducted heat. While two heat sinks 138 are shown in the example of FIG. 1, in some examples, more or less heat sinks 138 may be used.

In the example of FIG. 1, the energy storage device 132, one or more speakers 103, one or more illuminators 128, and one or more secondary cameras 102 are attached to (and/or integrated with) the welding helmet shell 106. In some examples, the secondary camera(s) 102 may be in communication with, coupled to, and/or controlled by the mobile device 700, such as through one or more wired and/or wireless communication protocols. In some examples, some or all of the illuminator(s) 128 and/or speaker(s) 103 may be part of, associated with, in communication with, and/or controlled by the mobile device 700.

In some examples, the illuminator(s) 128 (e.g., light emitting diode(s)) may facilitate image capture by the primary camera(s) 702 and/or secondary camera(s) 102 by illuminating the nearby environment. In some examples, the speaker(s) 103 may emit audio associated with the welding simulation. In some examples, the mobile device 700 may control the illuminator(s) 128 to illuminate objects in the FOV 124, such as the workpiece 202 and/or the welding tool 200. In some examples, the illuminator(s) 128 may comprise active light sources, such as an LED array, for example. In some examples, the illuminator(s) 128 may be activated automatically when the camera(s) 102 and/or camera(s) 702 are taking images and determine that additional lighting would be beneficial (e.g., luminance received at the camera(s) 702 is less than a threshold), so as to conserve battery power of the mobile device 700. In some examples, the illuminator(s) 128 may be activated and/or deactivated through a user interface of the mobile device 700, such as by voice command.

In some examples, the secondary camera(s) 102, speaker(s) 103, and/or illuminator(s) 128 may be powered by the energy storage device 132, mobile device 700, and/or one or more external energy sources connected through coupling device 134. In some examples, the energy storage device 132 may be in electrical communication with and/or provide power to the mobile device 700, and/or vice versa. In some examples, the energy storage device 132 and/or mobile device 700 may be in electrical communication with and/or receive power from an external device through the coupling device 134. In some examples, the helmet shell 106 may include energy storage support features such as a slot to insert and/or retain the energy storage device 132, and/or an electrical connector in which to plug in the energy storage device 132. In some examples, the helmet training system 101 may include a counterbalance clip for support of the energy storage device 132.

In the example of FIG. 1, the welding tool 200 also includes one or more sensors 222, one or more illuminators 206, and one or more speakers 208. In some examples, the one or more sensors 222 may include one or more infrared sensors, ultrasonic sensors, positions sensors, accelerometers, gyroscopes, inertial measurement units (IMUs), NFC sensors, RFID sensors, Bluetooth sensors, magnetometers, and/or other appropriate sensors. In some examples, one or more of the sensors may be integrated with or attached to the welding tool 200. In some examples, one or more of the sensors may be integrated with or attached to the communication module 212. In some examples, the sensor(s) 222 may be configured to sense, measure, and/or detect a position, orientation, and/or motion of the welding tool 200. In some examples, the communication module 212 may be configured to communicate (e.g., to the mobile device) one or more signals representative of data sensed, measured, detected, and/or otherwise obtained by the sensor(s) 222.

In the example of FIG. 1, the illuminator(s) 206 are coupled to a communication module 210 of the welding tool 200. In some examples, the communication module 210 may be configured to attach to and/or detach from the welding tool 200. As shown, the communication module 210 includes a power switch 212 configured to turn the communication module 210 on and/or off. In some examples, one or more of the illuminators 206 may be configured to illuminate and/or blink when the communication module 210 is on or off. In some examples, on or more of the speakers 208 may be configured to output audio (e.g., beeps, chimes etc.) when the communication module 210 turns on and/or off.

In some examples, the communication module 210 may include communication circuitry configured to communicate with the mobile device 700. In some examples, one or more of the illuminators 206 may be configured to light up and/or blink when successful communication is established (e.g., successful pairing), and/or when communication is taking place, between the welding tool 200 (and/or communication module 210) and the mobile device 700. In some examples, one or more of the speakers 208 may be configured to output audio when successful communication is established (e.g., successful pairing), and/or when communication is taking place. In some examples, the welding tool 200 may have sensors that can provide location specific parameters of the welding tool 200 to the helmet training system 101, via the communication module 210. In some examples, the communication module 210 may be authorized for communication over a secure network, and/or may facilitate communication of the mobile device 700 over the secure network.

In some examples, one or more of the illuminators 206 may be configured to facilitate viewing, image capture, and/or recognition of the welding tool 200 by the primary camera(s) 702. In some examples, one or more illuminators 206 may be attached to the welding tool 200 directly, rather than through the communication module 210. In some examples, one or more illuminators 206 may be separate from the welding tool 200 and/or the communication module 210. In some examples, the illuminator(s) 206 may light up and/or blink when the welding tool 200 is activated (e.g., via activation of trigger 209), so as to indicate (e.g., to mobile device 700, camera(s) 702, and/or helmet training system 101) that the activation has taken place.

In the example of FIG. 1, the helmet training system 101 is connected to one or more remote displays 112 and/or one or more remote servers 110 through a network 114 (e.g., the internet). In some examples, the connection may be via the mobile device 700. In some examples, the mobile device 700 may be configured to upload and/or download data (e.g., simulation and/or training data) to/from the remote display(s) 702 and/or remote server(s) 110.

In the example of FIG. 1, the one or more remote servers 110 include memory circuitry 142 and processing circuitry 144 (e.g., comprising one or more processors). In some examples, the memory circuitry 142 and processing circuitry may be in electrical communication with one another. As shown, the memory circuitry 142 stores one or more databases 146 and a weld training management program 1700.

In some examples, the weld training management program 1700 may assist in managing and/or operating the weld training system 100. For example, the remote server(s) 110 may provide assigned weld training exercises to be performed in accordance with a weld training application 800 (further described below) as part of the weld training management program 1700. As another example, the remote server(s) 110 may manage and/or keep track (e.g., via the database(s) 146) of user accounts, as well as exercises, equipment, licenses, and/or other information related to a user account as part of the weld training management program 1700.

In some examples, the one or more databases 146 may store data pertinent to the weld training system 100 and/or weld training management program 1700. For example, the database(s) 146 may store data relating to training assignments, exercises, goals, users, welding tools 200, communication modules 210, licenses, helmet training systems 101, and/or other data. In some examples, the weld training management program 1700 may restrict what welding tools 200 may be used, based on user and/or license authorizations, as discussed further below with respect to FIG. 17. In some examples, the mobile device 700 may download particular assignments, exercises, activity goals (e.g., weld for a certain time, meet a certain quality threshold, perform certain welding tasks in a certain order, etc.), and/or other data from the remote server(s) 110 and/or database(s) 146 via the weld training management program 1700. In some examples, the mobile device 700 may store the results of welding simulations and/or provide the results to the weld training management program 1700, remote server(s) 110, and/or database(s) 146 at scheduled intervals and/or on demand (e.g., in response to a request from the remote server 110 or other device).

Figure 2A:
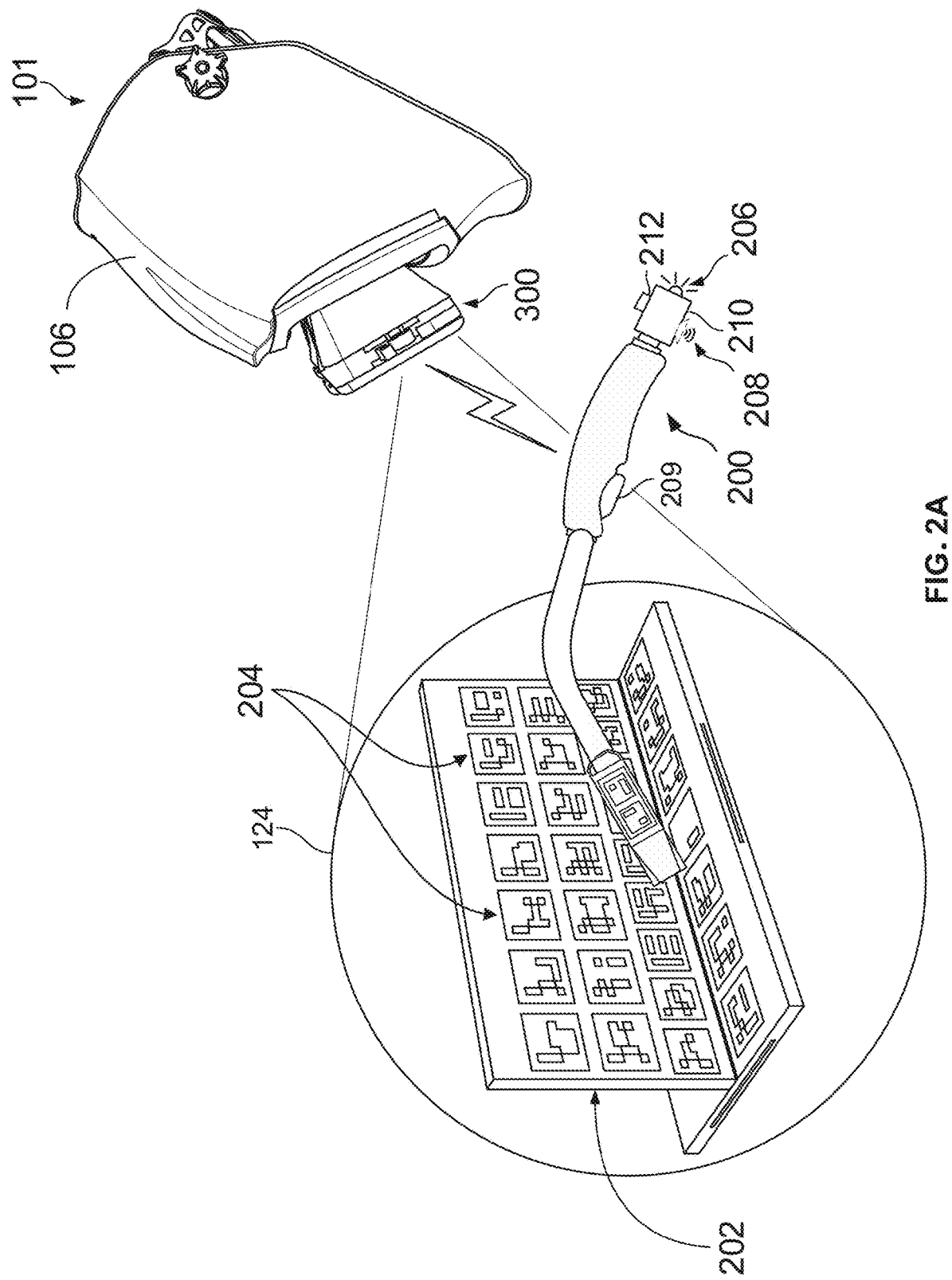
FIG. 2A is a perspective view of an example helmet training system, mock workpiece, and welding tool of the example weld training system of FIG. 1, in accordance with aspects of this disclosure.

FIG. 2A shows an example depiction of the helmet training system 101, with the welding tool 200 and mock workpiece 202 in the field of view 124 of the helmet training system 101. In the example of FIG. 2A, the welding tool 200 is a welding torch or gun, such as a torch or gun configured for gas metal arc welding (GMAW). In some examples, the welding tool 200 may be an electrode holder (i.e., stinger) configured for shielded metal arc welding (SMAW). In some examples, the welding tool 200 may comprise a torch and/or filler rod configured for gas tungsten arc welding (GTAW). In some examples, the welding tool 200 may comprise a gun configured for flux-cored arc welding (FCAW).

In the example of FIG. 2A, the communication module 210 is attached to the welding tool 200. As shown, the communication module 210 includes an illuminator 206 and speaker 208, as well as an on/off switch 212. The welding tool 200 further includes a trigger 209, by which the welding tool 200 may be activated. In some examples, the trigger 209 may be in electrical communication with the communication module 210, and the communication module 210 may be configured to send one or more signals (e.g., to the mobile device 700) when the trigger 209 is activated.

In the example of FIG. 2A, the mock workpiece 202 and welding tool 200 include markers 204 attached thereto. As shown, the markers 204 are pattern markers. In some examples, each marker 204 may be a unique pattern. In some examples, other types of markers 204 may be used (e.g., reflectors and/or light emitting markers such as LEDs). In some examples, the markers 204 may be used by the helmet training system 101 to assist with object recognition, object tracking (e.g., with respect to position, orientation, movement, etc.), and/or other aspects of the weld training simulation.

Figure 2B:
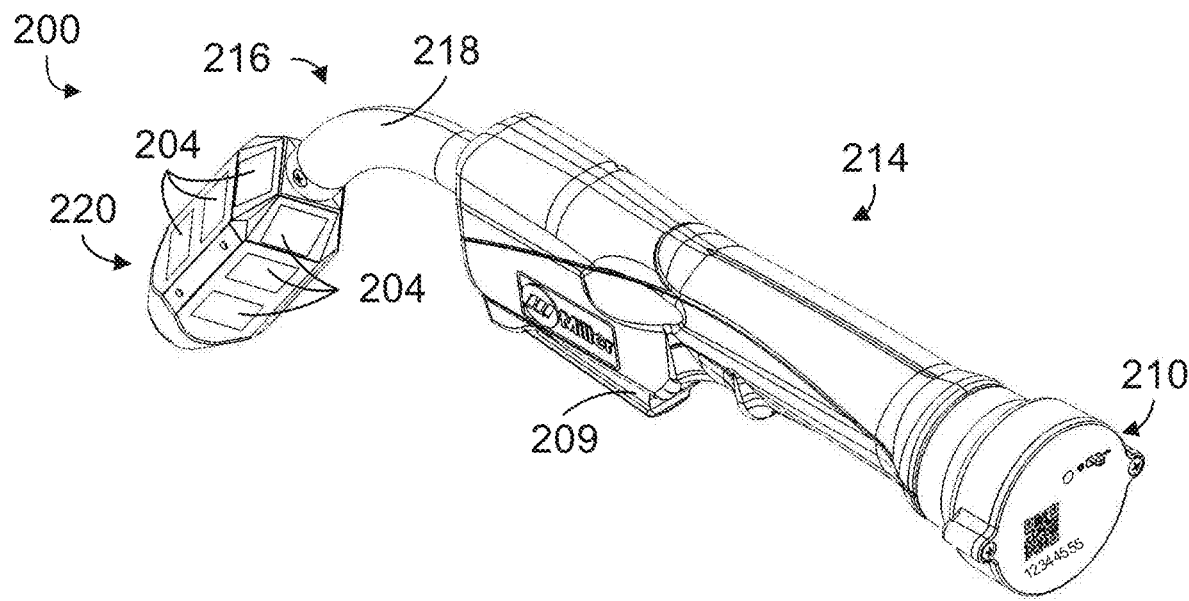
FIG. 2B is a perspective view of an example welding tool that may be used with the weld training system of FIG. 1, in accordance with aspects of this disclosure.

FIG. 2B is another example depiction of the welding tool 200. In the example of FIG. 2B, the welding tool 200 is a mock welding torch or gun, modeled after a torch or gun configured for gas metal arc welding (GMAW). As shown, the welding tool 200 includes a handle 214 having a trigger 209. The communication module 210 is attached to one end of the handle 214. A neck and nozzle assembly 216 is attached to the opposite end of the handle 214. In the example of FIG. 2B, the neck and nozzle assembly 216 includes a gooseneck 218 that attaches to the handle 214, and a nozzle 220 that attaches to the gooseneck 218. As shown, markers 204 are disposed on the nozzle 220. While the markers 204 are shown as simple squares in the examples of FIGS. 2B-2I for simplicity, in some examples, the markers 204 may be pattern markers (such as shown in FIG. 2A) and/or other types of markers.

Figure 2C:
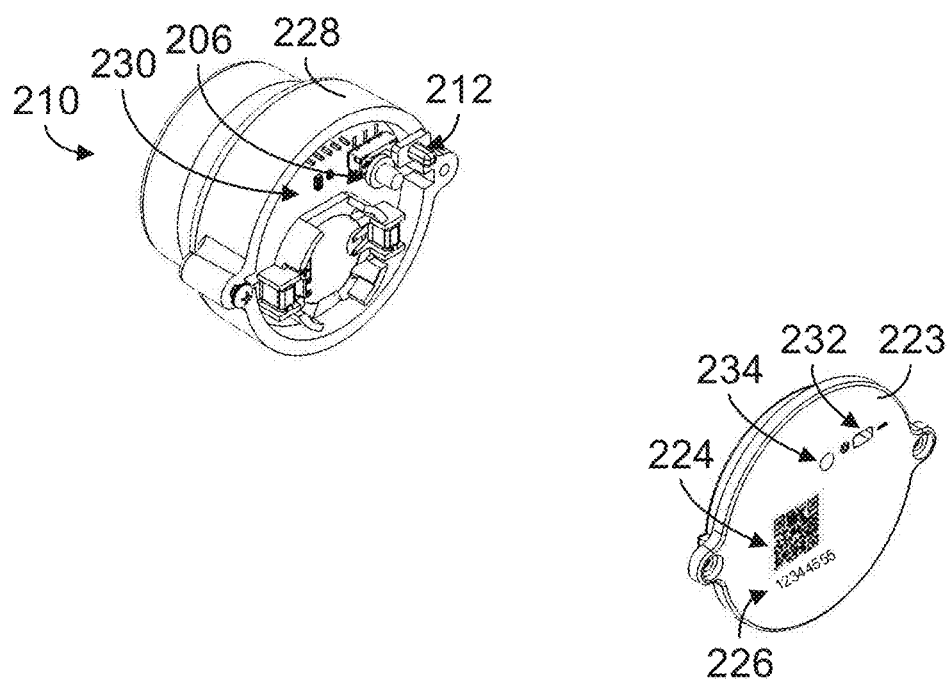
FIG. 2C is a perspective view of an example communication module of the welding tool of FIG. 2B, in accordance with aspects of this disclosure.

FIG. 2C shows an example depiction of the communication module 210 with a cover 223 removed. As shown, the cover 223 includes a QR code 224 and a serial number 226. In some examples, the QR code 224 and/or serial number 226 may uniquely identify the communication module 210, and/or be used for establishing communication (e.g., pairing) between the welding tool 200 and the mobile device 700.

In the example of FIG. 2C, the communication module 210 includes a main housing 228 that houses communication circuitry 230. As shown, the communication circuitry 230 comprises a circuit board retained by the housing 228. The illuminator 206 and switch 212 are also retained by and/or in electrical communication with the communication circuitry 230. In the example of FIG. 2C, the cover 223 further includes a switch aperture 232 through which the switch 212 may extend, and a light aperture 234 through which light from the illuminator 206 may be seen.

Figure 2D:
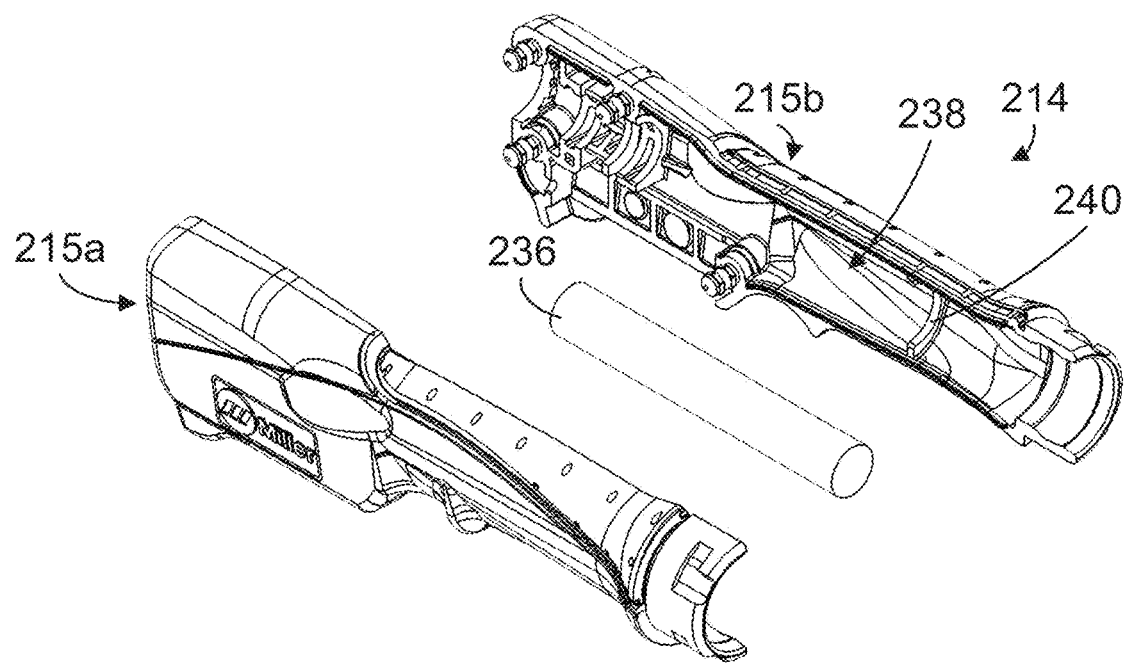
FIG. 2D is an exploded view of a handle of the welding tool of FIG. 2B, in accordance with aspects of this disclosure.

FIG. 2D depicts an exploded view of the handle 214 of the welding tool 200 of FIG. 2B. As shown, the handle 214 comprises a left handle half 215a and a right handle half 215b. In some examples, the handle halves 215 may be held together via fasteners (e.g., nuts, bolts, screws, etc.). In the example of FIG. 2D, a weight 236 is positioned within a cavity 238 that exists within the handle 214, between the handle halves 215. As shown, ribs 240 are formed on the interior of the handle halves 215 to retain the weight 236 within the cavity 238.

Figure 2E:
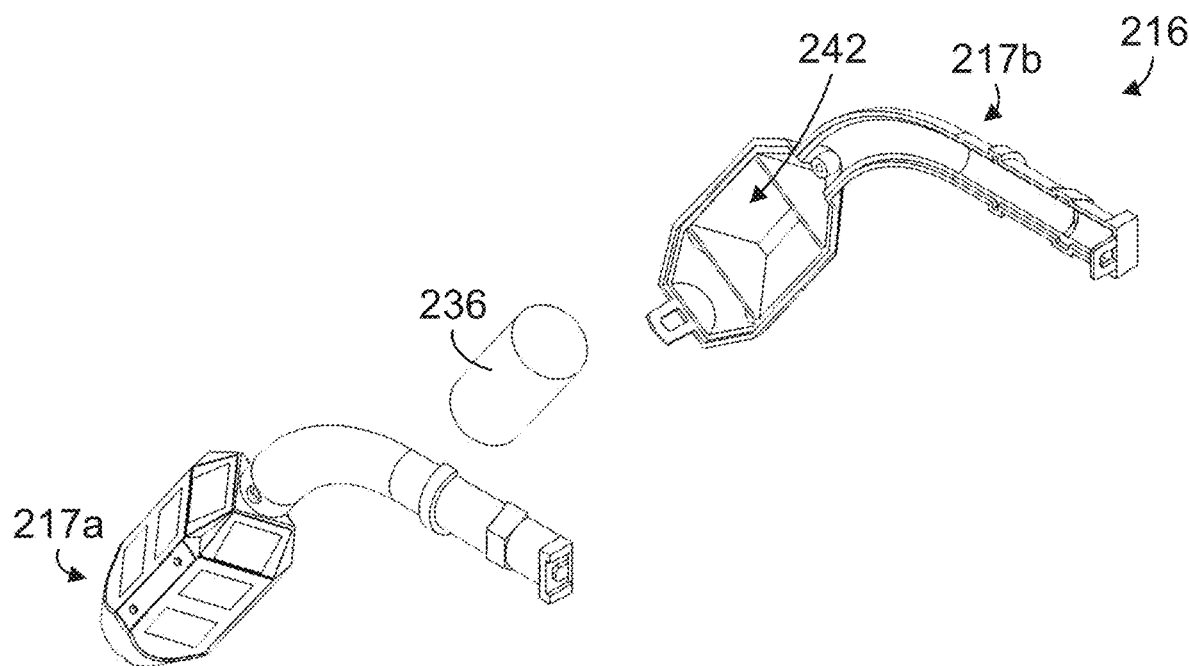
FIG. 2E is an exploded view of a neck and nozzle assembly of the welding tool of FIG. 2B, in accordance with aspects of this disclosure.

FIG. 2E depicts an exploded view of the neck and nozzle assembly 216 of the welding tool 200. As shown, the neck and nozzle assembly 216 is separable into a left neck and nozzle half 217a and a right neck and nozzle half 217b. As shown, another weight 236 is positioned within a chamber 242 defined within an interior of the neck and nozzle halves 217. In some examples, the neck and nozzle halves 217 may be held together via fasteners (e.g., nuts, bolts, screws, etc.).

In some examples, the weights 236 may comprise metal slugs. As shown, the weights 236 are generally cylindrical and sized to fit within the handle 214 and neck and nozzle assembly 216 of the welding tool 200. In some examples, the weights 236 may be configured to add heft to the welding tool 200, making the welding tool 200 feel heavier and/or more realistic, such as in examples where the welding tool 200 is a mock welding tool.

Figure 2F:
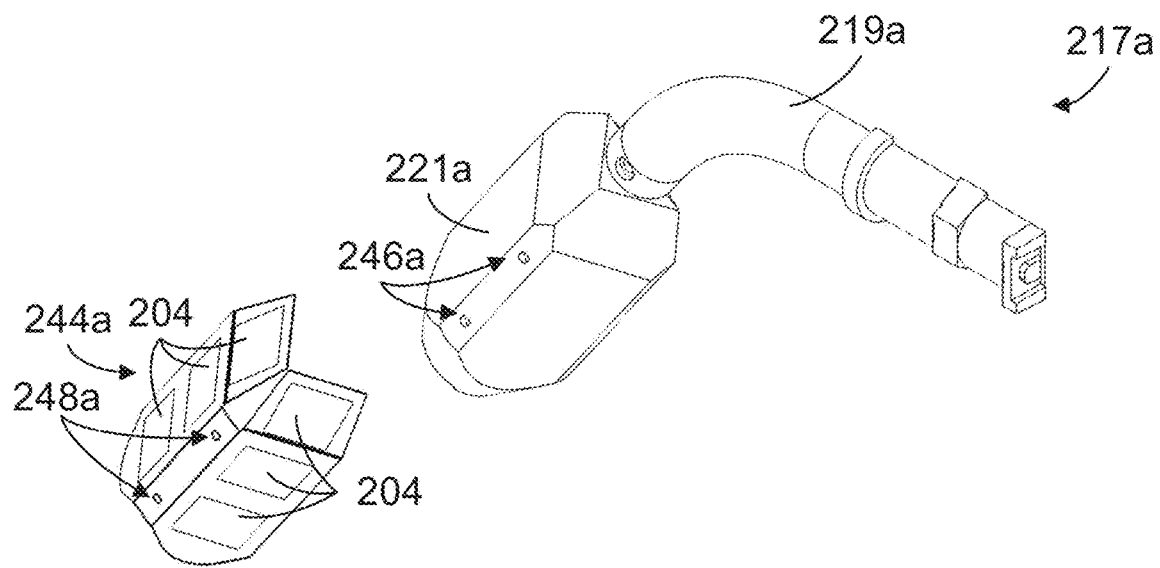
FIGS. 2F-2G are exploded perspective views of each half of the neck and nozzle assembly of FIG. 2E, in accordance with aspects of this disclosure.
Figure 2G:
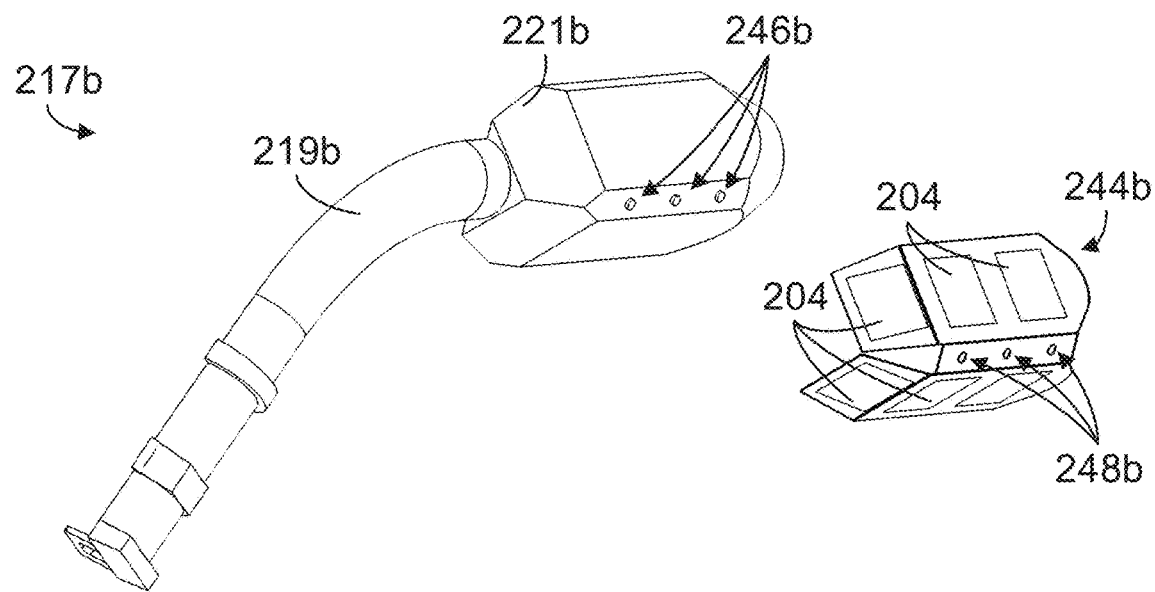

FIGS. 2F and 2G depict two labels 244 separated from the neck and nozzle halves 217. While shown as two separate labels 244a and 244b in the examples of FIGS. 2F and 2G for ease of illustration, in some examples, the labels 244a and 244b may be inseparable parts of one whole, continuous, label 244. In the examples of FIGS. 2F and 2G, each neck and nozzle half 217 includes a nozzle half 221 and a neck half 219. As shown, each nozzle half 221 has a corresponding label 244. Each label 244 is configured to attach and conform to the nozzle half 221 to which it corresponds. In some examples, one or more of the labels 244 may be a sticker with adhesive configured to attach to the nozzle half 221. In some examples, one or more of the labels 244 may be magnetized and/or metal, and configured to attach to the nozzle half 221 via magnetism (e.g., where the nozzle half 221 is magnetized and/or metallic). In some examples, one or more of the labels 244 may be attached to the nozzle half 221 via one or more fasteners (e.g., screws, bolts, pegs, etc.).

In the examples of FIGS. 2F and 2G, a plurality of markers 204 are disposed on each label 244. In some examples, the markers 204 on label 244a may be different than the markers 204 on label 244b, so that the weld training system 100 can distinguish between one side of the welding tool 200 and another. As shown, each nozzle half 221 has identifiers 246 that distinguish the nozzle half 221 from the other nozzle half 221, so that it is easy to tell which label 244 corresponds to which nozzle half 221. In the examples of FIGS. 2F and 2G, the identifiers 246 are holes. In some examples, the identifiers 246 may instead be pegs, pins, numbers, pictures, and/or other suitable identifiers.

In the examples of FIG. 2F, the identifiers 246a are two small pegs formed on the nozzle half 221a. As shown, the label 244a has matching identifiers 248a, which are two small holes. In the examples of FIG. 2G, the identifiers 246b are three small pegs formed on the nozzle half 221b. As shown, the label 244b has matching identifiers 248b, which are three small holes. In this way, the identifiers 244 and/or 246 may indicate a correct configuration for attaching the label(s) 244 to the nozzle 220. In some examples, the label(s) 244 may be attached to the nozzle 220 (and/or nozzle halves 221), at least in part, by connecting the identifiers 246 with the identifiers 248.

Figure 2H:
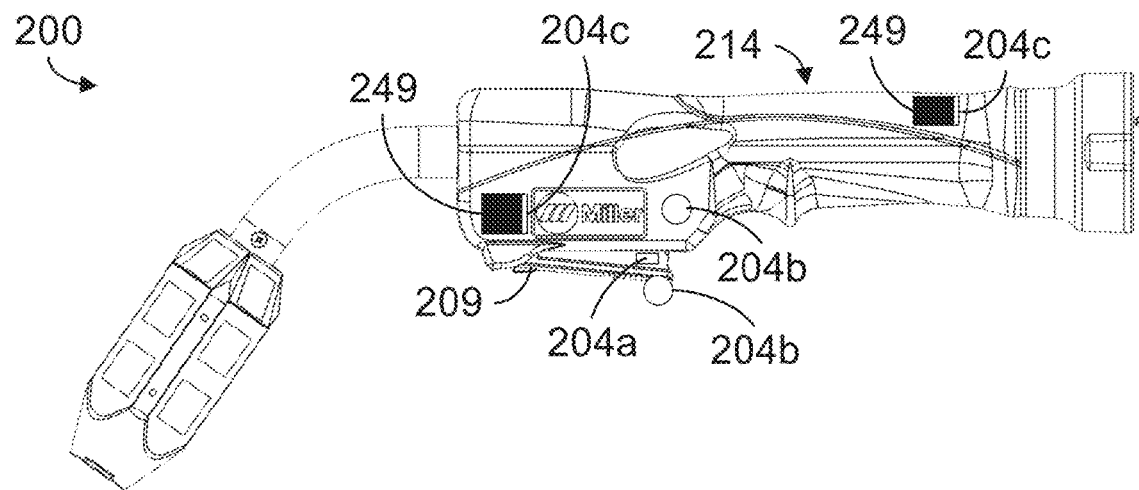
FIGS. 2H-2I are side views of the example welding tool of FIG. 2B, in accordance with aspects of this disclosure.
Figure 2I:
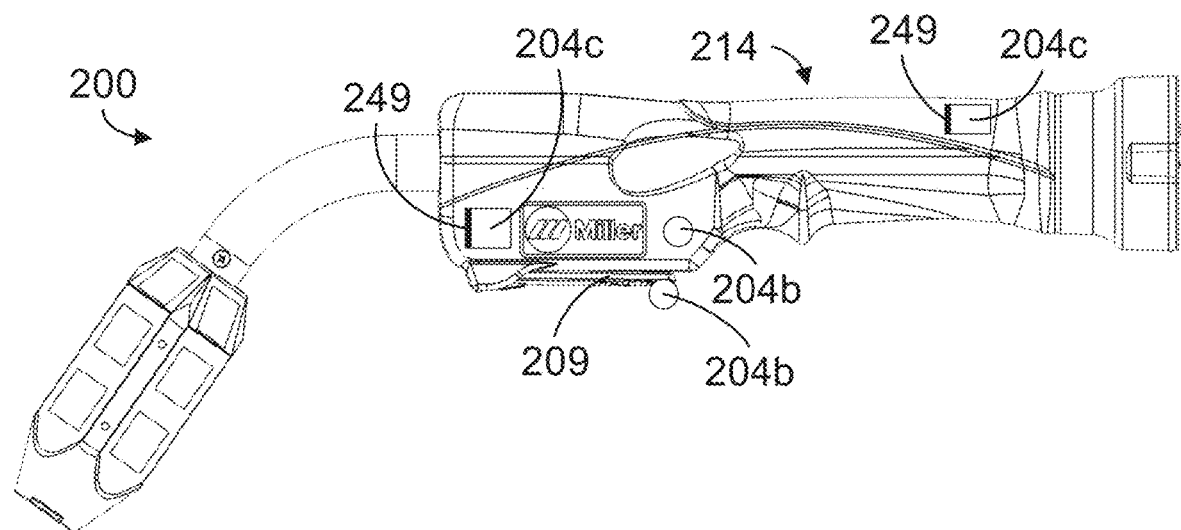

FIGS. 2H and 2I are side views of the welding tool 200, showing how additional markers 204 may be added to the welding tool 200 to help the weld training system 100 detect and/or indicate when the trigger 209 has been activated, without the use of the communication module 210. In some examples, the communication module 210 may be undesirable, ineffective, and/or out of power. In such examples, it may be useful to have another way of indicating and/or detecting that the trigger 209 has been activated.

In the examples of FIGS. 2H and 2I, a marker 204a is disposed on a portion of the trigger 209 that recedes within the handle 214 when the trigger 209 is activated. While only one marker 204a is shown on only one side of the welding tool 200 in the example of FIG. 2H, in some examples, there may be multiple markers 204a on both sides of the welding tool 200. FIG. 2H shows the welding tool 200 with the marker 204a visible on the trigger 209 before the trigger 209 is activated. FIG. 2I shows the welding tool 200 after the trigger 209 is activated. As shown, the marker 204a is no longer visible after the trigger 209 is activated, as the portion of the trigger 209 on which it is disposed has receded into the handle 214. In some examples, the weld training system 100 may detect, indicate, and/or determine whether the trigger 209 has been activated by detecting the presence and/or absence of the marker 204a (e.g., via analysis of one or more images obtained by cameras 102/702).

In the examples of FIGS. 2H and 2I, another marker 204b is attached to an end the trigger 209, at a portion that remains visible and/or outside the handle 214 even when the trigger 209 is activated. A complementary marker 204b is disposed on the handle 214, proximate the trigger 209. While the markers 204b are shown on only one side of the welding tool 200 in the example of FIG. 2H, in some examples, there may be markers 204b on both sides of the welding tool 200.

In the example of FIG. 2H the markers 204b are separated by a first distance before activation of the trigger 209. After activation of the trigger 209 (as shown in FIG. 2I), the markers 204b are separated by a second distance that is less than the first distance, due to the movement of the trigger 209 towards the handle 214. In some examples, the weld training system 100 may detect, indicate, and/or determine whether the trigger 209 has been activated by detecting the distance between the markers 204b (e.g., via analysis of one or more images obtained by cameras 102/702).

In the examples of FIGS. 2H and 2I, markers 204c are disposed on the handle 214 behind movable slides 249. While the markers 204c are shown on only one side of the handle 214 of the welding tool 200 in the example of FIG. 2H, in some examples, there may be markers 204c on both sides of the welding tool 200 and/or on other portions of the welding tool 200. In some examples, the slides 249 may be configured to retract to reveal the markers 204c when the trigger 209 is activated. In some examples, the slides 249 may instead be configured to retract to reveal the markers 204c when the trigger 209 is deactivated. In some examples, one or more of the slides 249 may be in mechanical communication with the trigger 209 through a mechanical linkage that is configured to retract the slides 249 when the trigger is activated or deactivated. In some examples, one or more of the slides 249 may be retracted via an electromechanical actuator in electrical communication with a circuit that is closed (e.g., via a switch) when the trigger 209 is activated or deactivated. In some examples, the weld training system 100 may detect, indicate, and/or determine whether the trigger 209 has been activated by detecting the presence and/or absence of the markers 204c (e.g., via analysis of one or more images obtained by cameras 102/702).

Figure 2J:
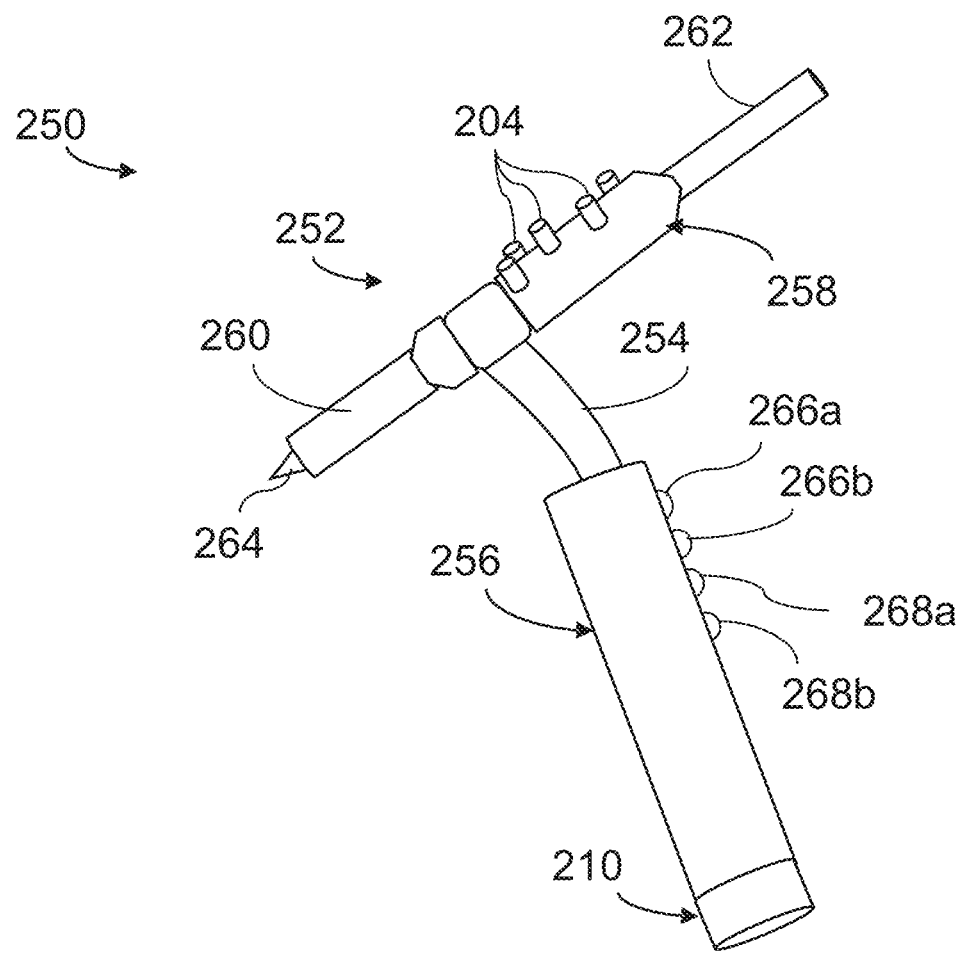
FIG. 2J illustrates an example gas tungsten arc welding (GTAW) torch that may be used with the weld training system of FIG. 1, in accordance with aspects of this disclosure.

FIG. 2J depicts an example gas tungsten arc welding (GTAW) torch 250. In some examples, the GTAW torch 250 may be used in the weld training system 100 as a welding tool 200. In some examples, the GTAW torch 250 may be configured an actual torch, capable of arc welding. In some examples, the GTAW torch 250 may be configured as a mock torch, incapable of arc welding.

In the example of FIG. 2J, the GTAW torch 250 includes a head 252 attached to a handle 256 via a neck 254. In some examples, the handle 256 may include a weight 236, similar to the handle 214 of FIG. 2D. In some examples, the neck 254 may be rigid. In some examples, the neck 254 may be flexible, to allow the head 252 to be reoriented and/or adjusted with respect to the handle 256. As shown, the torch head 252 comprises a body 258 attached to a nozzle 260, and a back cap 262 that extends from the rear of the body 258. In some examples, the nozzle 260 may include a weight 236, similar to the nozzle 220 of FIGS. 2B and 2E. In some examples, the body 258 may be separable from the GTAW torch 250, so that the body 258 may be detached from and/or attached to different torches.

In the example of FIG. 2J, the torch head 252 includes several torch markers 204 attached to the torch body 258. By attaching the torch markers 204 to the body 258 (and/or head 252), the torch markers 204 are ensured to remain in a fixed spatial relationship with a torch tip 264, even if the position/orientation of the head 252 is reoriented and/or adjusted with respect to the handle 256, via the neck 254. In some examples the weld training system 100 may use this fixed spatial relationship to predict, estimate, and/or approximate the position and/or orientation of the torch tip 264 based on the detected position and/or orientation of the torch markers 204.

In the example of FIG. 2J, the GTAW torch 250 includes torch inputs 266, torch outputs 268, and a communication module 210. While two torch inputs 266 and two torch outputs 268 are shown in the example of FIG. 4, in some examples, the GTAW torch 250 may include more or less torch inputs 266 and/or torch outputs 268. In some examples, the torch inputs 266 may comprise buttons, switches, dial, knobs, microphones, and/or other appropriate input mechanisms. In some examples, one or more of the torch inputs 266 may be used as a trigger and/or as a remote control. In some examples, the torch outputs 268 may comprise visual outputs (e.g., display screens, lights, etc.) and/or audio outputs (e.g., speakers).

In the example of FIG. 2J, the GTAW torch includes a communication module 210 attached to the handle 256. In some examples, the communication module 210 may be configured to communicate with the mobile device 700. For example, the communication module 210 may send one or more signals representative of torch inputs to the mobile device 700, and/or receive one or more signals representative of torch outputs from the mobile device 700. In some examples, the GTAW torch 250 may have a QR code 224 and/or serial number 226 imprinted on the handle 214 and/or other portion to facilitate establishment of communication (e.g., pairing) between the communication module 210 and the mobile device 700.

Figure 2K:
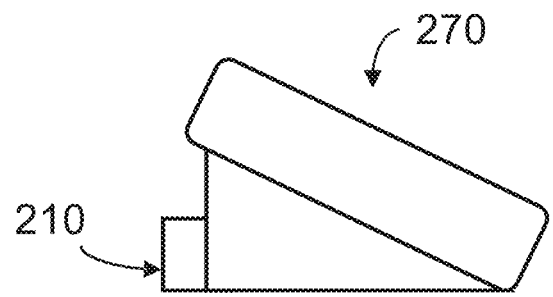
FIG. 2K illustrates an example remote control that may be used with the GTAW torch of FIG. 2J and/or weld training system of FIG. 1, in accordance with aspects of this disclosure.

FIG. 2K shows an example remote control 270 that may be used with the GTAW torch 250. As shown, the remote control 270 is a movable foot pedal. As shown, the remote control 270 also includes a communication module 210 configured to facilitate communication between the remote control 270 and the mobile device 700. In some examples, the remote control 270 may be imprinted with a QR code 224 and/or serial number 226 to facilitate establishment of communication (e.g., pairing) between the communication module 210 and the mobile device 700. In some examples, an operator may depress and/or move the movable pedal to different degrees to command different target levels of welding-type power for delivery to the GTAW torch 250. In some examples, the remote control 270 is configured to detect activation (e.g., depression) and/or movement of the movable pedal, and communicate (e.g., via the communication module 210) one or more signals based on (and/or indicative of) the activation level and/or movement. In some examples, the remote control 270 may be used as a trigger. In some examples, a torch input 266 of the GTAW torch 250 may be used instead of, or in addition to, the foot pedal as a remote control.

FIGS. 2L-2N show example filler rod attachments 280 that may be used in the weld training system 100 with the GTAW torch 100. In particular, the filler rod attachments 280 may be used to retain a filler rod 201, which may be used in GTAW. In the examples of FIGS. 2L-2N, the filler rod attachments 280 comprise markers 204 that may be detected, recognized, and/or tracked by the weld training system 100. As shown, however, the filler rods 201 themselves include no markers 204, making them more difficult to track on their own, without the filler rod attachments 280.

In the example of FIG. 2L, the filler rod attachment 280a comprises a cuboid 282. As shown, the cuboid 282 has several flat interconnecting faces, with markers 204 on several of the faces. As shown, the cuboid 282 has an aperture 284 on one face. The aperture 284 leads to a channel 286 extending partway through the cuboid 282. The channel 286 terminates at or before an end 288 of the cuboid 282. In some examples, the aperture 284 and/or channel 286 may be sized to comfortably and/or snugly receive a portion of a filler rod 201, so as to frictionally retain the filler rod attachment 280a on the filler rod 201.

FIG. 2M shows another example filler rod attachment 280b. In the example of FIG. 5B, the filler rod attachment 280b comprises two spheres 290 connected together via a hollow tube 292. As shown, the sphere 290a includes an opening 294. In some examples, the opening comprises an entrance to a bore in the sphere 290a that is collinear with the hollow tube 292, such that the filler rod 201 may be inserted through the opening 294 (and/or the sphere 290a) into the hollow tube 292. In some examples, a channel extending through the hollow tube 292 may terminate at the sphere 290b. In some examples, the channel may extend partway through the sphere 290b. In some examples, the opening 294, bore extending through the sphere 290a (and/or sphere 290b), and/or hollow tube 292 may be sized to comfortably and/or snugly receive a portion of the filler rod 201, so as to frictionally retain the filler rod attachment 280b on the filler rod 201. In some examples, each sphere 290 may comprise an active or passive marker, so as to facilitate detection (and/or axis projection) by the GTAW training system 100.

FIG. 2N shows another example filler rod attachment 280c. In the example of FIG. 5C, the filler rod attachment 280 comprises two spheres 290 connected together via a solid rod 293, rather than a hollow tube. Instead, a hollow tube 295 is attached to the sphere 290a via an extender rod 296 that extends from the sphere 290a. In the example of FIG. 5C, the extender rod 296 is collinear with the solid rod 293. In some examples, the solid rod 293 may extend through the sphere 290a, and the extender rod 296 may be part of the solid rod 293. As shown, the hollow tube 295 includes an opening 298 configured to receive the filler rod 201. In some examples, the opening 298 and/or hollow tube 295 may be sized to comfortably and/or snugly receive a portion of the filler rod 201, so as to frictionally retain the filler rod attachment 280c on the filler rod 201.

Figure 3A:
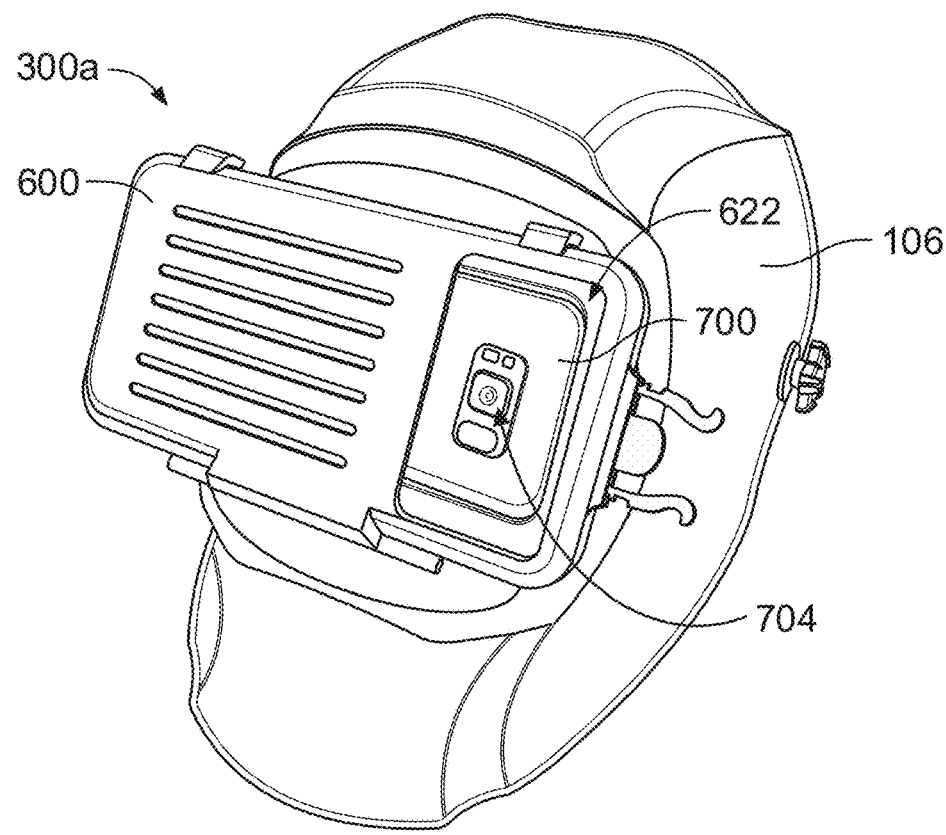
FIGS. 3A and 3B illustrate an example mobile device mount attached to a welding helmet of the example helmet training system of FIG. 2, in accordance with aspects of this disclosure.
Figure 3B:
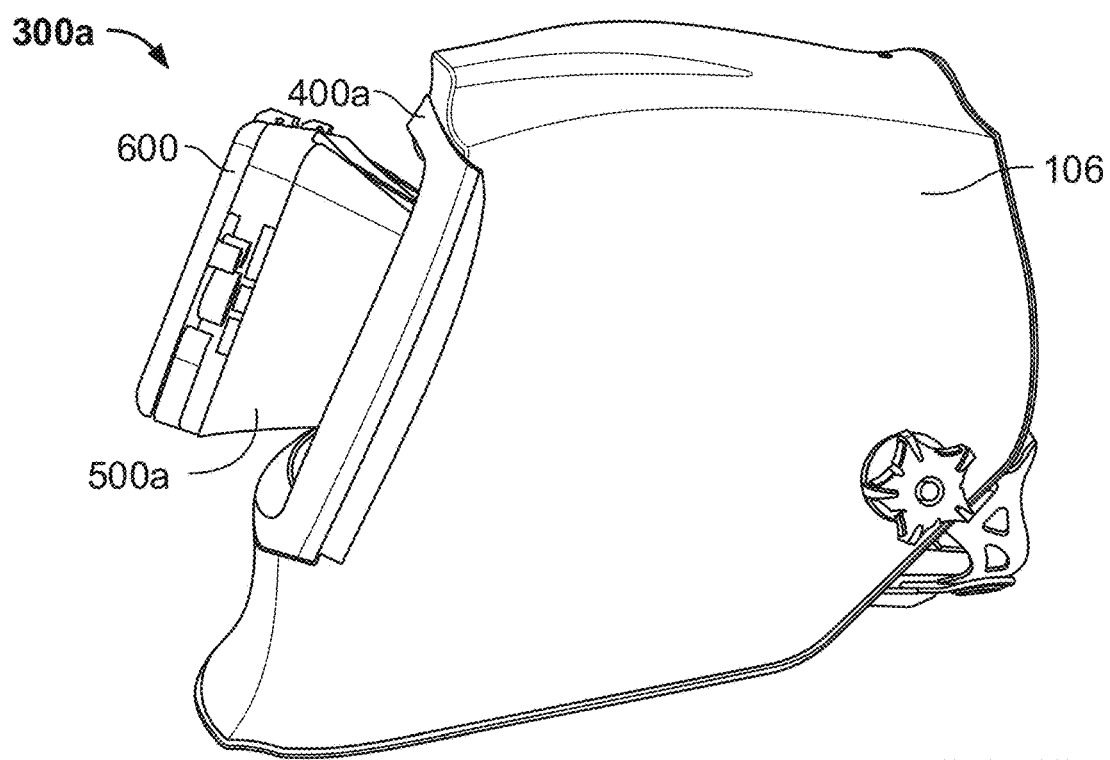
Figure 3C:
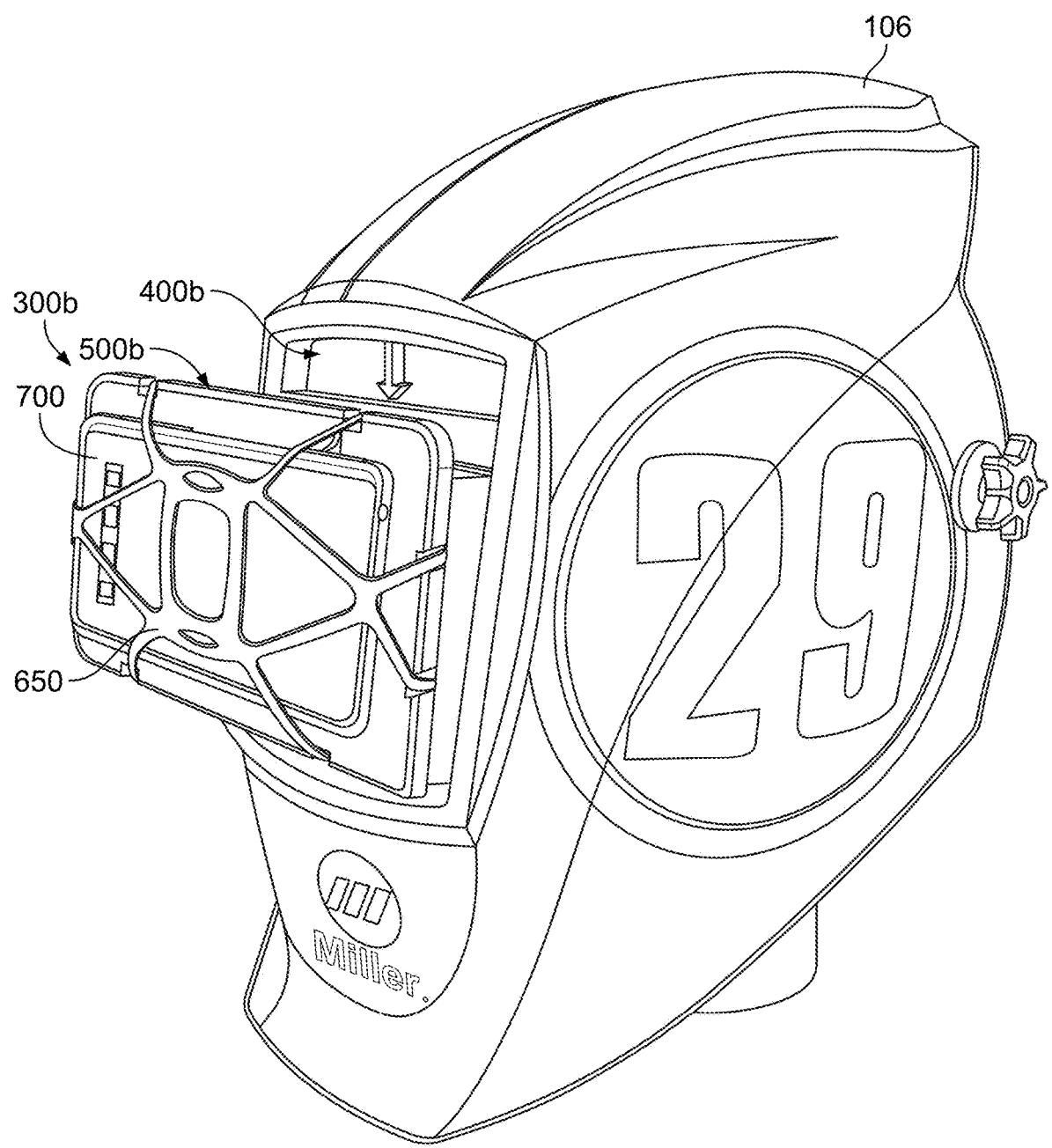
FIG. 3C illustrates an example of an alternative mobile device mount attached to a welding helmet, in accordance with aspects of this disclosure.

FIGS. 3A and 3B show the mobile device 700 attached to the welding helmet shell 106 via a mobile device mount 300a. As described above and in more detail below, the mobile device mount 300a positions the mobile device 700 such that the camera(s) 702 face the same direction as the wearer of the helmet shell 106. The mobile device mount 300a also includes an aperture 622 to allow camera(s) 702 to view the welding scene (e.g., the workpiece 202, the welding tool 200). As illustrated in FIGS. 3A-3B, the mobile device mount 300a includes a shell casing 600, an intermediate shell 500, and a mounting panel 400. FIG. 3C shows an example of an alternative mobile device mount 300b, having a webbing 650 instead of a shell casing 600.

FIG. 4A shows an empty welding helmet shell 106. As shown, the welding helmet shell 106 defines a rectangular opening 152, though in some examples the opening 152 may be a different shape. In the example of FIG. 4A, the welding helmet shell 106 includes connectors 156 around a periphery of the opening 152. In some examples, the connectors 156 may be configured to hold a cheater lens 157 (e.g., a magnification lens) in place over the opening. The welding helmet shell 106 further includes connectors 154 around the periphery of the opening 152. Conveniently, such connectors 154 are used by conventional welding helmets to connect the welding helmet shell 106 to a conventional auto-darkening filter (ADF) (and/or a lens, cartridge, and/or adapter comprising an ADF). While the weld training system 100 of the present disclosure omits a conventional ADF, the weld training system 100 does take advantage of the connectors 154 by using the connectors 154 to attach the mounting panels 400.

Figure 4C:
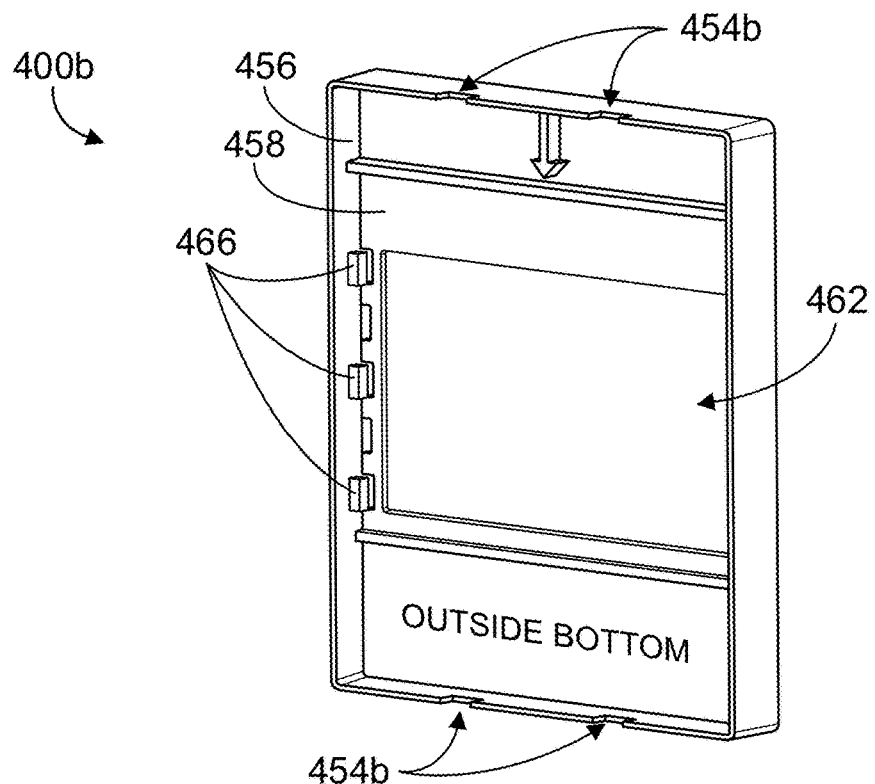
FIGS. 4C-4D are front and rear perspective views, respectively, of an example of an alternative mounting panel, in accordance with aspects of this disclosure.

In the example of FIG. 4B, complementary connectors 454a of the welding helmet filter connector mechanically couple to the connectors 154 of the welding helmet shell 106 to connect the mounting panel 400 to the welding helmet shell 106. In some examples, the connectors 154 of the welding helmet shell 106 may also be used mechanically couple to complementary connectors 454b of the mounting panel 400b shown in the example of FIG. 4C. In some examples, the complementary connectors 454 may comprise hooks, and/or the connectors 154 may comprise protrusions positioned within slots of the welding helmet shell 106 (and/or vice versa). In some examples (e.g., where the welding helmet shell 106 comprises a different head/face mounted wearable wearable), the complementary connectors 454 may attach to different parts of the welding helmet shell 106.

FIG. 4B shows the mounting panel 400a connected to the welding helmet shell 106 via the connectors 154 and complementary connectors 454a. In the example of FIG. 4B, the mounting panel 400a includes a frame 402 that has a rectangular shape that complements that of the opening 152 of the welding helmet shell 106, thereby covering the opening 152. As shown, the frame 402 includes a see-through lens 404. In some examples, the lens 404 may be a Fresnel lens, to improve a perceived field of view provided by the display 704 of the mobile device 700. In some examples, normal lenses require the mobile device 700 to be positioned farther from the wearer, so that the display 704 is not perceived as being too close for comfort (and/or too close for good focus). In some examples, a Fresnal lens may capture more oblique light from a light source than a normal lens, thereby allowing a focal distance between the wearer and the mobile device 700 to be reduced (e.g., thorough a smaller intermediate shell 500). In some examples, a smaller focal distance may also result in a reduced perceived weight of the mobile device 700 on the head of the wearer since it takes less effort to hold a "load" (e.g., the mobile device 700) when it is closer to a "fulcrum" (e.g., the wearer's head). As shown, the frame 402 also includes attachment points 416, such as screw holes, which may be used to attach the shell casing 600a and/or the intermediate shell 500a.

Figure 4D:
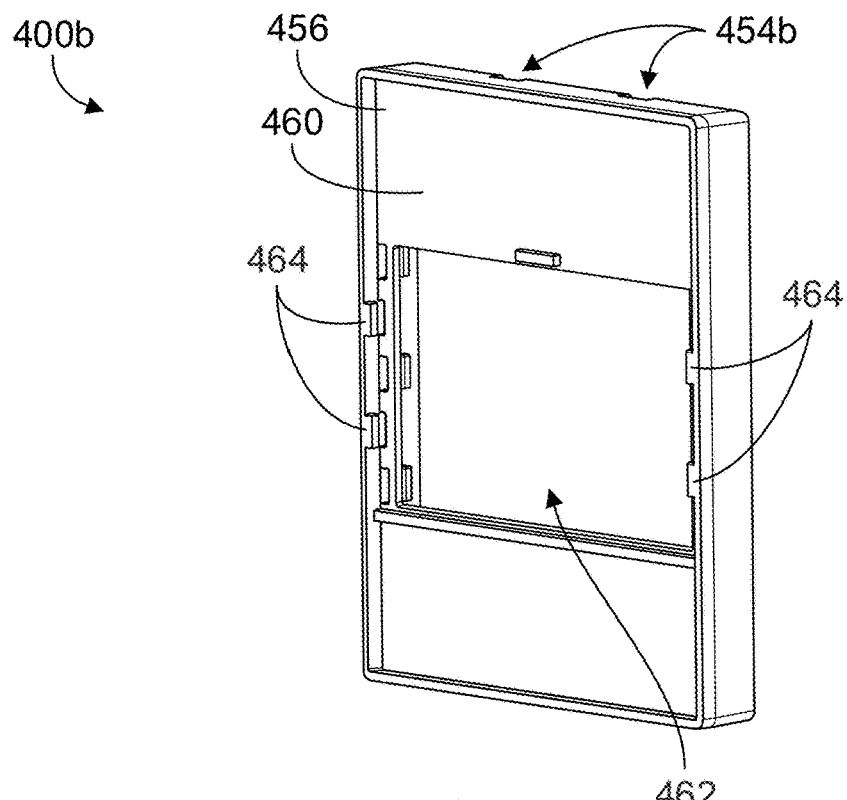

FIGS. 4C-4D show examples of an alternative mounting panel 400b. As shown, the mounting panel 400b includes a frame 456 that also that has a rectangular shape that complements that of the opening 152 of the welding helmet shell 106. FIG. 4C shows a front side 458 of the frame 456 while FIG. 4D shows a rear side 460 of the frame 456. The frame 456 defines a space 462 in both the front side 458 and rear side 460. As shown, the space 462 is rectangular. In some examples, the space 462 may be a different shape.

In the example of FIG. 4D, the rear side 460 of the frame 456 includes tabs 464 along the side of the space 462. In some examples, the tabs 464 may be slightly spaced from the frame 456, thereby defining grooves on both sides of the space 462. In some examples, the lens 404 may be secured within the grooves such that the lens 404 is positioned over the space 462.

In the example of FIG. 4C, the front side 458 of the frame 456 also includes tabs 466 along the side of the space 462. While only shown on one side due to the view in FIG. 4C, in some examples there may be tabs 466 along both sides of the space 462. In some examples, the tabs 466 may be slightly spaced from the frame 456, to define grooves on both sides of the space 462. In some examples, a flange 520 and/or indent 522 of the intermediate shell 500b (further discussed below) may be secured within the grooves such that a lens window 502 of the intermediate shell 500b is positioned over the space 462.

Figure 5A:
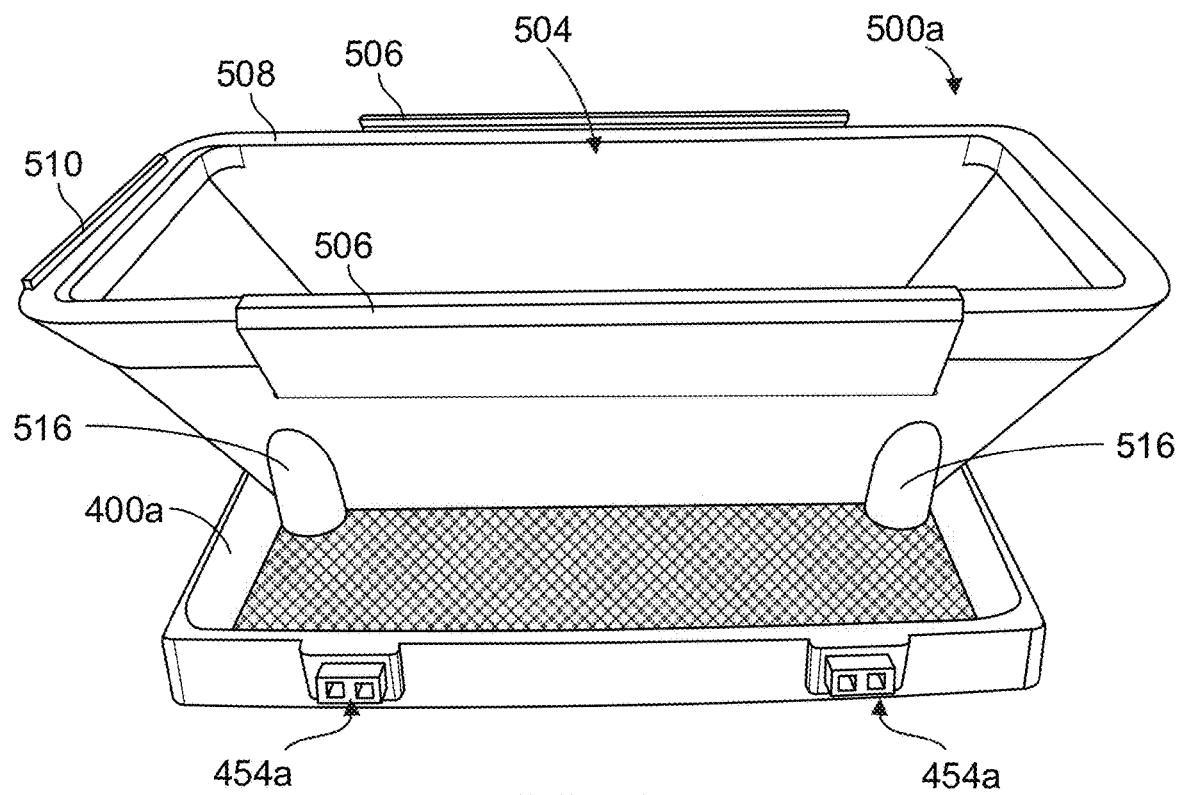
FIG. 5A illustrates an example intermediate shell mounted to the mounting panel of FIG. 4B, in accordance with aspects of this disclosure.
Figure 5B:
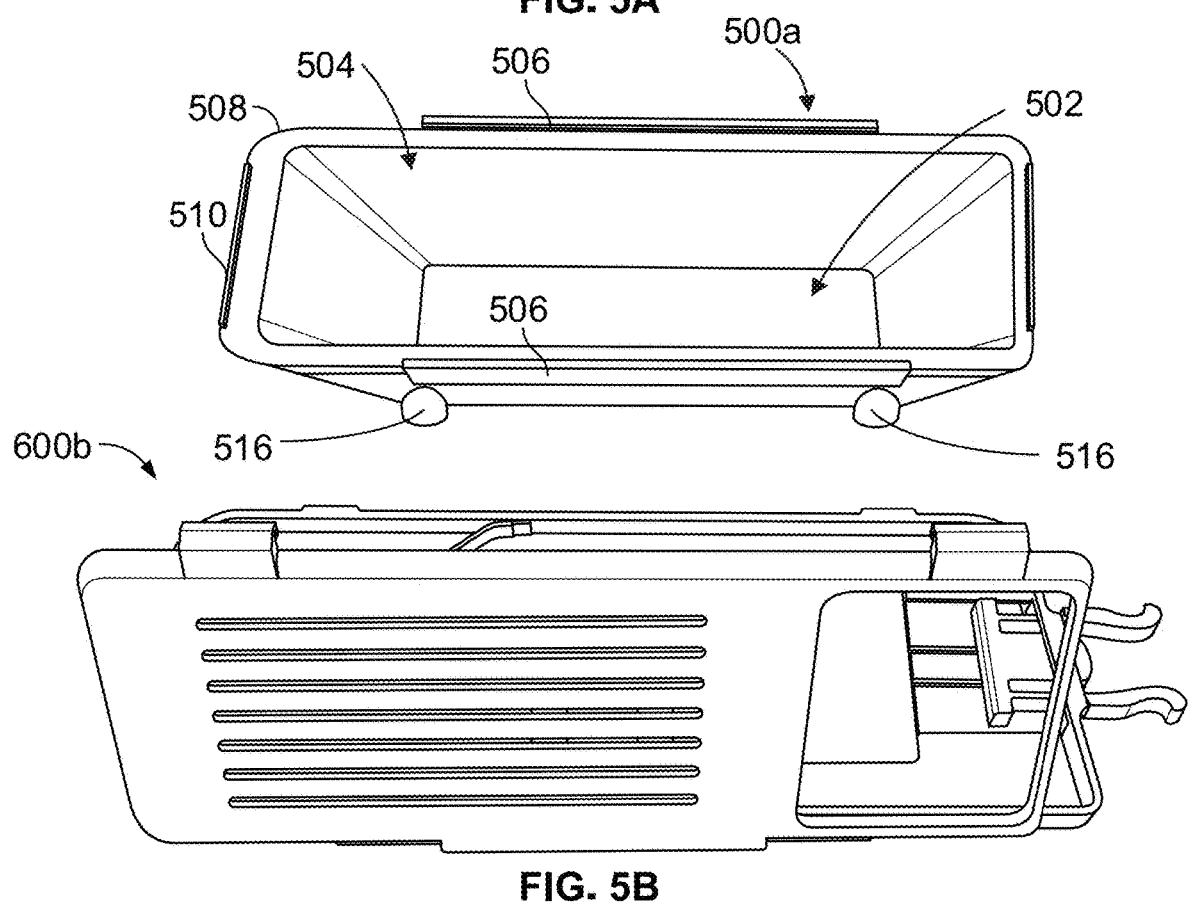
FIG. 5B illustrates an example shell casing and intermediate shell of the mobile device mount of FIGS. 3A and 3B, in accordance with aspects of this disclosure.
Figure 5C:
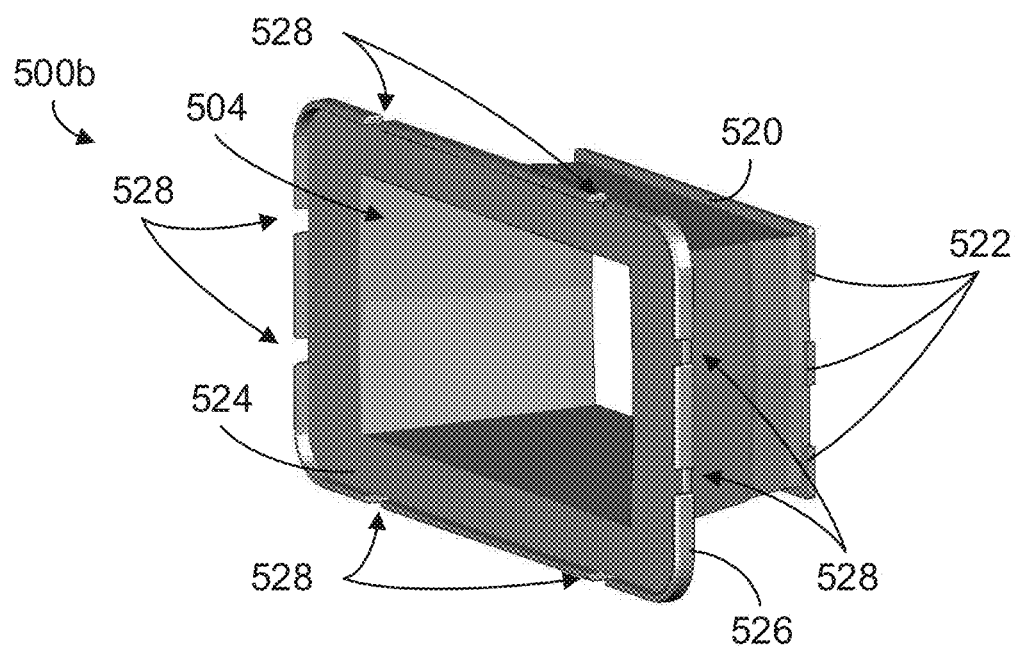
FIGS. 5C-5D are front and rear perspective views, respectively, of an example of an alternative intermediate shell, in accordance with aspects of this disclosure.

FIG. 5A shows an example of the intermediate shell 500a attached to the mounting panel 400a through the attachment points 416. As shown, the intermediate shell 500a includes attachment guides 516 aligned with the attachment points 416. In some examples, the attachment guides 516 may comprise hollow guides to help align attachment mechanisms (e.g., screws) with the attachment points 416. In operation, the intermediate shell 500a may be used to provide an appropriate focal distance between lens 404 of the mounting panel 400 and the display 704 of the mobile device 700. In some examples, the intermediate shell 500a may be adjustable, so that the focal distance may be customized and/or altered. In some examples (e.g., where the welding helmet shell 106 comprises a different head/face mounted wearable), the mounting panel 400a may be omitted, with the intermediate shell 500a attaching directly to the shell 106.

In the examples of FIGS. 5A and 5B, the intermediate shell 500a is a hollow trapezoidal prism with two open ends. As shown, the intermediate shell 500a defines a lens window 502 at one end and a viewing window 504 at the opposite end. The lens window 502 is shaped, sized, and/or otherwise arranged to approximately match and/or complement the lens 404 of the mounting panel 400a. The viewing window 504 is shaped, sized, and/or otherwise arranged to complement the shape, size, and/or arrangement of the shell casing 600a. In the example of FIG. 5A, the intermediate shell 500a is coupled to the mounting panel 400a such that the lens window 502 is aligned with the lens 404.

In the examples of FIGS. 5A and 5B, the intermediate shell 500a defines a viewing window 504 that is larger than the lens window 502. As shown, rails 506 are positioned on opposite sides of a perimeter 508 that defines the viewing window 504. In some examples, the rails 506 are configured to slidingly engage with grooves of the shell casing 600, so as to allow the shell casing 600 to be slid onto and thereby connected to the intermediate shell 500. In the examples of FIGS. 5A and 5B, the intermediate shell 500a further includes a stopper 510 to abut an end of the shell casing 600 and stop sliding engagement.

Figure 5D:
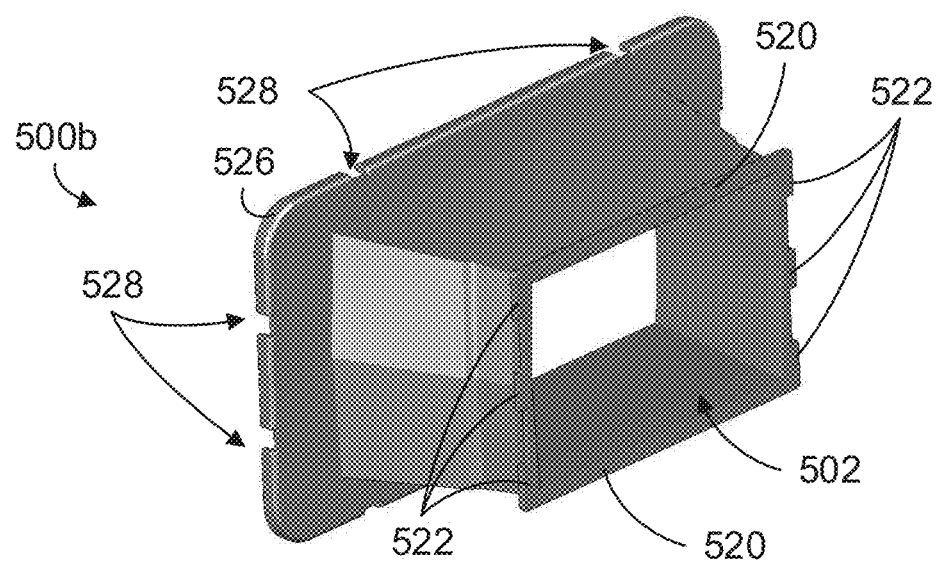

FIGS. 5C and 5D show examples of an alternative intermediate shell 500b. In the examples of FIGS. 5C and 5D, the alternative intermediate shell 500b is a hollow trapezoidal prism with a lens window 502 at one end and a viewing window 504 at the opposite end. The lens window 502 is shaped, sized, and/or otherwise arranged to approximately match and/or complement the space 462 of the mounting panel 400b. The viewing window 504 is shaped, sized, and/or otherwise arranged to complement the shape, size, and/or arrangement of the display 704 of the mobile device 700. As shown, the viewing window 504 is larger than the lens window 502.

In the examples of FIGS. 5C and 5D, a flange 520 is disposed around the periphery of the lens window 502. As shown, the flange 520 intermittently recedes and extends at the sides of the lens window 502, forming indents 522 on the sides of the lens window 502. In some examples, the flange 520 and/or indents 522 may be configured to slide into the grooves formed by the tabs 466 of the mounting panel 400b, so as to secure the intermediate shell 500b to the mounting panel 400b.

In the example of FIG. 5C, a shelf 524 extends around the viewing window 504. In some examples, the shelf 524 provides a surface on which the mobile device 700 may sit, with the display 704 approximately aligned with the viewing window 504 and facing inward towards the lens window 502. As shown, a raised edge 526 extends around a perimeter of the shelf 524 to provide an abutment that defines the limits of lateral movement of the mobile device 700 while seated on the shelf 524. In the example of FIGS. 5C and 5D, holes 528 are formed in the edge 526.

In some examples, the holes 528 may be configured to receive the webbing 650. In some examples, a cushioning material may be formed in and/or positioned on the shelf 524 to provide a buffer between the intermediate shell 500b and the mobile device 700. In some examples, the cushioning material may be a rubber or foam material. In some examples, the cushioning material and/or intermediate shell 500b may be thermally conductive, to operate as a heat sink 138.

Figure 6A:
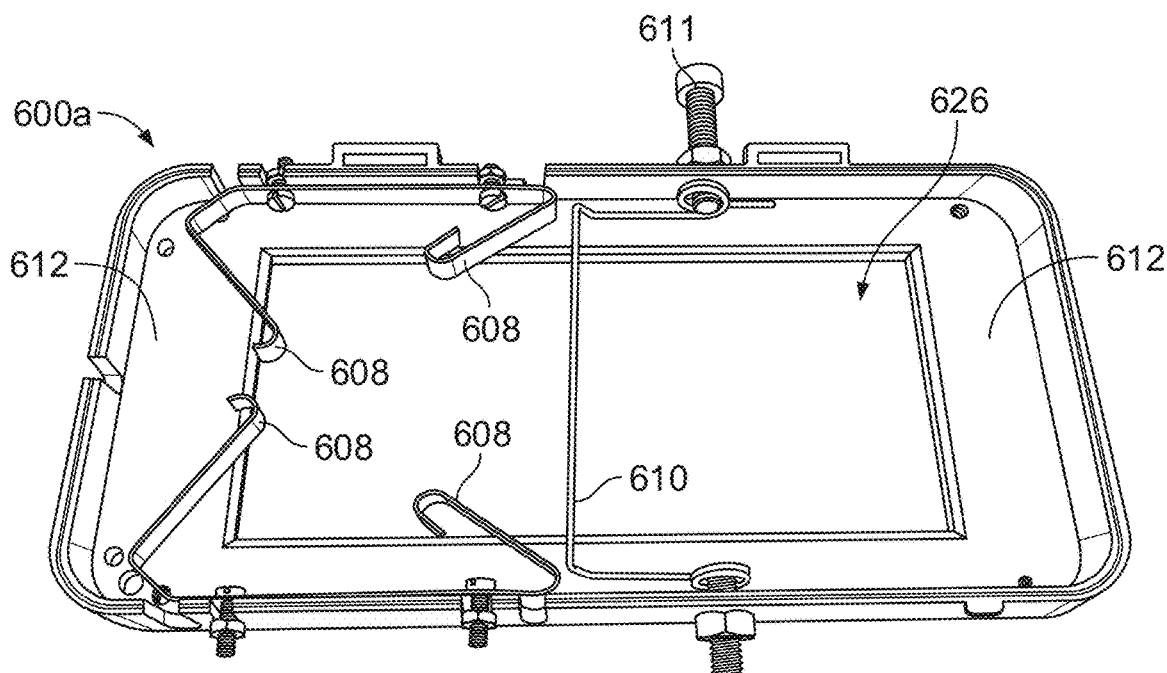
FIG. 6A illustrates an example shell casing of the mobile device mount of FIGS. 3A and 3B, in accordance with aspects of this disclosure.
Figure 6B:
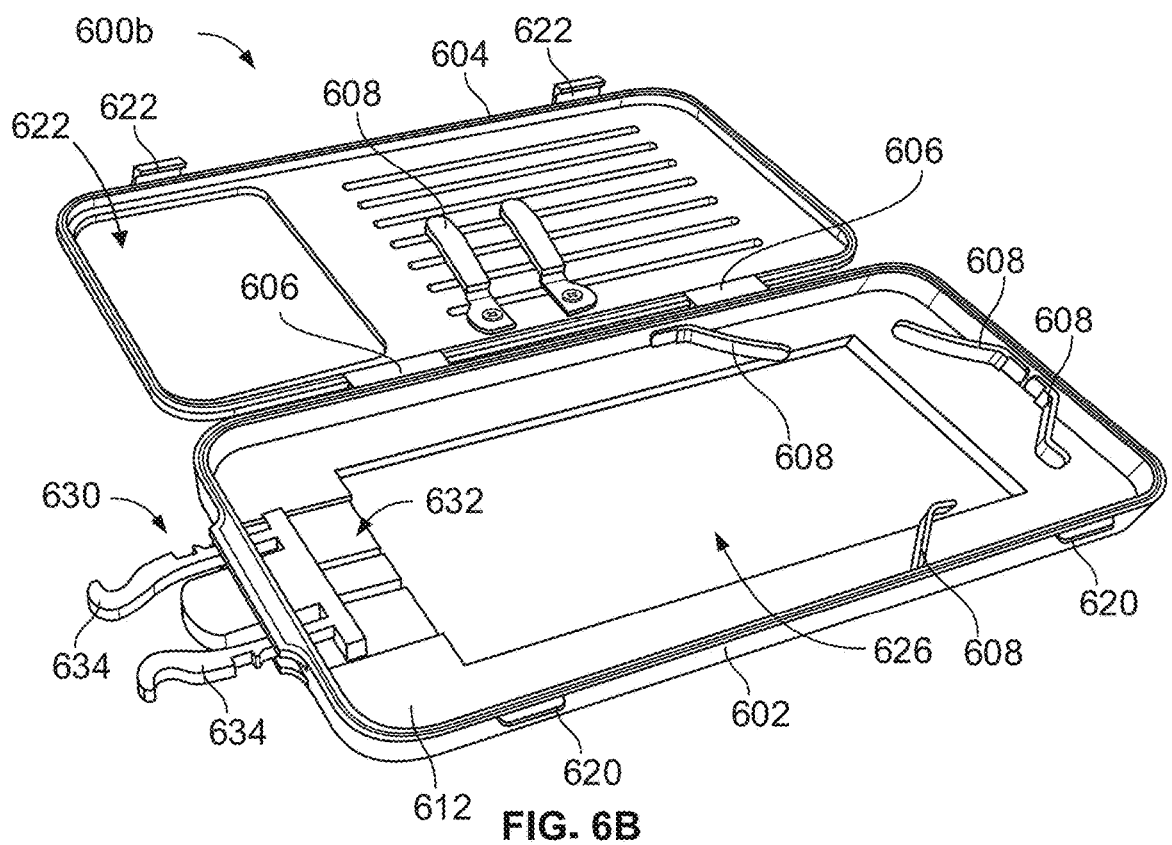
FIG. 6B illustrates another example shell casing of the mobile device mount of FIGS. 3A and 3B, in accordance with aspects of this disclosure.

FIGS. 5B and 6B show examples of an example shell casing 600b. In the examples of FIGS. 5B and 6B, the shell casing 600b is a clamshell design, with a front cover 602 hingedly connected to a back cover 604 at hinges 606. As shown, the front cover 602 includes latches 620 configured to engage clasps 622 of the back cover 604, so as to close the shell casing 600b and secure the mobile device 700 therein. In the examples of FIGS. 5B and 6B, the shell casing 600b is opened for insertion of the mobile device 700. As shown, the shell casing 600b includes the aperture 622 formed in the back cover 604 and a display window 626 formed in the front cover 602. In some examples, the shell casing 600b holds at least one camera 702 of the mobile device 700 aligned with the aperture 622 and the display 704 of the mobile device 700 aligned with the display window 626.

In the examples of FIGS. 5B and 6B, the shell casing 600b includes a harness to hold different mobile devices 700 with different dimensions (and/or size, shape, etc.) in an approximately consistent location with respect to the aperture 622 and/or display window 626. Relative consistency of positioning may help to establish a relatively consistent FOV 124 and/or simulation view for the wearer. As shown, the harness is capable of conforming to a range of smartphone dimensions.

In the examples of FIGS. 5B and 6B, the harness includes lateral springs 608 and an adjustable support 630. In some examples, the lateral springs 608 may be constructed using spring steel, which may resiliently deform based on size, shape, and/or dimensions of the mobile device 700. For example, the springs 608 have more deformation for larger smartphones than smaller smartphones, and hold the smartphone such that the display 702 remains within the viewing port 606. As shown, the lateral springs 608 are attached to the inside surface 612 of the front cover 602 at the sides (e.g., proximate the hinges 606 and latches 620) and top around the display window 626. Lateral springs 608 are also attached to the inside of the back cover 604.

In the example of FIG. 5B, the adjustable support 630 is positioned at the bottom of the front cover 602. As shown, the adjustable support 630 is slidingly movable within a groove 632 formed in the front cover 602, below the display window 626. The adjustable support 630 includes pincers 634 that resist (and/or restrict) movement of the adjustable support 630 until pressed together, at which point the pincers 634 allow movement of the adjustable support 630. In operation, when the mobile device 700 is in the shell casing 600, the lateral springs 608 press against the back, top, and sides of the mobile device 700 while the adjustable support 630 supports the bottom of the mobile device 700. Because the lateral springs 608 and adjustable support 630 are movable, together they may act as a harness to secure different size, shaped, and/or dimensioned mobile devices 700 within the shell casing 600b at relatively consistent positions with respect to the aperture 622 and/or viewing window.

FIG. 6A shows another example shell casing 600a that has a front cover 602 and a retention spring 610 rather than a back cover 604. Thus, there are no lateral springs 608 on a back cover. Additionally, there is no need for an aperture 622 in the back cover (and/or the entire absent back cover can be considered one large aperture). Instead of a back cover 604 to secure the mobile device 700 within the front cover 602, a retention spring 610 is provided. As shown, the retention spring 610 is similar to the spring on a mouse trap. The retention spring 610 is rotatable about screws 611 attached to the retention spring 610 through the front cover 602. In some examples, the screws 611 allow for adjustment of the tension in the retention spring 610. In operation, the retention spring 610 may hold the mobile device 700 against an inner surface 612 of the front cover 602 to keep the mobile device 700 in a consistent position and/or prevent the mobile device 700 from falling out of the shell casing 600.

Figure 6C:
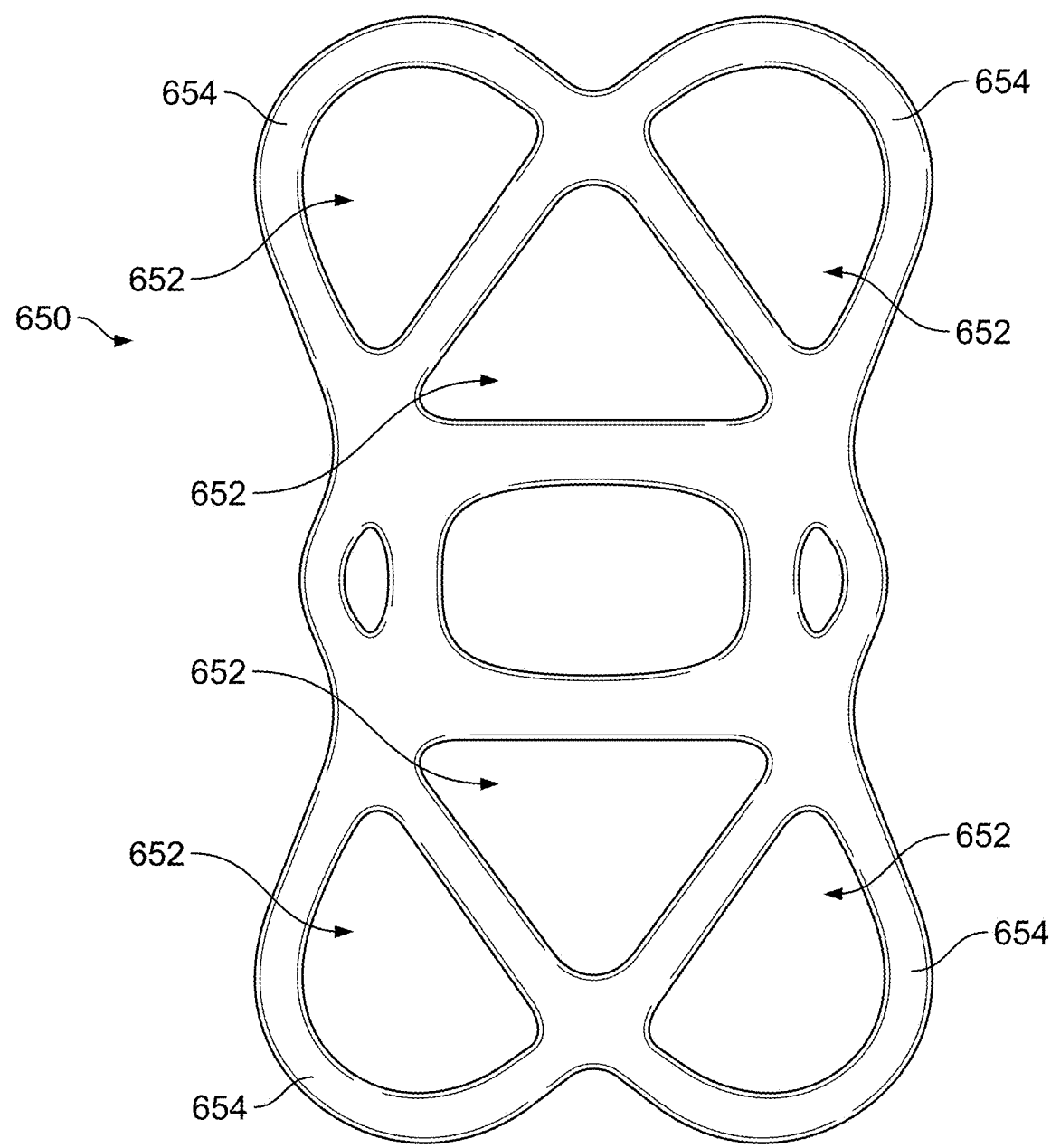
FIG. 6C illustrates an example webbing that may be used with the example alternative intermediate shell of FIGS. 5C-5D, in accordance with aspects of this disclosure.

FIG. 6C shows a webbing 650 that may act as a harness to secure the mobile device 700 on the shelf 524 of the intermediate shell 500b. In some examples, the webbing 650 may be comprised of an elastic material, such as rubber, for example. In some examples, the elasticity may allow the webbing 650 to accommodate and/or hold in place several different sized mobile devices 700. The structure of the webbing 650 also provides for several sizeable gaps 652 in the webbing 650. In some examples, these gaps 652 may allow for the webbing 650 to be arranged such that a camera 702 of the mobile device 700 has an unobstructed view, regardless of the size of the mobile device 700.

In some examples, the webbing 650 may be stretched through the holes 528 of the intermediate shell 500*b* such that corner portions 654 of the webbing engage a rear side of the shelf 524. In such a way, an elastic force of the webbing 650 may secure a mobile device 700 seated on the shelf 524 to the intermediate shell 500*b*, such as shown, for example, in FIG. 3C. The elasticity of the webbing 650 may allow it to accommodate several different sizes of mobile device 700. Gaps 652 in the webbing 650 may additionally provide space for a camera 702 of the mobile device 700 to have an unobstructed field of view 124.

Figure 7:
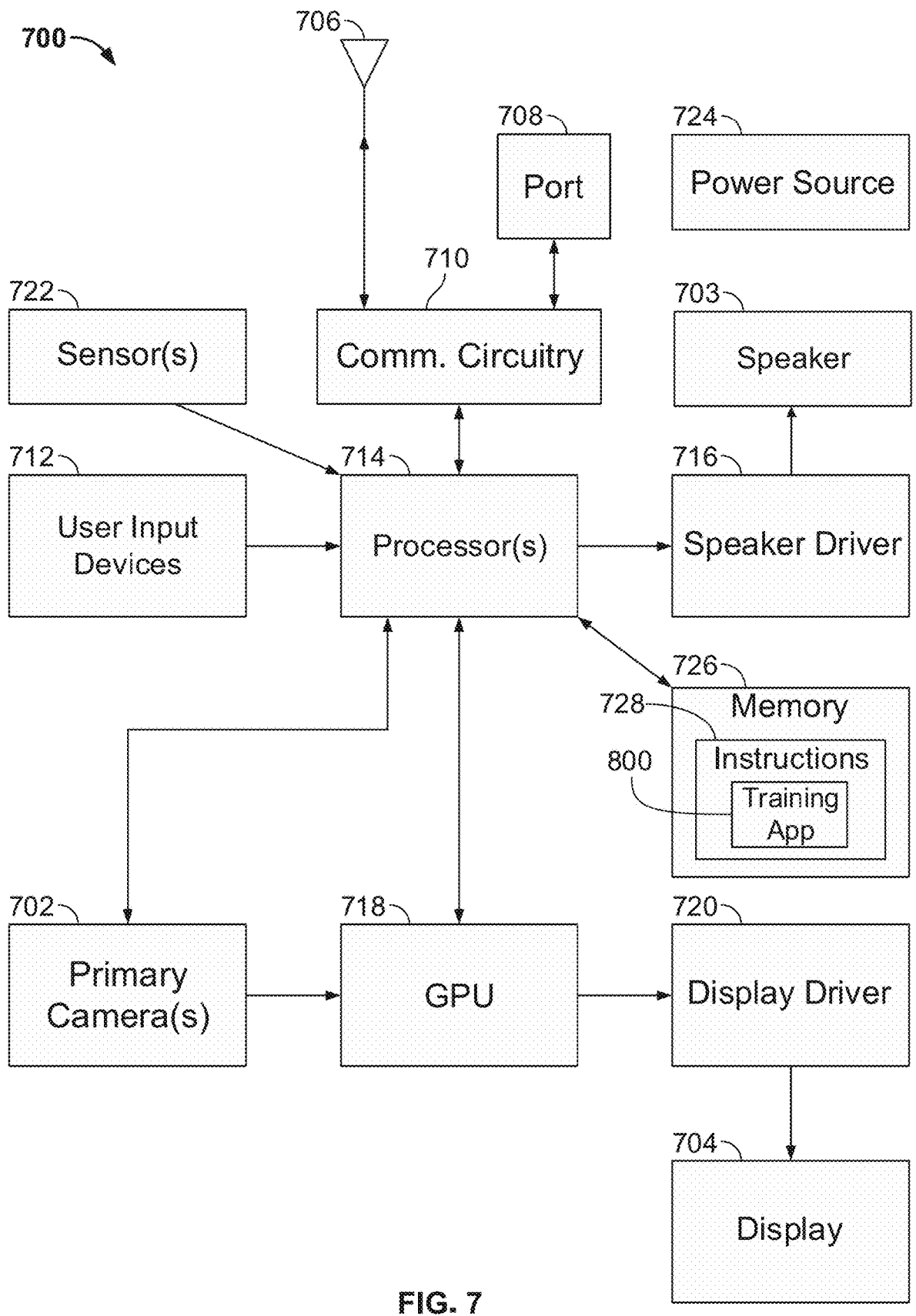
FIG. 7 is a block diagram of an example mobile device of the weld training system of FIG. 1, in accordance with aspects of this disclosure.

FIG. 7 is a block diagram of an example implementation of the mobile device 700 of FIG. 1. As illustrated in FIG. 7, the mobile device 700 includes one or more primary cameras 702, one or more display(s) 704, display driver circuitry 720 (e.g., to drive the one or more display(s) 704), an antenna 706, a communication port 708, communication circuitry 710, user input devices 712, one or more processors 714, a speaker 703, speaker driver circuitry 716 (e.g., to drive the speaker 703), a graphics processing unit (GPU) 718, sensor(s) 722, a power source 724, and memory 726. The components of the mobile device 700 may reside on one or more printed circuit boards (PCBs) and/or flex circuits. In some examples, the power source 724, the primary camera(s) 702, the antenna 706, the port 708, the display 704, and/or the user input device(s) 712 may be realized as subsystems (e.g., implemented on separate PCBs and/or attached to a chassis of the mobile device 700). In some examples, the communication circuitry 710, the processor 714, the speaker driver 716, the GPU 718, the display driver 720, and/or the memory 726 are mounted on one or more PCBs.

In the example of FIG. 7, the one or more processors 714 are in electrical communication with the sensor(s) 722, user input devices 712, communication circuitry 710, speaker driver 716, memory 726, GPU 718, and primary camera(s) 702. The one or more processors 714 are operable to process data from, and/or send data (e.g., control signals) to, these components. Signals from the communication circuitry 710 may include, for example, sensor measurements and/or trigger signals from the welding tool 200. Signals to the GPU 718 may include, for example, signals to control graphical elements of a user interface presented on display 704. Signals from the GPU 718 may include, for example, information determined based on analysis of pixel data captured by camera(s) 102/702.

Though not shown for the sake of simplicity, the power source 724 may be in electrical communication with all components of the mobile device 700, so as to provide power to the components. The power source 724 may comprise, for example, a battery (e.g., a lithium ion or sodium ion or lithium polymer or dual carbon battery), circuitry for charging the battery from an AC and/or DC power source, and circuitry for conditioning/delivering energy from the battery to the other circuitry of the mobile device 700. In some examples, the power source 724 may receive and/or provide power from/to external devices through the port 708.

In some examples, the user input devices 712 may include, for example, one or more touchscreen elements, microphones, physical buttons, gesture controls, biometric sensors, and/or other types of input devices that generate electric signals in response to user input. For example, user input devices 712 may include capacitive, acoustic, inductive, and/or resistive touchscreen sensors that enable a user of the mobile device 700 to interact with user graphics displayed on the front of the display 704.

In some examples, the speaker driver circuitry 716 conditions (e.g., converts to analog, amplifies, etc.) signals from the processor 714 for output to one or more speakers 703. Such signals may, for example, carry audio to alert a user of the mobile device 700 that a welding parameter is out of tolerance, that a weld is being performed out of sequence, to provide audio instructions to the user, to simulate welding sounds, and/or any other audio.

The sensor(s) 722 may include infrared and/or ultrasonic sensors, accelerometers, gyroscopes, inertial measurement units (IMUs), NFC sensors, RFID sensors, Bluetooth sensors, and/or the like. The sensors 722 may include one or more inertial measurement units (IMUs) such as multi-axis gyroscopes, multi-axis accelerometers, and/or multi-axis magnetometers to detect, encode, and/or measure movement of the mobile device 700 (e.g., turning, vibration, traveling and shaking of the helmet as the wearer's head moves to follow the arc). The sensor(s) 722 may, for example, be operable to track head movement of the weld operator and/or insertion/removal of the mobile device 700 from the helmet training system 101.

In some examples, the display driver circuitry 720 generates control signals (e.g., bias and timing signals) for the display 704 and/or conditions (e.g., level control synchronize, packetize, format, etc.) pixel data from the GPU 718 for conveyance to the display 704. In some examples, the display 704 may include, for example, a liquid crystal display (LCD), light emitting diode (LED) display, organic light emitting diode (OLED) display, and/or any other suitable type of display operable to convert electrical signals into optical signals viewable by a user of the mobile device 700.

In some examples, the GPU 718 determines pixel data to be outputted the display 704 based on direction, commands, control signals, and/or other data provided by the processor 714. In some examples, the GPU further receives and/or processes image/pixel data (e.g., of stereoscopic or two-dimensional images) from the camera(s) 102/702 to, for example, recognize markers on the workpiece 202 and/or the welding tool 200. The processing of pixel data by the GPU 718 may comprise, for example, analyzing the images and/or pixel data to determine, in real-time, one or more markers 204 on the simulated workpiece(s) 202 and/or the welding tool 200. In some examples, the GPU 718 may determine one or more physical relationships (e.g., relative position, orientation, movement, etc.) between the camera(s) 102/702, the mock workpiece(s) 202, and/or the welding tool 200, based on known and/or detected sizes, positions, and/or orientations of the markers 204. The GPU 718 and/or the processor(s) 714 may divide these tasks as appropriate (e.g., to take advantage of optimizations that can be provided by the GPU 718 and/or the processor 714).

In some examples, 3D positioning information may be obtained through processing of the captured images (e.g., via computer vision techniques) by the processor(s) 714 and/or GPU 718. In some examples, the camera(s) 102/702 capture images used to implement the welding simulation, and the camera captured images may be analyzed, at least in part, by extrapolating on known relationships between objects visible in the images (e.g., respective marker sizes and/or locations on a welding tool and/or workpiece). In some examples, a portion of the images captured by the camera(s) 102/702 are displayed to the user, and another portion of the images captured by the camera(s) 102/702 are augmented to provide the welding simulation.

In some examples, the camera(s) 102/702 may include one or more lenses, filters, and/or other optical components for capturing electromagnetic waves in one or more spectra, such as, for example, infrared, visible, and/or ultraviolet. In some examples, the one or more cameras 102/702 may have a high dynamic range (HDR), a medium dynamic range, or a wide dynamic range (WDR) imaging array that has logarithmic response at each pixel in a single frame time, with a dynamic range exceeding 120 decibels (dB) to >140 dB. In some examples, the helmet training system 101 and/or mobile device 700 may include different and/or adjustable camera lenses. In some examples, the helmet training system 101 may configure the camera(s) 102/702 (and/or determine a correct camera configuration) at startup based on captured images of the mock workpiece 202 and/or welding tool 200. The configuration may help to determine the correct camera positioning, zoom, and/or focus over the course of the simulated weld process.

In some examples, the one or more primary cameras 702 and/or one or more secondary cameras 102 may implement a stereoscopic tracking and/or display system. In a stereoscopic display system, images are displayed to a user from two slightly different viewpoints (e.g., with one viewpoint presented to one eye and the other viewpoint presented to the other eye), so as to simulate the way each eye on a human captures a slightly different viewpoint. In a stereoscopic tracking system, two or more cameras may be used to more accurately and/or precisely track objects captured in camera images. In some examples, stereoscopic tracking systems may enable calculations of the dimensions of the field of view based on the four corners of the image. For example, a stereoscopic tracking system may calculate the real-world coordinates of the image points based on a pre-determined (and/or pre-calibrated) spacing between the cameras or optical sensors, and calculate the real-world distance between the points.

In some examples, the one or more primary cameras 702 may comprise two or more cameras implementing a stereoscopic tracking and/or display system configured to capture stereoscopic images. In some examples, the one or more primary cameras 702 may comprise a single camera that provides a first perspective of a stereoscopic tracking and/or display system, while a second perspective of the stereoscopic tracking and/or display system is provided by the secondary camera(s) 102. In some examples, the one or more primary cameras 702 may comprise a first camera perspective, and the second camera perspective may be simulated (e.g., via appropriate simulation techniques stored in memory 726 and/or executed by processor(s) 714) to create a stereoscopic display system.

In the example of FIG. 7, the communication circuitry 710 is configured to communicate with external devices, such as, for example, the welding tool 200, communication modules 210, illuminator(s) 128/206, speaker 103, remote display(s) 112, and/or remote server(s) 110. As shown, the communication circuitry 710 is in electrical communication with the processor(s) 714, the antenna 706, and the port 708 for transmit and receive operations. The antenna 706 may be any type of antenna suited for the radio frequencies, power levels, etc. used by the communication link. The communication port 708 may comprise, for example, an Ethernet, a USB port, an HDMI port, a fiber-optic communications port, and/or any other suitable port for interfacing with a wired or optical cable. In some examples, the port 708 is a multi-purpose port which can be used for powering external devices, receiving power from an external source, and/or providing communications and/or control signals.

In some examples, for transmit operations, the communication circuitry 710 may receive data from the processor 714, packetize the data, and convert the data to physical layer signals in accordance with protocols in use. For data receiving operations, the communication circuitry 710 may receive physical layer signals via the antenna 706 and/or port 708, recover data from the received physical layer signals (demodulate, decode, etc.), and provide the data to the processor 714. The received data may include, for example, sensor measurements by the welding tool 200, trigger signals from the welding tool 200, and/or training simulation operational configurations from the remote server 110. The transmitted data may include, for example, training simulation results, simulation graphics, control signals for controlling the illuminator(s) 128 and/or speaker 103, and/or such communications with other external devices.

In some examples, the communications circuitry 710 includes a wireless (e.g., Zigbee, Bluetooth®) coordinator that receives a notification of a trigger pull event (e.g., from the welding tool 200) and sends the signal to the processor 714 (e.g., a wireless node). In response, the processor 714 may enable a WiFi radio of the communications to enable transmission of media (e.g., video and/or audio) via higher-bandwidth protocols such as FTP, HTTP, and/or any other protocol.

In some examples, the mobile device 700 (e.g., via the processor 714 and the communications circuitry 710) provides media (e.g., video, audio, weld training data) to one or more cloud servers (e.g., the remote server 110) to store and/or process the media. The mobile device 700 may implement HTTP and/or FTP servers to enable data transfer. In some examples, the processor 714 stores the media in a local flash memory and/or other nonvolatile memory inside the helmet training system 101 (e.g., in the memory 726).

Figure 8A:
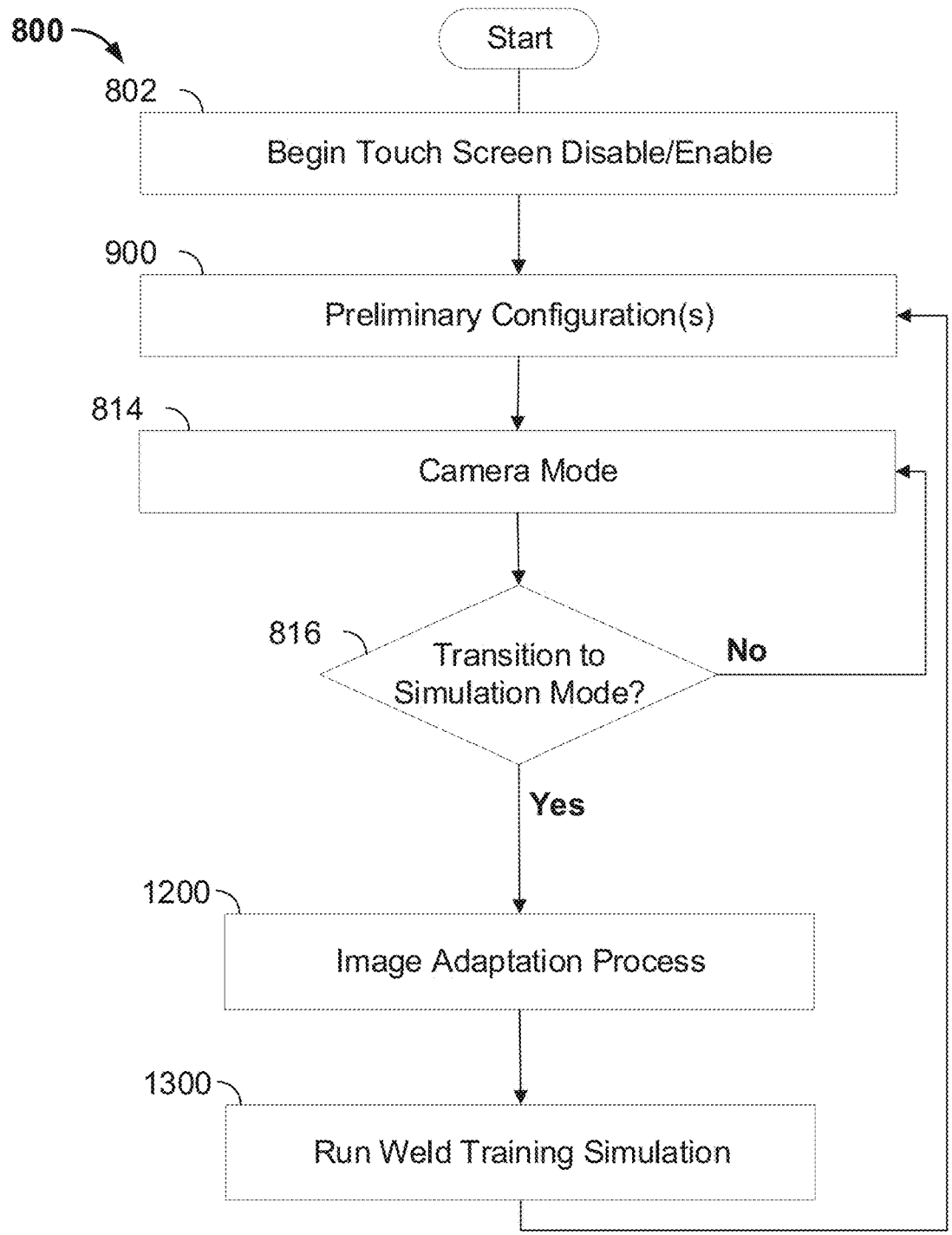
FIG. 8A is a flowchart representative of example machine readable instructions which may be executed to execute a weld training application, in accordance with aspects of this disclosure.

In the example of FIG. 7, the memory 726 stores machine-readable instructions 728 which may be executed by the processor 714 to implement the examples disclosed herein. As shown, the instructions 728 include instructions for a weld training application 800. FIG. 8A is a flowchart representative of example machine readable instructions which may be executed by the example mobile device 700 (e.g., via processor 714 and/or other components) to perform the weld training application 800.

In the example of FIG. 8A, the weld training application 800 begins at block 802, where the weld training application 800 begins a touch screen disable/enable loop 802. The touch screen disable/enable loop 802 continually checks to see whether there has been a command to disable (or enable) the touch sensitive functions of the display 704 of the mobile device 700. In some examples, a user may wish to disable the touch sensitive functions of the display 704 of the mobile device 700 so as to avoid inadvertent touch screen selections when coupling the mobile device 700 to the helmet training system 101. As the touch sensitive functions of the display 704 may be difficult to use when the mobile device 700 is coupled to the helmet training system 101, there may be little drawback to disabling. In some examples, a user (or the weld training application 800) may re-enable the touch sensitive functions when a certain time has passed, the training has concluded and/or the mobile device 700 is removed from the helmet training system 101. In some examples, the touch screen disable/enable loop 802 may run continually throughout the entirety of the weld training application 800.

Figure 8B:
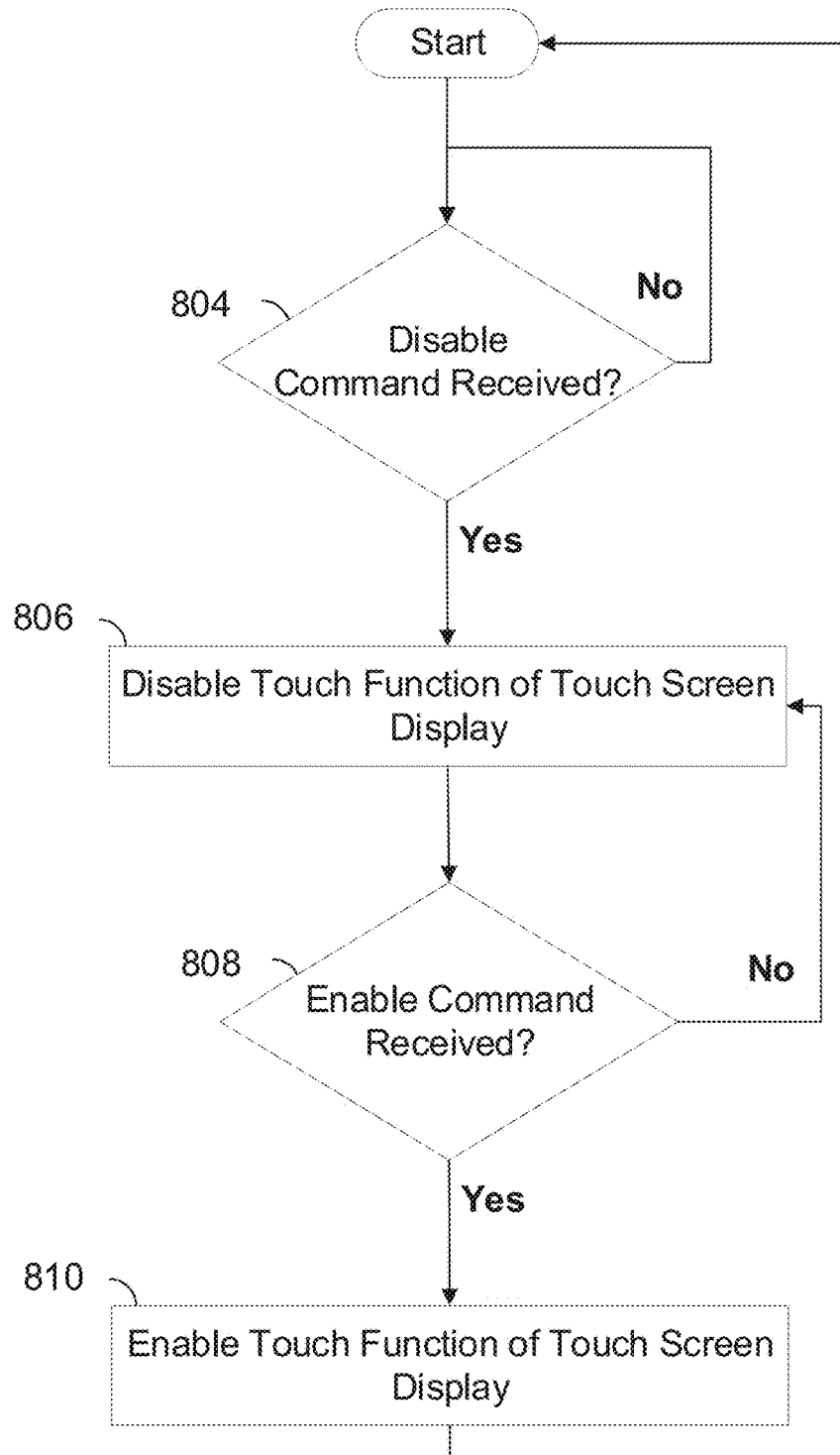
FIG. 8B is a flowchart representative of example machine readable instructions which may be executed to selectively disable or enable touch screen functions during the weld training application of FIG. 8A, in accordance with aspects of this disclosure.

FIG. 8B shows an example of the touch screen disable/enable loop 802. As shown, the loop 802 begins at block 804 where it checks to see if a disable command has been received. If not, then block 804 repeats. If so, the loop 802 disables touch sensitive functionality of the display 704 at block 806. In some examples, the loop 802 may additionally, or alternatively, disable other functionalities of the mobile device 700 (e.g., power button, volume buttons, etc.). In some examples, the mobile device 700 may also enable and/or increase the sensitivity of voice recognition techniques at block 806. After block 806, the loop 802 checks to see if an enable command has been received at block 808. If not, then block 808 repeats. If so, then the loop 802 re-enables touch sensitive functionality of the display 704 (and/or other previously disabled functionalities of the mobile device 700) at block 810, then loops back to block 804.

In some examples, a disable command may comprise user selection of a disable option via the user input devices 712 of the mobile device 700. In some examples, the disable command may comprise communication between the one or more sensors 122 (e.g., RFID, NFC, Bluetooth, etc.) of the helmet training system 101 and the one or more of the sensors 722 of the mobile device 700. In some examples, such communication may occur when the sensors 122/722 come into communication range, which may indicate, for example, that the mobile device 700 has been coupled to helmet training system 101. In some examples, the disable command may comprise a particular activation of the trigger 209 of the welding tool 200 (e.g., after pairing), such as, for example, a given combination of trigger 209 presses. For example, four successive trigger 209 presses, or two short trigger 209 press followed by one long trigger 209 press (e.g., press and hold), may signal a disable command. In some examples, the disable command may comprise one or more measurements of one or more sensors 722 (and/or sensors 122) indicating that the helmet training system 101 is at a given angle or orientation.

In some examples, an enable command may comprise user selection of an enable option via the user input devices 712 of the mobile device 700. In some examples, the enable command may comprise a cessation of communication between the one or more sensors 122 (e.g., RFID, NFC, Bluetooth, etc.) of the helmet training system 101 and the one or more of the sensors 722 of the mobile device 700. In some examples, such cessation of communication may occur when the sensors move out of communication range, which may indicate, for example, that the mobile device 700 has been decoupled from the helmet training system 101. In some examples, the enable command may comprise a particular activation of the trigger 209 of the welding tool 200 (e.g., after pairing), such as, for example, a given combination of trigger 209 presses. For example, four or five successive trigger 209 presses, or two short trigger 209 press followed by one long trigger 209 press (e.g., press and hold), may signal an enable command. In some examples, the enable command may comprise one or more measurements of one or more sensors 722 (and/or sensors 122) indicating that the helmet training system 101 is at a given angle or orientation.

In the example of FIG. 8A, the weld training application 800 proceeds to block 900 after beginning the touch screen disable/enable loop at block 802. At block 900, preliminary configurations of the weld training application 800 occur. In some examples, block 900 may be skipped or performed later. In some examples, the preliminary configurations of block 900 may be conducted via a series of user selectable menu screens, such as in the examples of FIGS. 9A-9C. In some examples, the preliminary configurations may be conducted via a series of automated steps and/or prompts, such as illustrated, for example, in FIG. 9D. In some examples, selections may be performed (and/or data entered) using voice commands, which may assist the user, for example, if the mobile device 700 has already been coupled to the helmet training system 101 and/or otherwise not conveniently available for touch selection.

FIG. 9A shows an example of a home screen 906A presented (e.g., via display 704) at block 900. As shown, the home screen 906A presents options for pairing the welding tool 200 to the mobile device 700 accessing the student center, configuring a weld simulation, running a tutorial, and logging in. In some examples, selecting the tutorial may provoke textual, image, audio, and/or video explanations and/or guidance as to the operation of the weld training application 800. In some examples, selecting "Student Login" may prompt collection of credentials (e.g., username and/or password) and/or provoke communication of those credentials from the mobile device 700 to the remote server 110, with a return communication indicating acceptance or denial. In some examples, the "Student Login" option may be replaced with the "Log Out" option shown in the example of FIG. 9B.

In some examples, selecting "Pair Torch" may provoke a process for establishing wireless communication (via an appropriate wireless communication protocol) between communication circuitry 710 of the mobile device 700 and communication circuitry of the welding tool 200 (e.g., in the communication module 210). In some examples, the process may comprise scanning a QR code 224 and/or entering an unique identification number associated with the communication module 210 and/or welding tool 200. In some examples, the mobile device 700 may send one or more signals to the remote server(s) 110 indicative of the welding tool 200 and/or communication module 210 to which the mobile device has paired and/or is attempting to pair. In some examples, the weld management program 1700 on the remote server(s) 110 may access the database(s) 146 to determine whether a logged in user account is authorized to use the welding tool 200 and/or communication module 210 which has been paired and/or is attempting to be paired, as discussed further below with respect to FIG. 17.

In some examples, the remote server 110 may send one or more signals back to the mobile device 700 indicative of whether the user is authorized to pair with the particular welding tool 200 and/or communication module 210 based on the license(s) and/or other information. In some examples, the weld training application 800 may refuse to allow pairing of the mobile device 700 to a welding tool 200 and/or communication module 210 that is not associated with the logged in user account. In some examples, the weld training application 800 may cause an error to be outputted to the user via the mobile device 700 in response to one or more signals received from the remote server(s) 110 indicative of a refusal to pair.

In some examples, selecting "Access Student Center" at the home screen 906A of FIG. 9A may prompt the mobile device 700 to display a student center screen 906B, such as, for example, the student center screen 906B illustrated in FIG. 9B. In the example of FIG. 9B, the student is already logged in, thus a "Log Out" option is displayed on the student center screen 906B, rather than the "Student Login" option of FIG. 9A. In the example of FIG. 9B, the student center screen 906B gives the option to "Refresh Assignments", "Upload Results" (e.g., of previous assignments), and "Select Exercise." As shown, the student center screen 906B further shows a notification 902 that there are "(!) 4

Exercises to be Completed." In some examples, the notification 902 may be based on information received from the remote server 110 and/or stored in memory 726.

In some examples, selecting "Refresh Assignments" from the student center screen 906B may induce the mobile device 700 to query the remote server 110 for training exercises, tasks, goals, activities, etc. that have been assigned (e.g., by a teacher/trainer) to the user and/or associated with the user's login credentials. Weld training exercises, tasks, goals, activities, etc. that have been newly assigned and/or updated since the last refresh may then be downloaded to the mobile device 700 and/or stored in memory 726 of the mobile device 700. In some examples, selecting "Upload Results" from the student center screen 906B may induce the mobile device 700 to send result data associated with completed weld training exercises, tasks, goals, activities, etc. from the mobile device 700 to the remote server 110. In some examples, selecting "Select Exercise" may cause the mobile device 700 to present to the user (e.g., via display 704) a listing of exercises, tasks, goals, activities, etc. that have been assigned and remain uncompleted. Selection of one or more of these assigned and uncompleted exercises, tasks, goals, activities, etc. may be recorded in memory 726 and accessed during the weld training simulation. In some examples, selection of one or more of the assigned and uncompleted exercises, tasks, goals, activities, etc. may immediately cause transition of the weld training application 800 to the weld training simulation at block 816.

In some examples, selecting "Configure Weld Simulation" at the home screen 906A of FIG. 9A may prompt the mobile device 700 to display a configure simulation screen 906C, such as, for example, the configure simulation screen 906C illustrated in FIG. 9C. In the example of FIG. 9C, the configure simulation screen 906C provides tool connection status 904 and selected exercise status 906, as well as a detect workpiece option 908 and a welding parameter option 910. In some examples, selection of the detect workpiece option 908 may prompt the weld training application to proceed to block 814 in FIG. 8A, where the mobile device 700 enters a camera mode to facilitate camera capture of one or more images to detect (and/or recognize) the mock workpiece 202 (and/or associated markers 204) in the image(s). Once recognized, the weld training application 800 will transition to the weld simulation at block 816. In some examples, selection of the weld parameter option 910 may allow the user to enter weld parameter information (e.g., voltage, current, wire feed speed, etc.) that may be used for the weld training simulation. In the example of FIG. 9C, the configure simulation screen 906C further includes a "Begin" button, which, if selected, may immediately cause transition of the weld training application 800 to the weld training simulation at block 816.

Figure 9D:
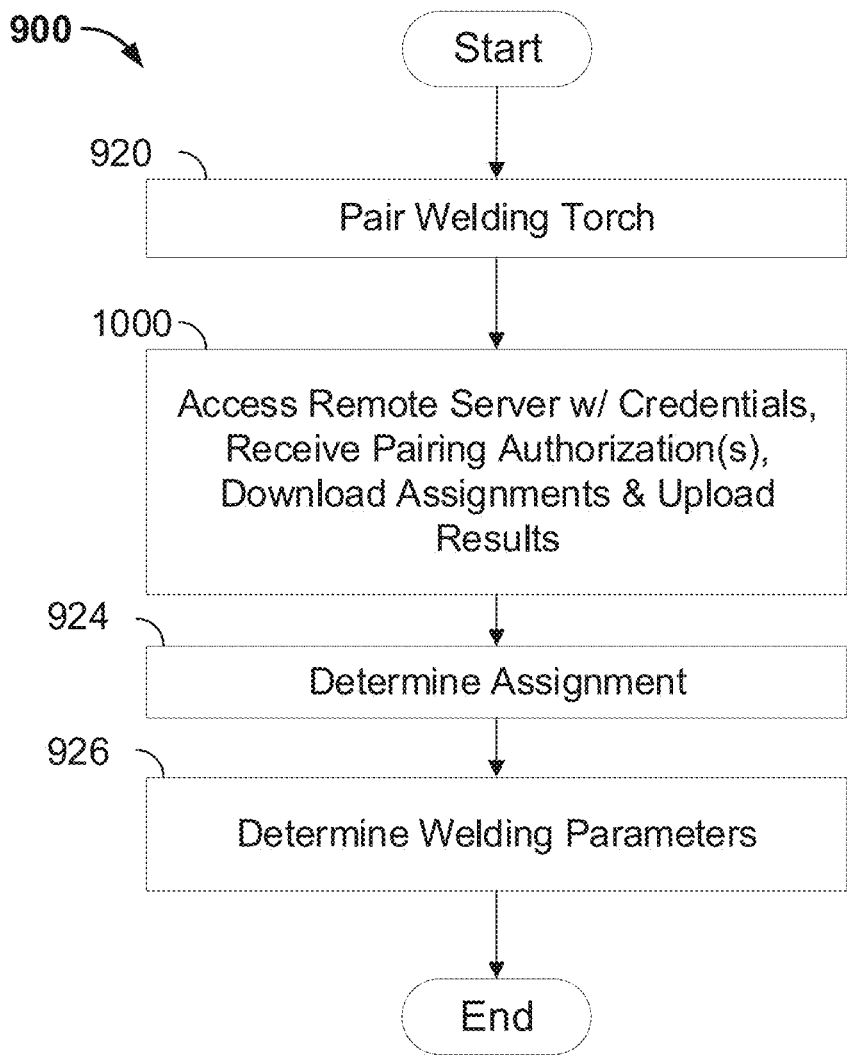
FIG. 9D is a flowchart representative of example machine readable instructions which may be executed to perform preliminary configurations of the weld training application of FIG. 8A, in accordance with aspects of this disclosure.

In some examples, the preliminary configurations of block 900 may instead be performed by a series of automated steps and/or prompts, such as illustrated, for example, in FIG. 9D. In the example of FIG. 9D, the preliminary configurations begin at block 920, where the weld training application 800 pairs the helmet training system 101 to the welding tool 200. In some examples, this may comprise a process for establishing wireless communication (via an appropriate wireless communication protocol) between communication circuitry 710 of the mobile device 700 and communication circuitry of the welding tool 200 (e.g., in the communication module 210), such as discussed above with respect to FIG. 9A, and/or below with respect to FIG. 17, for example.

After block 920, the preliminary configuration proceeds to block 1000, where the weld training application 800 accesses the remote server 110 (e.g., via the mobile device 700) using user credentials. In some examples, block 1000 may comprise a prompt to the user to enter credentials for access to the remote server 110. Once the remote server 110 is accessed using the credentials, training exercises, tasks, goals, activities, etc. that have been assigned (e.g., by a teacher/trainer) to the user and/or associated with the user's login credentials may be downloaded and/or stored, and result data associated with completed weld training exercises, tasks, goals, activities, etc. may be uploaded.

Figure 10:
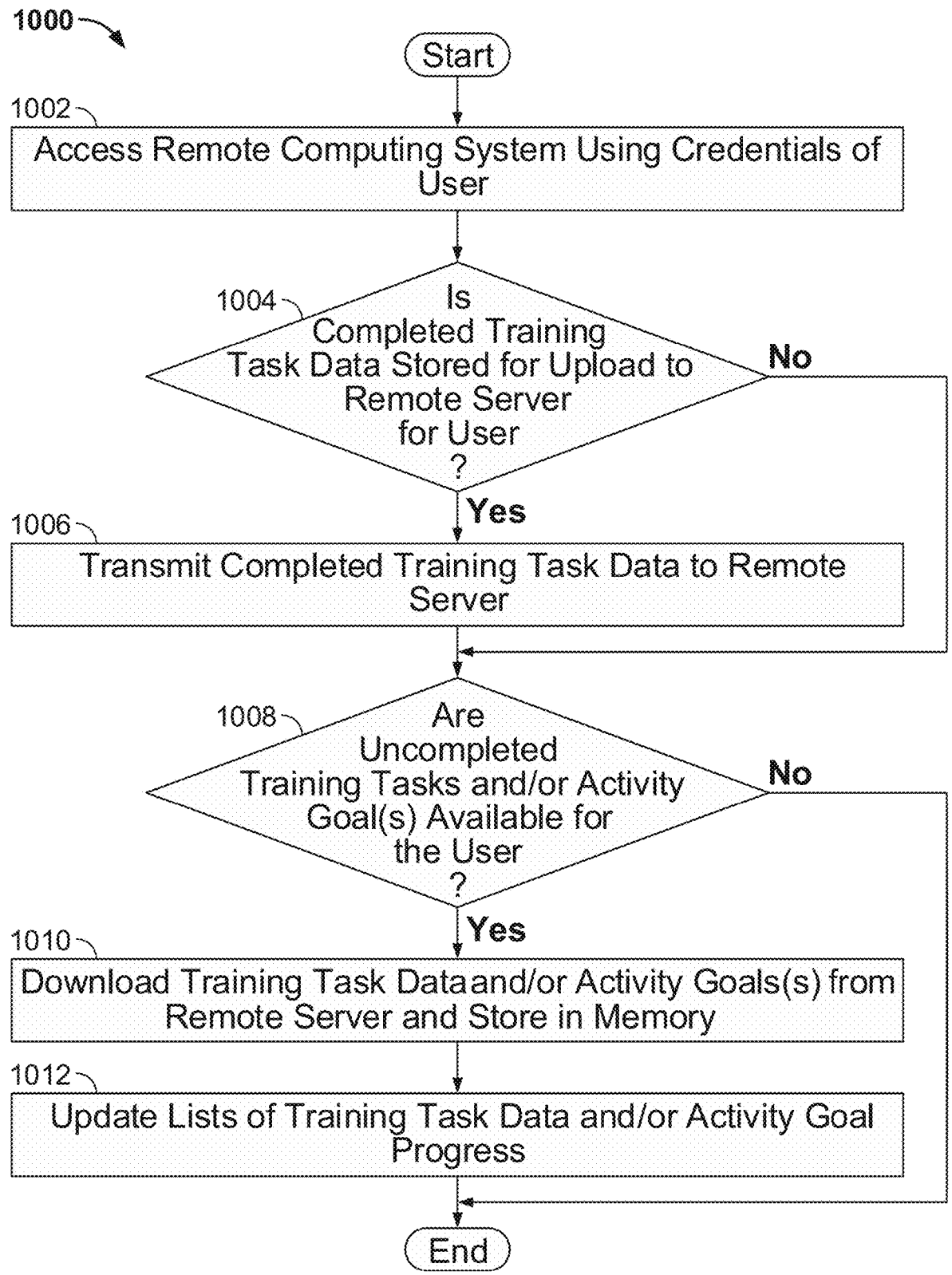
FIG. 10 is a flowchart representative of example machine readable instructions which may be executed to retrieve weld training assignments from, and/or transmit results to, a remote server, in accordance with aspects of this disclosure.

FIG. 10 illustrates a more detailed example of block 1000. In the example of FIG. 10, the remote server 110 is accessed using user credentials at block 1002. Thereafter, at block 1004, a determination is made whether result data associated with completed weld training exercises, tasks, goals, activities, etc. exists to be uploaded. If so, the data is uploaded at block 1006. If not, then a determination is made at block 1008 whether there are uncompleted training exercises, tasks, goals, activities, etc. that have been assigned to the user and/or associated with the user's login credentials that may be downloaded. If so, then they are downloaded at block 1010 and the locally stored list of training exercises, tasks, goals, activities, etc. that have been assigned (e.g., by a teacher/trainer) to the user and/or associated with the user's login credentials is updated at block 112.

In the example of FIG. 9, the preliminary configuration proceeds to block 924 after block 1000. At block 924, a particular assignment is determined for the weld training simulation. In some examples, the determination at block 924 may comprise presenting to the user (e.g., via display 704) a listing of exercises, tasks, goals, activities, etc. that have been assigned and remain uncompleted and prompting a selection. In some examples, the determination at block 924 may comprise automatically selecting the assignment based on some default setting (e.g., select the oldest, newest, or highest priority assignment).

After block 924, the preliminary configuration proceeds to block 926, where welding parameters (e.g., voltage, current, wire feed speed, etc.) may be determined. In some examples, the determination at block 926 may comprise prompting the user to enter weld parameter information, using default weld parameter settings, using the last weld parameter settings, and/or using recommended weld parameter settings. After block 926, the preliminary configuration proceeds to block 928, where the helmet training system 101 may be calibrated, such as through camera capture of one or more images to detect (and/or recognize) the mock workpiece 202 (and/or associated markers 204) in the image(s).

In the example of FIG. 8A, after preliminary configurations are completed at block 900, the weld training application enters a camera mode at block 814. In camera mode, the one or more cameras 102/702 continually capture images and the display 704 of the mobile device 700 continually displays the images. While in camera mode (or, in some examples, even during preliminary configurations), the weld training application 800 checks to determine whether a command to transition into a weld simulation mode has been received. In some examples, a transition command may also comprise a touch screen disable or enable command in the loop 802 of FIG. 8B, such that transitioning to (or from) simulation mode may also disable (or enable) the touch sensitive functions of the display 704. In some examples, the weld training application may conduct (and/or display) a countdown after receiving a transition command, such that the transition only occurs after the countdown expires (e.g., reaches zero).

In some examples, a transition command may comprise user selection of transition via the user input devices 712 of the mobile device 700 (e.g., selection of "Begin" in FIG. 9C). In some examples, the mobile device 700 may utilize voice recognition techniques, and the transition command may comprise a specific vocal command ("Weld!" for example). In some examples, the transition command may comprise camera capture of one or more images (e.g., of the welding tool 200, mock workpiece 202, markers 204, etc.), and/or recognition of a particular marker 204, pattern (e.g., barcode), and/or other item in the images that provokes the transition. In some examples, the memory 726 of the mobile device 700 (and/or memory of the remote server 110) may store data representative of certain objects and/or images that may provoke transition, and the mobile device 700 may compare the captured image(s) to that data. In some examples, the transition command may comprise communication between the one or more sensors 122 (e.g., RFID, NFC, Bluetooth, etc.) of the helmet training system 101 and the one or more of the sensors 722 of the mobile device 700. In some examples, such communication may occur after the sensors 122/722 come into communication range, which may indicate, for example, that the mobile device 700 has been coupled to helmet training system 101. In some examples, the transition command may comprise a particular activation of the trigger 209 of the welding tool 200, such as, for example, a given combination of trigger 209 presses. For example, three successive trigger 209 presses, or one short trigger 209 press followed by one long trigger 209 press (e.g., press and hold), may provoke the transition command. In some examples, the transition command may comprise a spatial orientation command, where one or more spatial measurements of one or more sensors 122/722 (e.g., IMUs, accelerometers, etc.) indicate that the helmet training system 101 is at a given angle or orientation corresponding to a spatial orientation command.

Figure 11:
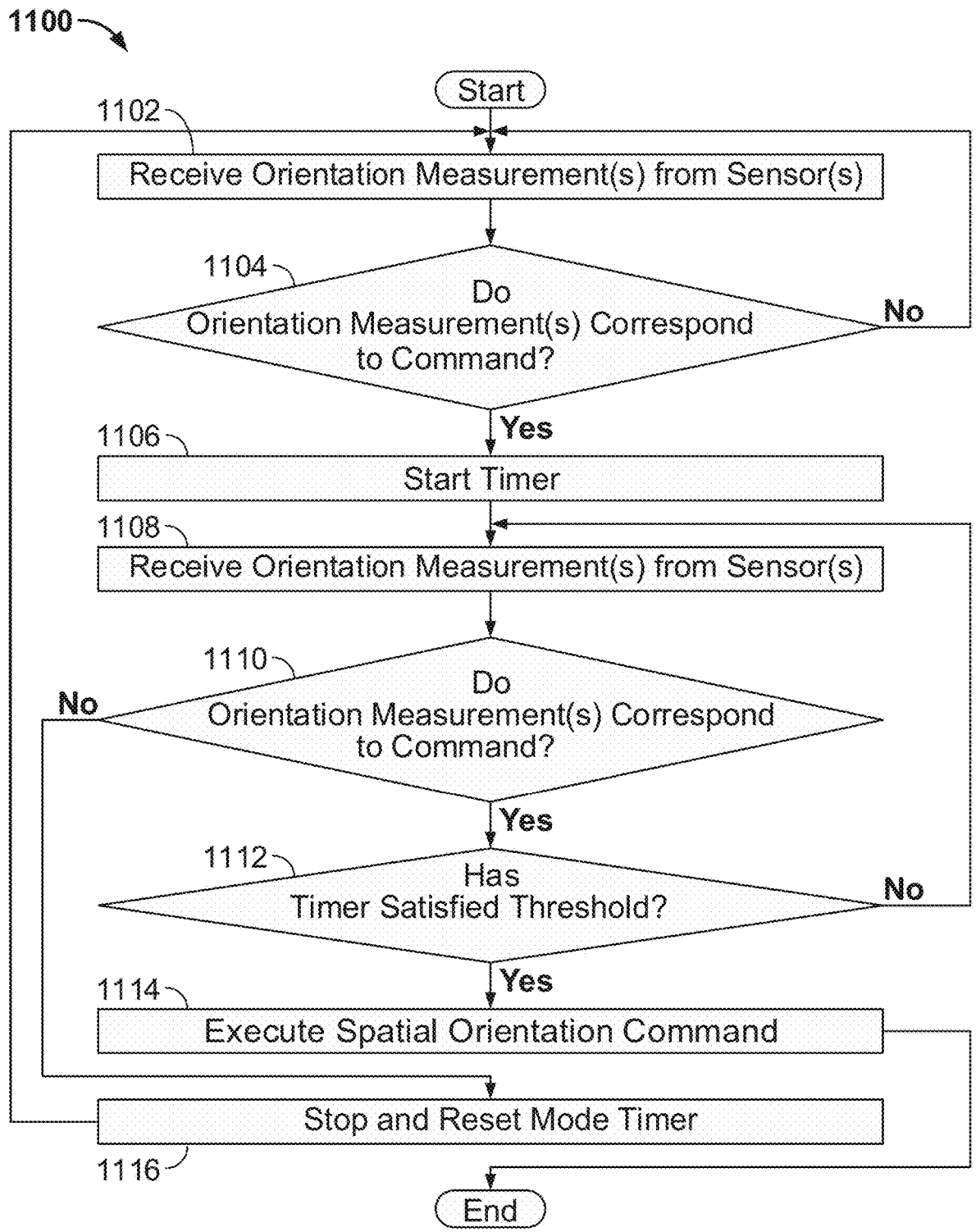
FIG. 11 is a flowchart representative of example machine readable instructions which may be executed to detect a spatial orientation command of the helmet training system of FIG. 2, in accordance with aspects of this disclosure.

FIG. 11 is a flowchart representative of example machine readable instructions for a spatial orientation command process 1100 that the weld training application 800 may use to determine whether the one or more sensor measurements comprises a spatial orientation command. In some examples, a spatial orientation command may comprise a transition command, a disable command, and/or an enable command. In some examples, the spatial orientation command process 1100 may comprise part of the weld training application 800 that operates continually.

As shown, the spatial orientation command process 1100 begins at block 1102, where one or more measurements (e.g., orientation, movement, etc.) are received from one or more sensors 122/722 of the mobile device 700 and/or the helmet training system 101. After block 1102, the spatial orientation command process 1100 determines whether or not the sensor measurement(s) correspond to a transition command at block 1104. If not, then the spatial orientation command process 1100 returns to the block 1102. If, however, the spatial orientation command process 1100 determines at block 1104 that the sensor measurement(s) do correspond to a transition command, then the system starts a timer at block 1106.

In the example of FIG. 11, after starting the timer at block 1106, the spatial orientation command process 1100 again receives one or more sensor measurements at block 1108 and determines whether or not the sensor measurement(s) again correspond to a transition command at block 1110. If not, then the timer is reset at block 1202, and the spatial orientation command process 1100 returns to block 1102. If so, then the spatial orientation command process 1100 determines at block 1112 whether or not a threshold amount of time passed since the timer was started at block 1106. If not, then the spatial orientation command process 1100 returns to block 1108. If so, then the spatial orientation command process 1100 determines there has been a spatial orientation command, and executes the command at block 1114.

In the example of FIG. 8A, once the weld training application 800 transitions to simulation mode at block 816, the weld training application 800 performs an image adaptation process at block 1200. In some examples, the image adaptation process of block 1200 may be performed prior to the transition of block 816. In some examples, the adaptation process may help improve computer vision recognition, detection, and/or tracking techniques, as well as output image quality. In examples where the resolution and/or size of a captured image (and/or camera capturing the image) is significantly larger or smaller than what is ideal for computer vision detection (and/or the processing capabilities of processor(s) 714), the detection performance capabilities of the system may suffer, and the user experience as well. Likewise, in examples where the resolution and/or size of the display(s) 704 is significantly larger or smaller than what is ideal for the image(s) output by the weld simulation (and/or the processing capabilities of processor(s) 714), the image quality of the weld simulation images may suffer, along with the user experience. To address this issue the adaptation process ensures that the images provided by the camera(s) 102/702 and/or to the display(s) 704 have a size and/or resolution not greater than or less than a predetermined maximum/minimum image size and/or resolution. In some examples, if the image size and/or resolution is too large or too small, it may be reduced or enlarged using a nearest neighbor interpolation technique and/or a bilinear interpolation technique.

Figure 12:
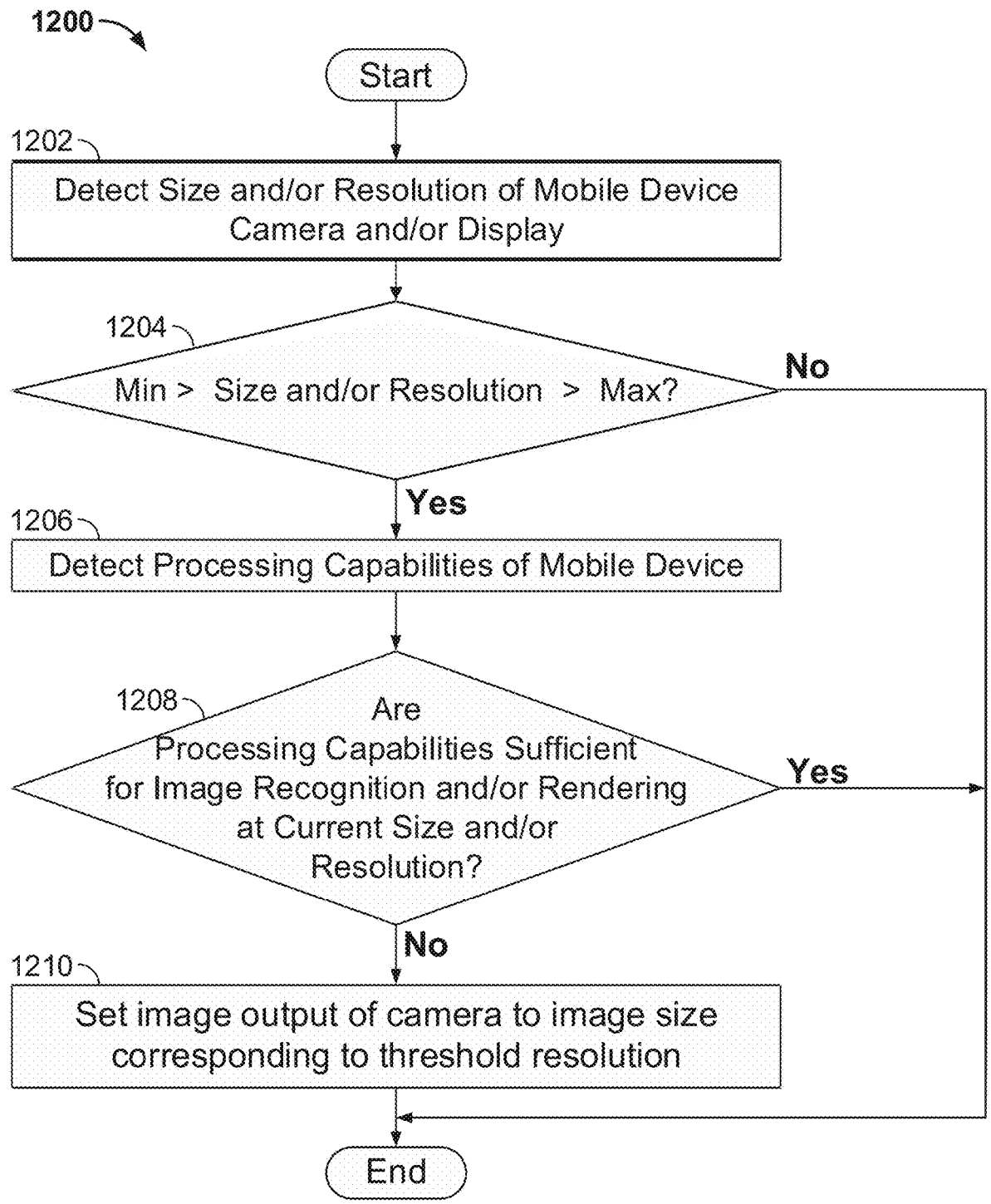
FIG. 12 is a flowchart representative of example machine readable instructions which may be executed to analyze and/or adjust an image for the weld training application of FIG. 8A, in accordance with aspects of this disclosure.

In the example of FIG. 12, the image adaptation process begins at block 1202, where the weld training application 800 detects a size and/or resolution of the camera(s) 702 and/or display(s) 704 of the mobile device 700. At block 1204, the image adaptation process determines whether or not the size and/or resolution of the camera(s) 702 and/or display(s) 704 is out of bounds (e.g., greater than a predetermined maximum threshold, or less than a predetermined minimum threshold). In some examples, the image adaptation process may consider whether the camera(s) 702 (and/or camera(s) 102) implement a stereoscopic system, and, if so adjust the bounds higher and/or lower. If not out of bounds, then the image adaptation process ends. If the size and/or resolution is out of bounds, then the image adaptation process proceeds to block 1206.

In the example of FIG. 12, the image adaptation process determines the processing capabilities of the processor(s) 714 of the mobile device 700 at block 1206. At block 1208, the image adaptation process determines whether or not the processing capabilities of the processor(s) 714 are sufficient to perform image recognition and/or rendering at the detected camera and/or display resolution and size. If so, then the image adaptation process ends. If not, then, at block 1210, the image adaptation process sets the image output of the camera(s) 702 and/or weld simulation to a size, frame rate, and/or resolution within the predetermined bounds (e.g., less than the predetermined maximum threshold and greater than a predetermined minimum threshold). In some examples, the image adaptation process may additionally, or alternatively, configure and/or adjust a brightness, color property, and/or other characteristic(s) of the image output(s) at block 1210.

In some examples, the predetermined maximum and minimum thresholds are stored in memory 726 and/or retrieved from the remote server 110. In some examples, the predetermined maximum and minimum thresholds may be set by a user (e.g., via the user input devices 712). In some examples, the necessary processing capabilities for a given size, resolution, and/or rendering may be stored in memory 726 and/or retrieved from the remote server 110.

In some examples, the actual processing capabilities, size and/or resolution of camera(s) 702, and/or size and/or resolution of display(s) 704 may be requested and/or retrieved from a user of the mobile device 700 (e.g., via user input devices 712). In some examples, the actual processing capabilities, size and/or resolution of camera(s) 702, and/or size and/or resolution of display(s) 704 may be requested and/or retrieved from an operating system of the mobile device 700. In some examples, a make and/or model (e.g., type, number, code, etc.) may be requested and/or retrieved from the operating system of the mobile device 700 or a user. In such an example, the processing capabilities, size and/or resolution of camera(s) 702, and/or size and/or resolution of display(s) 704 may be determined based on the make and/or model (e.g., via a lookup table or other data structure stored in memory 726 and/or remote server 110).

In the example of FIG. 8A, the weld training application 800 executes the weld training simulation in a weld simulation mode at block 1300. The welding simulation may be performed by capturing real-time images (e.g., via the camera(s) 702), processing the images (e.g., using object recognition and/or computer vision techniques via the processor 714 and/or GPU 718), and then rendering a simulated welding scene on the display 704 based on the captured images. In some examples, the welding simulation may superimpose virtual objects into the welding scene (e.g., via the display 704, display driver 702, processor 714, and/or the GPU 718). In some examples, the welding simulation may use simpler and/or lower-resolution versions of such models to enable adequate performance (e.g., response time) in view of the technical capabilities of the mobile device 700. Example virtual objects may include a virtual arc, a virtual weld pool, virtual spatter and/or splatter, a virtual wire feed, a virtual weld bead, and/or virtual guides. As the weld parameters, weld technique, torch manipulation, head pose, helmet position, and/or helmet orientation are changed, the corresponding virtual objects and/or welding scene may also be changed. In some examples, the virtual object change(s) may be based on predetermined models of arc behavior (e.g., with respect to arc physics and/or thermodynamics).

In some examples, the mobile device 700 may receive communication signals from the welding tool 200 representative of a start and/or end of simulated welding. In response to such communication signals, the welding simulation may render appropriate virtual objects (e.g., virtual arc, virtual weld bead, etc.) based on set welding parameters and/or a target training activity (e.g., selected by trainee and/or assigned by a weld training instructor). In some examples, the mobile device 700 may determine its own position, orientation, and/or movement (e.g., using sensors 722) in order to properly render the virtual objects. In some examples, the mobile device 700 may record and/or display welding results and/or a summary of weld information (e.g., heat input, bead width, penetration, travel speed, torch angles, etc.) after the welding is complete. In some examples, the weld results and/or summary information may be uploaded to the remote server 110.

Figure 13:
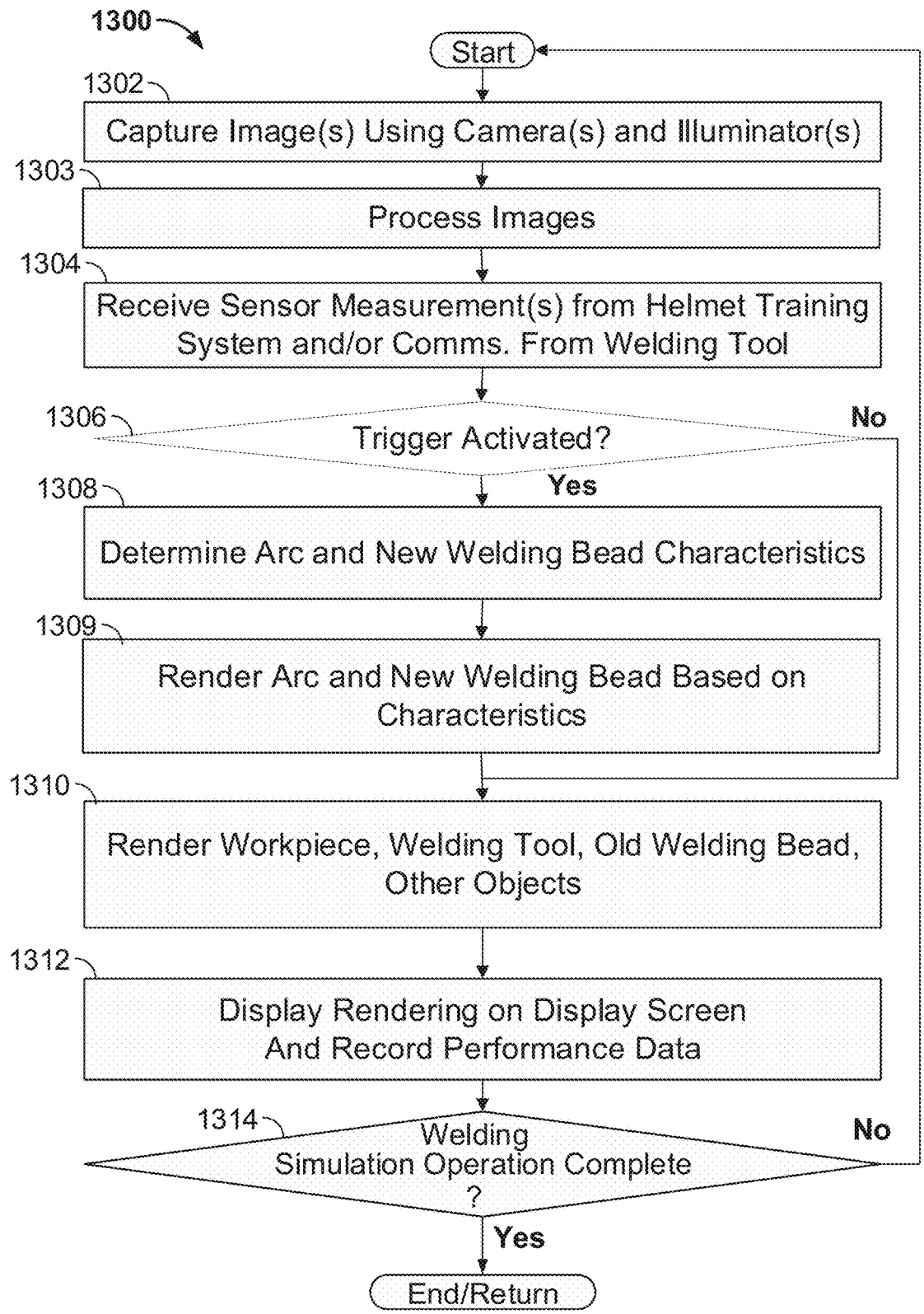
FIG. 13 is a flowchart representative of example machine readable instructions which may be executed to conduct a welding simulation, in accordance with aspects of the present disclosure.

In the example of FIG. 13, the weld simulation begins at block 1302, where the camera(s) 702 of the mobile device 700 (and/or the camera(s) 102 of the helmet training system 101) capture real-time images of the surrounding environment (e.g., welding tool 200, mock workpiece 202, etc.). In some examples, the mobile device 700 may detect (e.g., via sensor(s) 722) lighting conditions of the environment, determine whether the lighting is sufficient for image capture and/or processing. In some examples, the mobile device 700 may control the illuminator(s) 128 of the helmet training system 101 to improve the lighting conditions for image capture as appropriate.

In the example of FIG. 13, the weld simulation processes the captured images (e.g., via processor(s) and/or GPU 718) at block 1303. In some examples, the images may be processed using computer vision techniques to detect, recognize, and/or track objects within the images. In some examples, markers 204 may aid in and/or facilitate this detection, recognition, and/or tracking.

In the example of FIG. 13, the weld simulation receives one or more measurements from the one or more sensors 722 of the mobile device 700 and/or one or more sensors 122 of the helmet training system 101. In some examples, the sensor measurement(s) may relate to spatial characteristics (and/or change in spatial characteristics) of the mobile device 700 and/or helmet training system 101. Such information may inform the object detection and/or tracking techniques of the weld simulation by providing information on the movement of the user with respect to the detected and/or tracked objects. As shown, the weld simulation may additionally, or alternatively, receive one or more communications from the welding tool 200. In some examples, such communications may relate to sensor measurements of the welding tool 200 (e.g., with respect to position, orientation, movement, etc.), activation or deactivation of the trigger 209 of the welding tool 200, and/or other information.

In the example of FIG. 13, the weld simulation determines whether or not the trigger 209 is currently activated at block 1306. If not, then, at block 1310, the weld simulation renders a simulated welding scene (e.g., with virtual objects, etc.) based on prior renderings, the captured images, received data from sensors 722, tool 200 information etc., and displays the rendering at block 1312. The weld simulation may additionally record (and/or transmit) performance and/or other weld data at block 1312. In some examples, the weld simulation may determine, transmit, and/or output feedback to the user at block 1312 (e.g., via display 704, speakers 103/203, illuminators 128/206, etc.) based on the performance and/or other weld data.

As shown, if the trigger 209 is determined to be activated at block 1306, then the weld simulation determines arc and/or new weld bead characteristics at block 1308. In some examples, such characteristics may be determined based on stored models, welding parameter settings, the captured images, the sensor information, etc. As shown, the weld simulation then renders the arc and new weld bead based on these characteristics at block 1309, and displays the arc and new weld bead renderings along with the rest of the renderings (e.g., determined at block 1310) at block 1312.

Thus, in operation, as the welder moves the actual real object welding tool 200 in the real space, the weld simulation adjusts the position, the perspective and other parameters of a simulated workpiece 1416 in a simulated rendering 1400 shown on the display 704 (see, e.g., FIG. 14). The ultimate effect is that the welder sees the simulated welding tool 1418 appear to weld a simulated workpiece 1416 in a similar fashion as would occur in a live welding environment. At block 1314, the weld simulation determines whether the weld simulation should be terminated (e.g., in response to a termination command and/or selection), and either ends if so, or starts over at block 1302 if not.

Figure 14A:
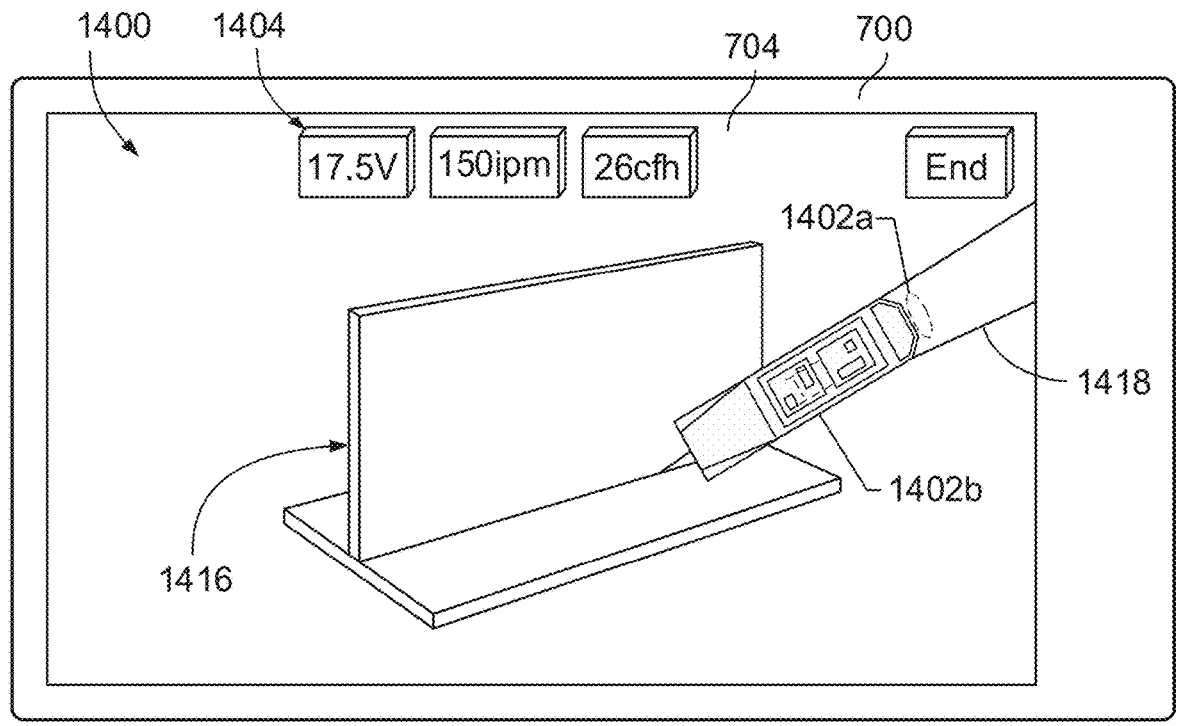
FIGS. 14A and 14B illustrate simulated renderings of the welding simulation of FIG. 13, in accordance with aspects of the present disclosure.
Figure 14B:
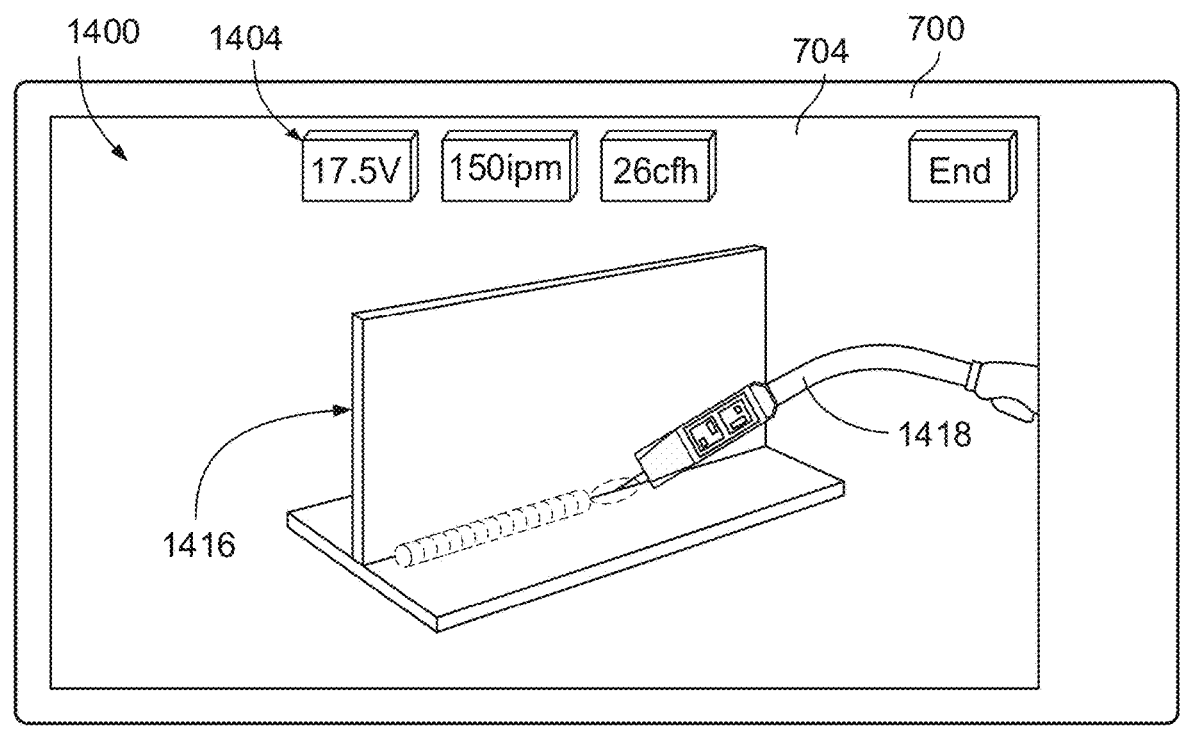

FIGS. 14A and 14B show examples of a simulated rendering 1400 produced by the weld simulation and shown on the display 704 of the mobile device. In the example of FIG. 14A, the trigger 209 has not been activated (or previously activated), and thus no arc or weld bead (new or old) has been rendered or is shown on the simulated workpiece 1416. Virtual objects 1402 have been rendered on the simulated welding tool 200 to help guide the operator. In the example of FIG. 14B, the trigger 209 has been activated (and previously activated), and thus an arc and weld bead (both new and old) is shown on the simulated workpiece 1416.

In the examples of FIGS. 14A and 14B, user selectable elements 1404 (e.g., menu icons) are depicted in the simulated renderings 1400 shown on the display 704. In some examples, user selectable elements 1404 may be presented to the user during the weld simulation so that the user can modify welding parameters, welding assignments, and/or other options during the weld simulation, as well as terminate the weld simulation entirely. In some examples, display of the user selectable elements 1404 may be toggled on and/or off (e.g., via voice command "Menu", or by holding down the trigger 209 for a certain amount of time). In some examples, a user may navigate through the user selectable elements 1404 and/or make selections using the welding tool 200 and/or voice commands, for example. For example, a voice command saying "next" may cause a clockwise movement, or a voice command saying "select" may be use to enter the option, or a voice command saying "up" may be used to exit the option and continue navigation.

Figure 15:
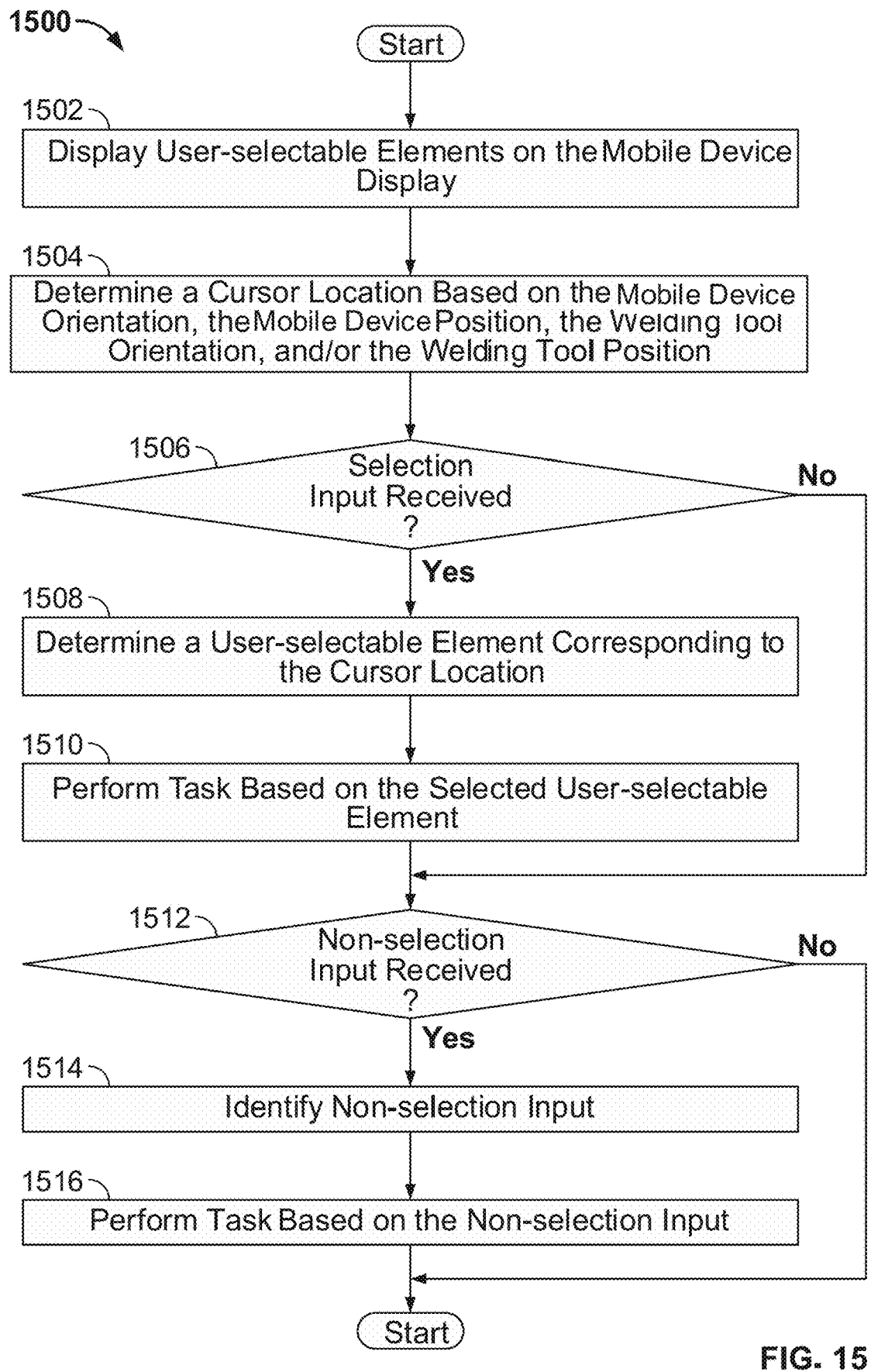
FIG. 15 is a flowchart representative of example machine readable instructions which may be executed by the example mobile device of FIG. 7 to present user selectable elements during the welding simulation of FIG. 13, in accordance with aspects of the present disclosure.

FIG. 15 shows an example of a user selectable element display and selection process 1500 of the weld training application 800. In some examples, the process 1500 may run in parallel with the weld simulation (e.g., such as depicted, for example, in FIG. 13). In some examples, the process 1500 may run in response to a user command that activates the process (e.g., voice command "Activate Menus"). As shown, the process 1500 begins at block 1502, where user selectable elements 1404 are rendered and displayed in the simulated rendering 1400 on the display 704 of the mobile device 700. In some examples, the user selectable elements 1404 may be anchored (and/or rendered with respect) to the simulated workpiece 1416. In some examples, the user selectable elements 1404 may be anchored to a portion of the display 704 (e.g., always displaying at the top, bottom, sides, corners of the display 704). In some examples, the user selectable elements 1404 may be selected by positioning a cursor 1600 in the same (or approximately same—e.g., within a certain threshold) position as the user selectable element 1404. In some examples, the cursor 1600 may be anchored to the simulated welding tool 1418 or the simulated workpiece 1416.

Figure 16A:
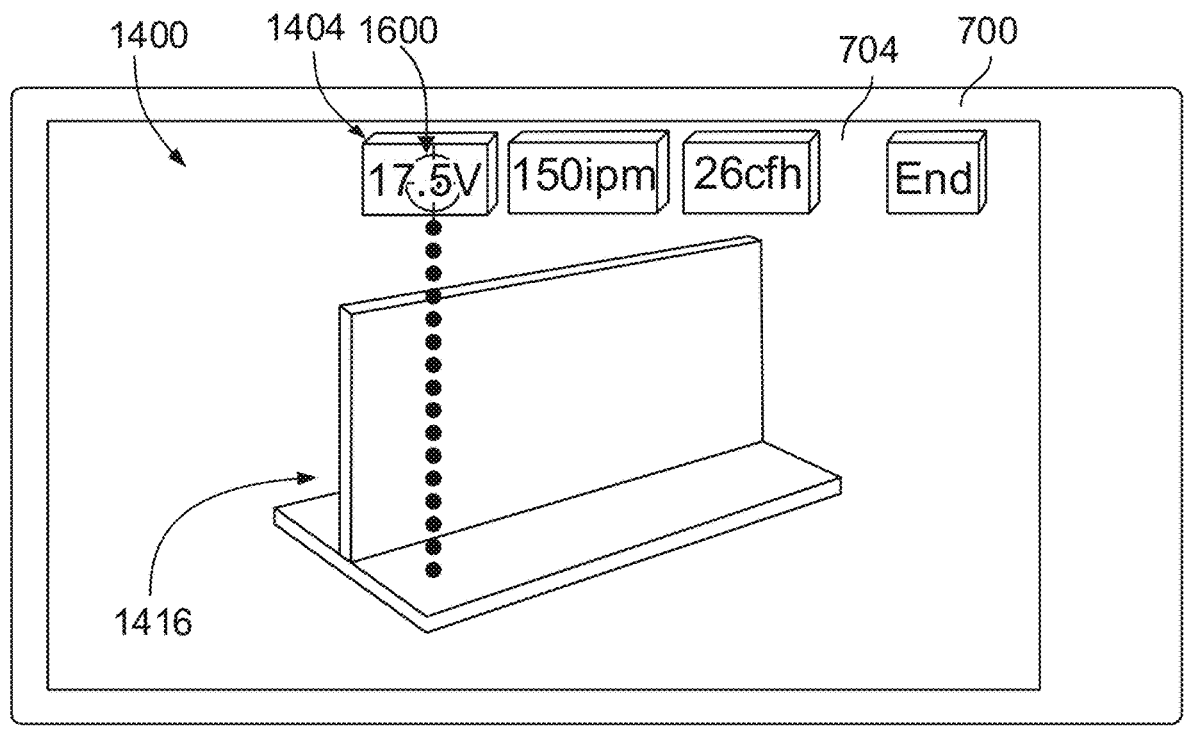
FIGS. 16A and 16B illustrate simulated renderings of the welding simulation of FIG. 13 with a cursor for selecting user selectable elements, in accordance with aspects of the present disclosure.
Figure 16B:
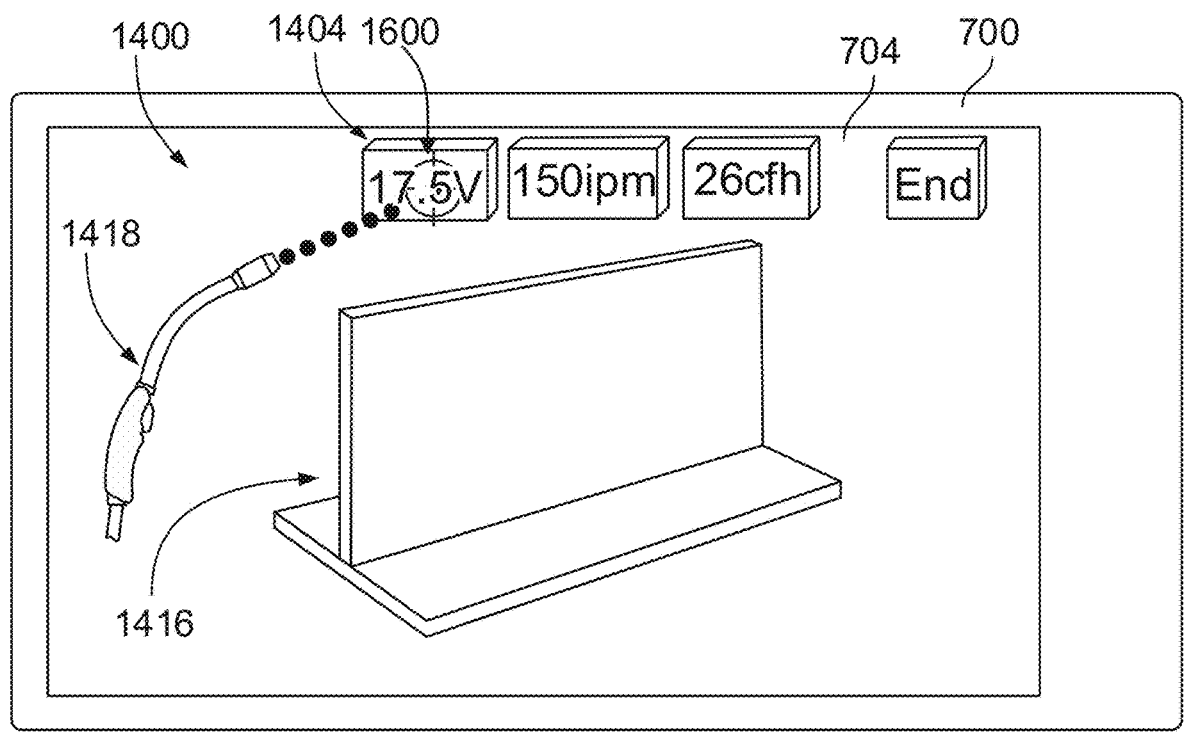

In the example of FIG. 15, the process 1500 determines a position of the cursor 1600 at block 1504. In some examples, the determination may be based on the detected and/or determined position, orientation, and/or movement of the helmet training system 101, mock workpiece 202, welding tool 200, and/or other appropriate object. For example, moving the welding tool 200 may move the cursor 1600, or moving the helmet training system 101 may move the cursor 1600. In the example of FIG. 16A, the user selectable elements 1404 are anchored to the top of the display 704, and the cursor 1600 is anchored to the simulated workpiece 1416. In such an example, the user may move the helmet training system 101 with respect to the mock workpiece 202 to position the cursor 1600 at a desired user selectable element 1404. In the example of FIG. 16B, the cursor 1600 is anchored to the simulated tool 200, with the user selectable elements 1404 anchored to the simulated workpiece 1416 or the top of the display 704. In such an example, the user may move the welding tool 200 to position the cursor 1600 at the desired user selectable element 1404.

In some examples, the cursor 1600 may be anchored to a user's hand, glove, foot, boot, finger, and/or other body part, while the user selectable elements 1404 are anchored to the simulated workpiece 1416, display 704, and/or welding tool 200. For example, the example of FIG. 16B may have a hand, glove, foot, boot, finger, and/or other body part in place of the simulated tool 200, and the user may move the hand, glove, foot, boot, finger, and/or other body part to position the cursor 1600 at the desired user selectable element 1404. In examples where a glove and/or boot (and/or other clothing item) is used, markers 204 may be provided on the glove and/or boot (and/or other clothing item) to facilitate detection and/or tracking.

In the example of FIG. 15, the process 1500 determines whether a selection input has been received at block 1508. In some examples, a selection input may be a voice selection (e.g., "Select"). In some examples, the selection input may comprise a particular activation of the trigger 209 of the welding tool 200. In some examples, the user selection input may comprise some movement of the user (e.g., clenching of the fist, crooking of the finger, etc.). If the process 1500 determines that no selection input has been received, then the process 1500 proceeds to block 1512. If the process 1500 determines that a selection input has been received, then the process 1500 determines what (if any) user selectable element 1404 is in the same (or approximately the same—e.g., within some threshold distance) position as the cursor 1600 at block 1508. At block 1510, the process performs a task based on the identified user selectable element 1404. For example, if there is no user selectable element 1404 identified, the process 1500 may do nothing. If the user-selectable element is a welding parameter menu icon, the process 1500 may select to change the welding parameter.

In the example of FIG. 15, the process 1500 determines whether a non-selection input is received at block 1512. In some examples, a non-selection input may comprise a voice, trigger 209, and/or other selection that is different from a selection input (e.g., a voice command of "Up," "Left," "Next Menu," "Last Menu," etc.). In some examples, non-selection inputs may be used to navigate the menu, rather than select a particular menu option. For example, when the trigger 209 activated in a certain way the menu selection may move next in a clockwise direction. Two fast trigger pressing may allow, for example, to move up from an option selection. If the process 1500 determines that no non-selection input has been received, then the process 1500 proceeds back to the start. If the process 1500 determines that a non-selection input has been received, then the process 1500 identifies the non-selection input at block 1514, and performs an appropriate task based on the non-selection input at block 1516.

Figure 17:
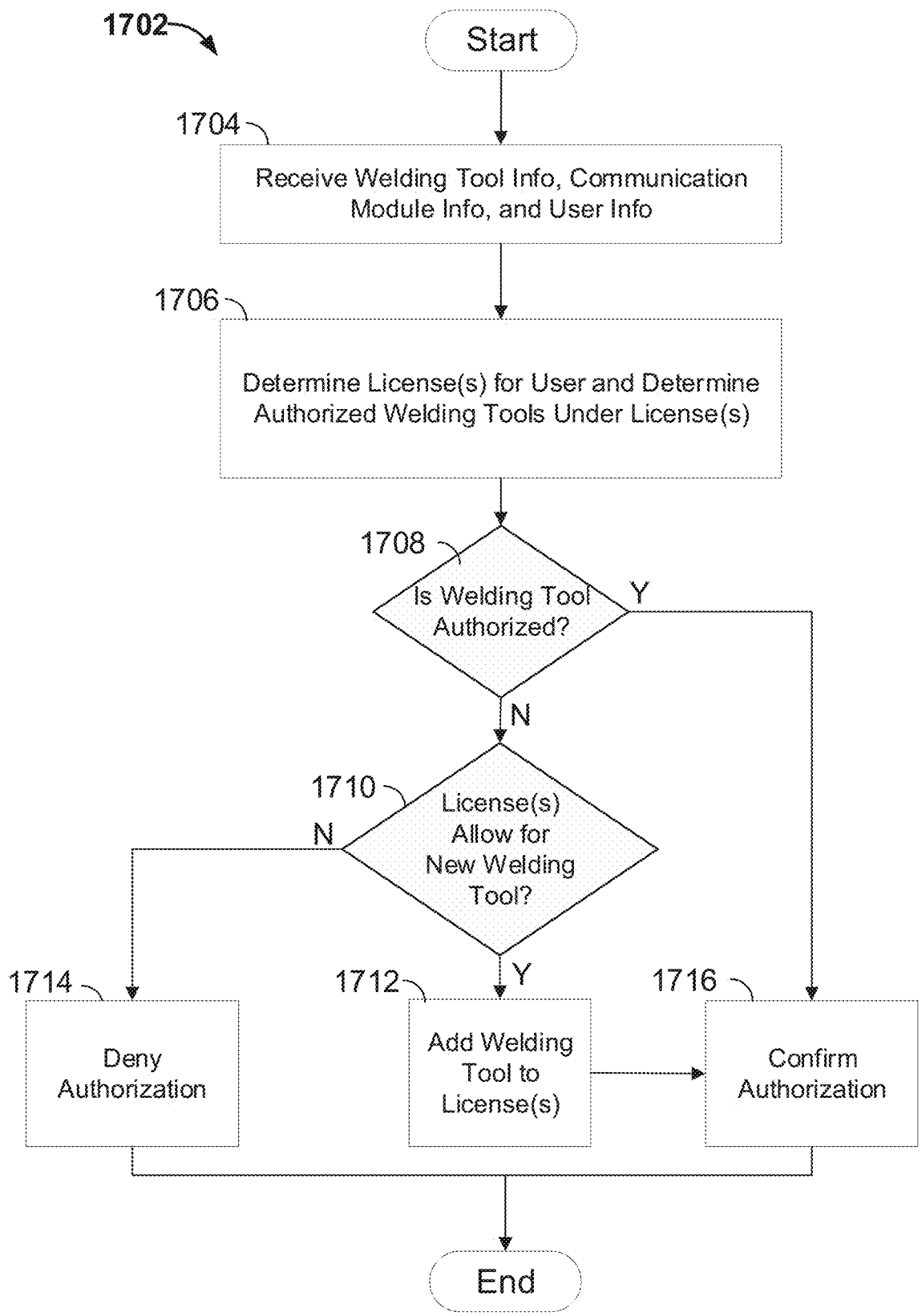
FIG. 17 is a flowchart representative of example machine readable instructions which may be executed to perform a welding tool authorization process, in accordance with aspects of the present disclosure.

FIG. 17 is a flowchart representative of a welding tool authorization process 1702 of the weld training management program 1700. In some examples, the welding tool management program 1700 may tell the weld training system 100 whether a particular user is authorized to use a particular welding tool 200 based on the welding tool authorization process 1702. In some examples, the database(s) 146 may keep track of which welding tools 200 a user is authorized to use.

In some examples, the welding tool authorization process 1702 may make use of one or more licenses stored in the database(s) 146. In some examples, the one or more licenses may associate a user account with one or more welding tools 200 and/or communication modules 210 for which a user is authorized. In some examples, the license(s) may only allow a certain number of welding tools 200 and/or communication modules 210 to be associated with the user account. In some examples, different level license(s) (e.g., basic, normal, premium, etc.) may allow different numbers of welding tools 200 and/or communication modules 210 to be associated with the user account. In some examples, the license(s) may permit additional welding tools 200 and/or communication modules 210 to be associated with the user account for a fee, as part of the license(s), and/or as part of a license upgrade. In some examples, certain licenses (e.g., for teachers and/or educational institutions) may reset and/or erase the previously paired welding tools 200 and/or communication modules 210 on a periodic basis (e.g., at the end of a quarter, semester, school year, etc.), and/or allow new welding tools 200 and/or communication modules 210 to be associated for no extra fee.

In some examples, the welding tool authorization process 1702 and/or the weld training management program 1700 may be embodied in machine readable instructions stored in the memory circuitry 142 of one or more remote servers 110, and executed by processing circuitry 144. As shown, the process 1702 begins at block 1704, where the process 1702 receives information relating to the welding tool 200, communication module 210, and/or user. For example, the remote server(s) 110 may receive one or more signals from the mobile device 700 representative of a unique identifier of the welding tool 200, communication module 210, and/or user. In some examples, the one or more signals may be representative of data that may be used to determine the unique identifier (e.g., via a query of the database 146).

In some examples, the unique identifier of the welding tool 200 and/or communication module 210 may be a serial number 226. In some examples, the unique identifier may be encoded in a QR code 224. In some examples, the unique identifier of the welding tool 200 may be determined via a unique identifier of the communication module 210 (and/or vice versa). In some examples, the remote server(s) may receive user credentials which may comprise a unique identifier of the user, and/or which may be used to determine a unique identifier of the user (e.g., via a query of the database(s) 146).

In the example of FIG. 17, the process 1702 proceeds to block 1706 after block 1704. At block 1706, the process 1702 determines the license(s) associated with the user (e.g., via a query of the database(s) 146 using the unique identifier of the user). In some examples, each license may be associated with certain privileges, permissions, restrictions, and/or limitations. For example, a license may indicate which and/or how many welding tools 200 and/or communication modules 210 the user may use with the weld training system 100. At block 106, the process 1702 additionally determines which and/or how many welding tools 200 and/or communication modules 210 are already associated with the user (e.g., via a query of the database(s) 146).

In the example of FIG. 17, the process 1702 proceeds to block 1708 after block 1706. At block 1708, the process 1702 determines whether the user is authorized to use (and/or is associated with) the welding tool 200 for which information was received at block 1704. In some examples, this determination may comprise comparing the information received at block 1704 with the welding tools 200 (and/or communication modules 210) already associated with the user. If the process 1702 determines the user is authorized to use the welding tool 200, the process 1702 proceeds to block 1716 where one or more confirmation signals are sent (e.g., to the mobile device 700). If the process 1702 determines the user is not authorized to use the welding tool 200, the process 1702 proceeds to block 1710.

At block 1710, the process 1702 determines whether the license(s) associated with the user allow for additional welding tools 200 to be associated with the user (e.g., as part of the license(s) and/or for an additional fee). If the license (s) associated with the user do allow for additional welding tools 200, the process 1702 proceeds to block 1712, where the process 1702 associates (e.g., via the database 146) the welding tool 200 with the user. In some examples, the process 1702 may send one or more signals (e.g., to the mobile device 700) representative of the fact that the welding tool 200 is unauthorized but may be added at block 1710 and/or 1712. In such an example, the process 1702 may wait to receive (e.g., from the mobile device 700) one or more signals representative of an agreement to add the welding tool 200 (and/or pay any required fee) at block 1710 and/or 1712 before proceeding. After block 1712, the process 1702 proceeds to block 1716 where one or more confirmation signals are sent (e.g., to the mobile device 700).

In the example of FIG. 17, the process 1702 proceeds to block 1714 if the license(s) associated with the user do not allow for additional welding tools 200 to be associated with the user. At block 1714, the process 1702 sends one or more signals (e.g., to the mobile device 700) representative of an authorization denial. After block 1714 (and/or block 1716), the process 1702 ends.

The present methods and systems may be realized in hardware, software, and/or a combination of hardware and software. A typical combination of hardware and software may include a general-purpose computing system with a program or other code that, when being loaded and executed, controls the computing system such that it carries out the methods described herein. Another typical implementation may comprise an application specific integrated circuit or chip. Some implementations may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein. As used herein, the term "non-transitory machine-readable medium" is defined to include all types of machine readable storage media and to exclude propagating signals.

The present methods and/or systems may be realized in a centralized fashion in at least one computing system, or in a distributed fashion in which different elements are spread across several interconnected computing systems. Any kind of computing system or other apparatus adapted for carrying out the methods described herein is suited.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

As used herein, the terms "about" and/or "approximately," when used to modify or describe a value (or range of values), position, orientation, and/or action, mean reasonably close to that value, range of values, position, orientation, and/or action. Thus, the examples described herein are not limited to only the recited values, ranges of values, positions, orientations, and/or actions but rather should include reasonably workable deviations.

As used herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z".

As utilized herein, the terms "e.g.," and "for example" set off lists of one or more non-limiting examples, instances, or illustrations.

As used herein, the terms "coupled," "coupled to," and "coupled with," each mean a structural and/or electrical connection, whether attached, affixed, connected, joined, fastened, linked, and/or otherwise secured. As used herein, the term "attach" means to affix, couple, connect, join, fasten, link, and/or otherwise secure. As used herein, the term "connect" means to attach, affix, couple, join, fasten, link, and/or otherwise secure.

As used herein, a control circuit may include digital and/or analog circuitry, discrete and/or integrated circuitry, microprocessors, DSPs, etc., software, hardware and/or firmware, located on one or more boards, that form part or all of a controller, and/or are used to control a welding process, and/or a device such as a power source or wire feeder.

As used herein, the term "processor" means processing devices, apparatus, programs, circuits, components, systems, and subsystems, whether implemented in hardware, tangibly embodied software, or both, and whether or not it is programmable. The term "processor" as used herein includes, but is not limited to, one or more computing devices, hardwired circuits, signal-modifying devices and systems, devices and machines for controlling systems, central processing units, programmable devices and systems, field-programmable gate arrays, application-specific integrated circuits, systems on a chip, systems comprising discrete elements and/or circuits, state machines, virtual machines, data processors, processing facilities, and combinations of any of the foregoing. The processor may be, for example, any type of general purpose microprocessor or microcontroller, a digital signal processing (DSP) processor, an application-specific integrated circuit (ASIC). The processor may be coupled to, and/or integrated with a memory device.

As used, herein, the term "memory" and/or "memory device" means computer hardware or circuitry to store information for use by a processor and/or other digital device. The memory and/or memory device can be any suitable type of computer memory or any other type of electronic storage medium, such as, for example, read-only memory (ROM), random access memory (RAM), cache memory, compact disc read-only memory (CDROM), electro-optical memory, magneto-optical memory, programmable read-only memory (PROM), erasable programmable read-only memory (EPROM), electrically-erasable programmable read-only memory (EEPROM), a computer-readable medium, or the like.

The term "power" is used throughout this specification for convenience, but also includes related measures such as energy, current, voltage, and enthalpy. For example, controlling "power" may involve controlling voltage, current, energy, and/or enthalpy, and/or controlling based on "power" may involve controlling based on voltage, current, energy, and/or enthalpy.

While the present method and/or system has been described with reference to certain implementations, it will be understood by those skilled in the art that various changes may be made and equivalents may be substituted without departing from the scope of the present method and/or system. For example, block and/or components of disclosed examples may be combined, divided, re-arranged, and/or otherwise modified. In addition, many modifications may be made to adapt a particular situation or material to the teachings of the present disclosure without departing from its scope. Therefore, the present method and/or system are not limited to the particular implementations disclosed. Instead, the present method and/or system will include all implementations falling within the scope of the appended claims, both literally and under the doctrine of equivalents.

What is claimed is:

1. A welding system, comprising:
a database storing data representative of one or more associations between one or more users and one or more authorized welding tools, or between the one or more users and one or more licenses; and
a server comprising server processing circuitry configured to:
identify one or more authorized welding tools associated with a user in the database via one or more first queries of the database,
determine whether the one or more authorized welding tools include a particular welding tool,
in response to determining the one or more authorized welding tools does include the particular welding tool, send one or more confirmation signals from the server to a welding simulator,
in response to determining the one or more authorized welding tools does not include the particular welding tool, determine, via the one or more first queries or one or more second queries of the database, whether a license associated with the user permits the user to add additional welding tools to the one or more authorized welding tools,
in response to determining the user is permitted to add additional welding tools, update the database to add the particular welding tool to the one or more authorized welding tools associated with the user in the database, and send one or more confirmation signals from the server to the welding simulator, and in response to determining the user is not permitted to add additional welding tools to the license, send one or more denial signals from the server to the welding simulator.

2. The welding system of claim 1, wherein the server processing circuitry is configured to identify the user or the particular welding tool based on a tool identifier or a user identifier.

3. The welding system of claim 2, further comprising the welding simulator, wherein the welding simulator is configured to send the tool identifier or the user identifier to the server in response to a request to establish wireless communication between the particular welding tool and the welding simulator.

4. The welding system of claim 1, further comprising the welding simulator, wherein the welding simulator is configured to establish a wireless communication channel between the particular welding tool and the welding simulator in response to receiving the one or more confirmation signals.

5. The welding system of claim 4, wherein the welding simulator is configured to conduct a welding simulation using data sent from the particular welding tool through the wireless communication channel to the welding simulator.

6. The welding system of claim 1, further comprising the welding simulator, wherein the welding simulator is configured to decline communication with the particular welding tool in response to receiving the one or more denial signals.

7. The welding system of claim 1, wherein determining whether the license associated with the user permits the user to add additional welding tools to the one or more authorized welding tools comprises determining whether an associated fee has been paid.

8. A non-transitory computer readable medium comprising machine readable instructions which, when executed by processing circuitry, cause the processing circuitry to:
identify one or more authorized welding tools associated with a user in the database via one or more first queries of the database,
determine whether the one or more authorized welding tools include a particular welding tool identified by the user,
in response to determining the one or more authorized welding tools does include the particular welding tool, send one or more confirmation signals from the server to the welding simulator,
in response to determining the one or more authorized welding tools does not include the particular welding tool, determine, via one or more second queries of the database, whether a license associated with the user permits the user to add additional welding tools to the one or more authorized welding tools,
in response to determining the user is permitted to add additional welding tools, update the database to add the particular welding tool to the one or more authorized welding tools associated with the user in the database, and send one or more confirmation signals from the server to the welding simulator, and
in response to determining the user is not permitted to add additional welding tools to the license, send one or more denial signals from the server to the welding simulator.

9. The non-transitory computer readable medium of claim 8, wherein the machine readable instructions, when executed by processing circuitry, further cause the processing circuitry to identify the user based on a user identifier received from a welding simulator.

10. The non-transitory computer readable medium of claim 9, wherein the user identifier comprises a user credential.

11. The non-transitory computer readable medium of claim 8, wherein the machine readable instructions, when executed by processing circuitry, further cause the processing circuitry to identify the particular welding tool based on a tool identifier received from a welding simulator.

12. The non-transitory computer readable medium of claim 8, further comprising a database storing data representative of one or more user-tool associations between the one or more users and the one or more welding tools.

13. The non-transitory computer readable medium of claim 12, wherein the data is further representative of one or more user-license associations between the one or more users and the one or more licenses.

14. The non-transitory computer readable medium of claim 8, wherein determining whether the license associated with the user permits the user to add additional welding tools to the one or more authorized welding tools comprises determining whether an associated fee has been paid.

15. A method, comprising:
receiving, at a server, one or more tool signals representative of tool information that can be used to identify a welding tool, and one or more user signals representative of user information that can be used to identify a user;
identifying, using processing circuitry of the server, the user and the welding tool based on the tool information and user information;
identifying, using the processing circuitry of the server and one or more first queries of a first database, one or more authorized welding tools associated with the user in the first database;
determining, using the processing circuitry of the server, whether the one or more authorized welding tools include the welding tool;
in response to determining the one or more authorized welding tools does include the welding tool, sending one or more confirmation signals from the server to the welding simulator;
in response to determining the one or more authorized welding tools does not include the welding tool, determining, using the processing circuitry of the server and one or more second queries of the first database or a second database, whether a license associated with the user permits the user to add additional welding tools to the one or more authorized welding tools;
in response to determining the user is permitted to add additional welding tools, updating the first database, using the processing circuitry of the server, to add the welding tool to the one or more authorized welding tools associated with the user in the first database, and sending one or more confirmation signals from the server to the welding simulator; and
in response to determining the user is not permitted to add additional welding tools to the license, sending one or more denial signals from the server to the welding simulator.

16. The method of claim 15, wherein the one or more tool signals and one or more user signals are sent to the server from a welding simulator in response to a request to establish wireless communication between the welding tool and the welding simulator.

17. The method of claim 16, further comprising: in response to receiving the one or more confirmation signals at the welding simulator, establishing wireless communications between the welding tool and the welding simulator.

18. The something of claim 17, further comprising: in response to receiving, at the welding simulator, the one or more denial signals, prohibiting communication between the welding simulator and the welding tool.

19. The method of claim 15, wherein the user information comprises a user identifier or user credentials, and the tool information comprises a tool identifier.

20. The method of claim 15, wherein determining whether the license associated with the user permits the user to add additional welding tools to the one or more authorized welding tools comprises determining whether an associated fee has been paid.

* * * * *